United States Patent
Haehnle et al.

(10) Patent No.: US 12,018,113 B2
(45) Date of Patent: *Jun. 25, 2024

(54) METHOD FOR THE HYDROLYSIS OF A POLYMER

(71) Applicant: SOLENIS TECHNOLOGIES, L.P., Wilmington, DE (US)

(72) Inventors: Hans-Joachim Haehnle, Ludwigshafen (DE); Anton Esser, Ludwigshafen (DE); Ralph Isermann, Ludwigshafen (DE)

(73) Assignee: Solenis Technologies, L.P., Wilmington, DE (US)

( * ) Notice: Subject to any disclaimer, the term of this patent is extended or adjusted under 35 U.S.C. 154(b) by 188 days.

This patent is subject to a terminal disclaimer.

(21) Appl. No.: 17/276,247

(22) PCT Filed: Sep. 13, 2019

(86) PCT No.: PCT/EP2019/074503
§ 371 (c)(1),
(2) Date: Mar. 15, 2021

(87) PCT Pub. No.: WO2020/053393
PCT Pub. Date: Mar. 19, 2020

(65) Prior Publication Data
US 2022/0033540 A1    Feb. 3, 2022

(30) Foreign Application Priority Data

Sep. 14, 2018  (EP) ..................... 18194628

(51) Int. Cl.
| | |
|---|---|
| *C08F 8/12* | (2006.01) |
| *C08F 220/06* | (2006.01) |
| *C08F 220/18* | (2006.01) |
| *C08F 220/58* | (2006.01) |
| *C08F 226/02* | (2006.01) |
| *D21H 17/45* | (2006.01) |

(52) U.S. Cl.
CPC .............. *C08F 8/12* (2013.01); *C08F 220/06* (2013.01); *C08F 220/1802* (2020.02); *C08F 220/585* (2020.02); *C08F 226/02* (2013.01); *D21H 17/45* (2013.01)

(58) Field of Classification Search
CPC .. C08F 8/12; C08F 8/48; C08F 220/06; C08F 220/14; C08F 220/18; C08F 220/52; D21H 17/45
See application file for complete search history.

(56) References Cited

U.S. PATENT DOCUMENTS

| | | | | |
|---|---|---|---|---|
| 4,393,174 A | * | 7/1983 | Dawson ................... | C08F 8/12 525/328.2 |
| 4,898,915 A | | 2/1990 | Harwood et al. | |
| 5,037,927 A | | 8/1991 | Itagaki et al. | |
| 8,349,134 B2 | | 1/2013 | Esser et al. | |
| 8,382,948 B2 | | 2/2013 | Haehnle et al. | |
| 8,575,267 B2 | | 11/2013 | Winter et al. | |
| 8,614,279 B2 | | 12/2013 | Gu et al. | |
| 2018/0216294 A1 | * | 8/2018 | Esser ..................... | D21H 21/20 |

FOREIGN PATENT DOCUMENTS

| | | |
|---|---|---|
| AU | 672464 B2 | 10/1996 |
| CN | 101065538 A | 10/2007 |
| CN | 102076910 A | 5/2011 |
| CN | 102203138 A | 9/2011 |
| CN | 106661843 A | 5/2017 |
| DE | 4328975 A1 | 3/1994 |
| DE | 4241117 A1 | 6/1994 |
| DE | 4441940 A1 | 6/1995 |
| EP | 0216387 A2 | 4/1987 |
| EP | 0438744 A1 | 7/1991 |
| EP | 0528409 A1 | 2/1993 |
| EP | 2787564 A1 | 10/2014 |
| GB | 752290 A | 7/1956 |

(Continued)

OTHER PUBLICATIONS

ISA/EPO, International Search Report issued in International Application No. PCT/EP2019/074503, dated Mar. 25, 2021.

(Continued)

*Primary Examiner* — Robert C Boyle
(74) *Attorney, Agent, or Firm* — Lorenz & kopf, LLP

(57) ABSTRACT

Methods for producing final polymer A are provided that comprise the following steps:
(A) providing a starting polymer V, the starting polymer V being obtainable by radical polymerization of the monomers (i), (ii), (iii), and (iv) as described herein in the amounts provided herein; and
(B) hydrolyzing the provided starting polymer V under alkaline conditions to obtain the final polymer A, wherein the N—C(=O)R$^1$ groups of formula (I) at least partially hydrolyze the monomers (i) polymerized into the starting polymer V to form primary amino groups.

Certain final polymers A obtained are useful for a method for producing paper or cardboard comprising adding certain final polymers A to a first aqueous pulp suspension, dewatering the obtained second aqueous pulp suspension containing certain final polymers A on a water-permeable substrate to a wet paper structure, and further dewatering of the wet paper structure into a paper or cardboard.

19 Claims, 1 Drawing Sheet

(56) References Cited

FOREIGN PATENT DOCUMENTS

| | | | | |
|---|---|---|---|---|
| JP | 2016186023 A | 10/2016 | | |
| JP | 2017039867 A | 2/2017 | | |
| JP | 2017039868 A | 2/2017 | | |
| JP | 2017061602 A | 3/2017 | | |
| RU | 2606227 C2 | 1/2017 | | |
| WO | 2016001016 A1 | 1/2016 | | |
| WO | WO-2017021483 A1 * | 2/2017 | ............. | D21H 17/37 |

OTHER PUBLICATIONS

Sawayama et al.: "A novel synthetic procedure for N-vinylformamide and free radical polymerization", Mitsubishi Kasei R&D Review, vol. 7, 1993, pp. 55-61.

Mullier, M. & Smets, G.. (1957). Polymers and group interaction. IV. Hofmann reaction on polyvinylamides. Journal of Polymer Science. 23. 915-930. 10.1002/pol.1957.1202310435.

Pinschmidt, Roberrt & Wasowski, L.A. & Orphanides, G.G. & Yacoub, K.. (1996). Amine functional polymers based on N-ethenylformamide. Progress in Organic Coatings. 27. 209-218. 10.1016/0300-9440(95)00537-4.

Majumdar, Ramendra & Yang, Shih-Liang & Harwood, H.. (1983). Alternating copolymerization of methyl acrylate with donor monomers having a protected amine group. Journal of Polymer Science: Polymer Chemistry Edition. 21. 1717-1727. 10.1002/pol.1983. 170210614.

"Polimery—svojstva i primenenie" [Polymers—properties and use], URL: https://pcgroup.ru/blog/polimery-svojstva-i-primenenie/, May 20, 2016 (retrieved from: Web Archive.org).

* cited by examiner

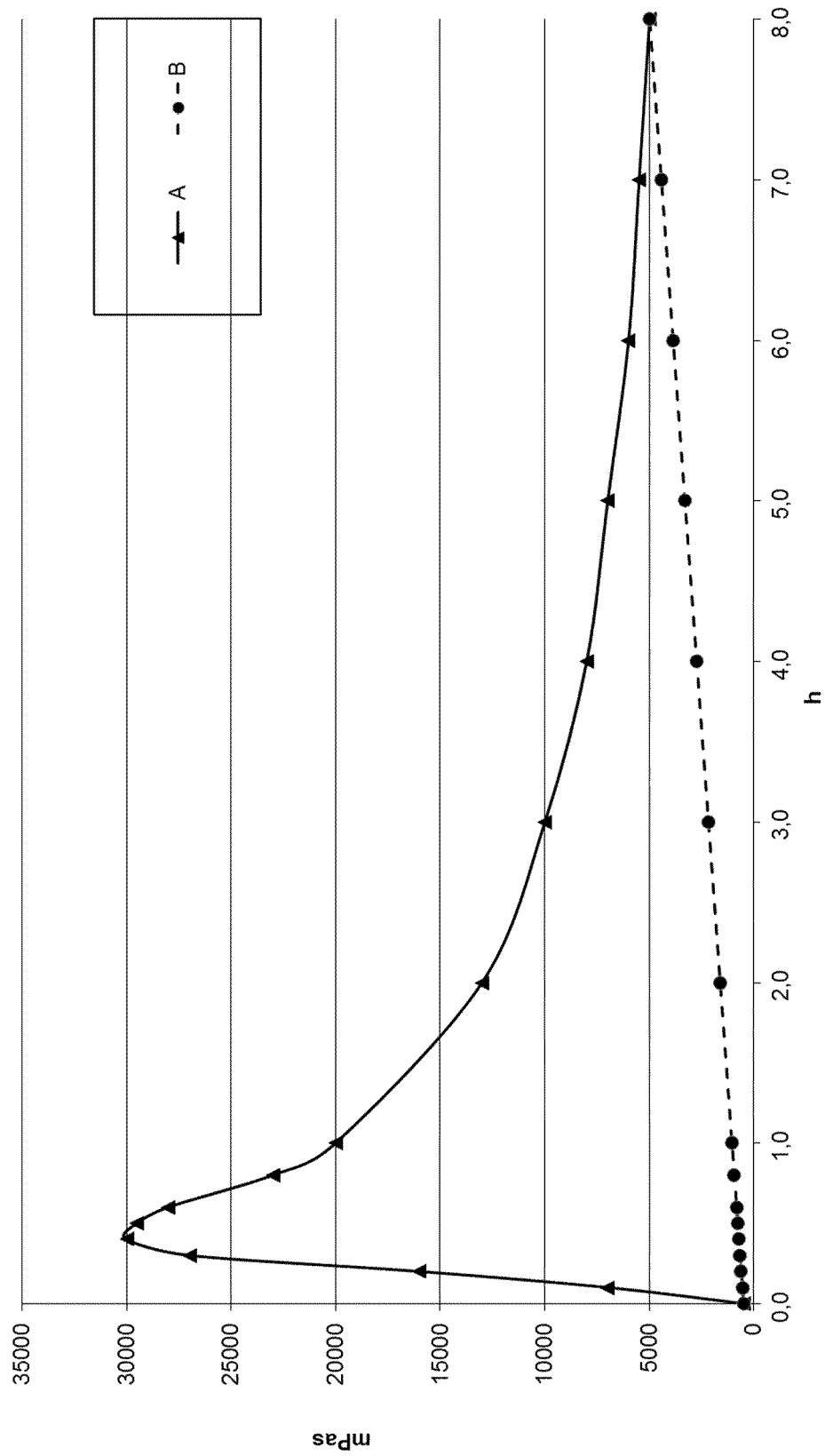

METHOD FOR THE HYDROLYSIS OF A POLYMER

CROSS-REFERENCE TO RELATED APPLICATIONS

This is a National Stage of International Application No. PCT/EP2019/074503, filed Sep. 13, 2019, which claims the benefit of European Patent Application No. 18194628.6, filed Sep. 14, 2018.

The invention relates to a method for producing final polymer A, comprising providing a starting polymer V and alkaline hydrolyzing the starting polymer V to the final polymer A. Further subjects of the invention are the starting polymer V obtainable by radical polymerization, a method for producing the starting polymer V and specific final polymers A. A further subject of the invention is a method for producing paper or cardboard comprising adding certain final polymers A to a first aqueous pulp suspension, dewatering the resulting second aqueous pulp suspension containing the certain final polymers A on a water-permeable substrate to a wet paper structure and the further dewatering of the wet paper structure to a paper or cardboard. The resulting paper or cardboard has good dry strength.

Manufactured final polymers A are interesting, among other things, as an additive for aqueous pulp suspensions in the production of paper or cardboard, when the paper or cardboard obtained thereby has a good dry strength. The trends in today's paper industry have a strong negative impact in part on the dry strength of a paper or cardboard. For example, recycling rates of used paper continue to increase. This is accompanied by a deterioration of the fiber quality. Shorter cellulose fibers, reduced swelling behavior and keratinization thus occur. Basically, the use of cheap raw materials is attractive, even when this is concomitantly associated with shorter cellulose fibers. Reducing the basis weight of a paper or cardboard to save raw materials is a constant theme. The water cycles in the paper machines are progressively closed. Polymers that can be used as an additive in methods for producing paper or cardboard and thereby also ensure a good dry strength of the resulting paper or cardboard are therefore interesting.

DE 4328975 A discloses polymers as a subject according to the invention for paper production which have 2-amino-dihydropyrrole structural units with 20 to 90 mol % proportion. The radical polymerization of N-vinylformamide and acrylonitrile to a starting polymer takes place first for producing the example polymers. This starting polymer accumulates at the end of the polymerizations as a suspension in water. After filtration, the starting polymer is treated with concentrated hydrochloric acid and, by heating to about 100° C., there is amidination. The final polymer thus formed is precipitated with acetone and dried. For the produced final polymer "F", the starting polymer of which is obtained via the radical polymerization of 50 mol % of N-vinylformamide and 50 mol % of acrylonitrile, a lactam content is indicated as the sole polymer, specifically 1 mol %:

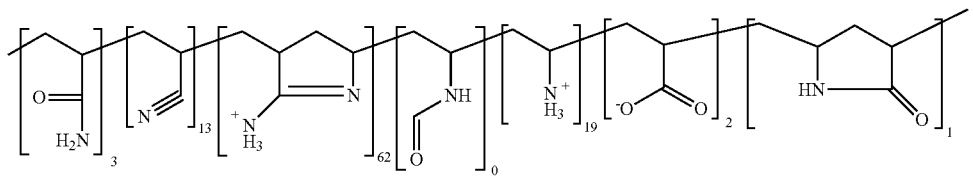

Among other things, the final polymers are added to a pulp suspension. Papers are produced by means of a TAPPI standard Fourdrinier machine. The paper produced with the final polymer "F" determines the ash content. For papers produced with other final polymers, the paper strength is also determined by means of measuring a burst factor. The produced final polymers "G", "K", "Q" and "R" have no or only a small content of 2-amino-dihydropyrrole structural units, are therefore not according to the invention and give worse results in the application examples.

EP 0528409 A discloses polymers according to the invention which match those of the aforementioned DE 4328975 A as flocculants. The final polymer "F" from DE 4328975 A is again found in the example part as the final polymer "P". In the examples, the final polymers are added to sewage sludge to improve its filtration ability. Analogously to DE 4328975 A, the final polymers not according to the invention have no or only a small content of 2-amino-dihydropyrrole structural units.

DE 4441940 A discloses as inventive subject matter polymers which have five-membered lactams as structural units (=pyrrolidin-2-one structural units) with 20 to 100 mol % proportion. In the example part, an increased thermal stability is shown for the final polymers there. The final polymers are recommended for use as modifiers for thermoplastic resin, polymeric additives for petroleum tertiary recovery, slip agents, detergent dispersants, scale inhibitors, quench oil polymers, drilling mud thickeners, pipe transport thickeners, binders, and the like. For the production of the example polymers, the radical polymerization of N-vinylformamide and acrylamide takes place first, in one case, from N-vinylformamide, acrylamide and acrylamide-2-methylpropanesulfonic acid and in a further case, from N-vinylformamide and methylacrylamidate in each case to form a starting polymer. For N-vinylformamide and acrylamide, the starting polymer is precipitated with methanol, and in the other two cases, the starting polymer is filtered off as a polymeric gel. The starting polymers thus obtained are treated with aqueous hydrochloric acid. It is then precipitated by the addition of acetone or methanol and then dried. This is followed by an assessment of the water solubility and optionally a determination of the reduced viscosity. For the produced final polymer "C", the starting polymer of which is obtained via the radical polymerization of 50 mol % of N-vinylformamide and 50 mol % of acrylamide, the following composition is indicated:

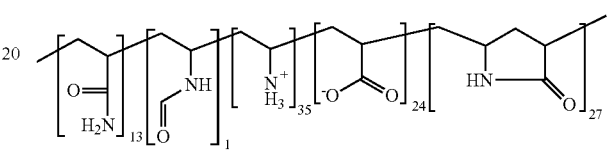

For the produced final polymer "M", the starting polymer of which is obtained via the radical polymerization of 40 mol % of N-vinylformamide, 40 mol % of acrylamide and 20 mol % of acrylamide-2-methylpropanesulfonic acid, the following composition is indicated:

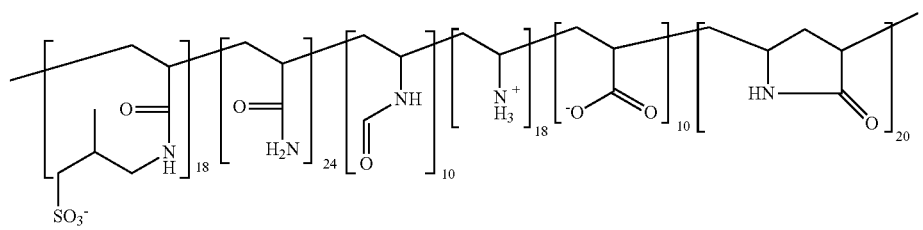

For the produced final polymer "N", the starting polymer of which is obtained by the radical polymerization of N-vinylformamide and methyl acrylamidate, the following composition is indicated:

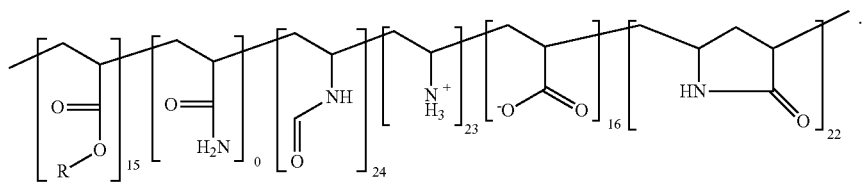

U.S. Pat. No. 4,898,915 discloses, as a subject according to the invention, polymers which have structural units having an aromatic or aliphatic amino group and structural units having at least one nitrile, aldehyde, carboxylic acid or carboxylic acid ester substitution. In the examples, starting polymers are produced via a Lewis acid catalyzed polymerization of monomers with protected amino groups and acrylic acid esters in toluene. The crude starting polymers are separated by decantation and methanol addition, dissolved in chloroform, filtered and precipitated with renewed addition of methanol. To obtain final polymers, the starting polymers thus obtained are treated with hydrazine in chloroform to liberate the primary amino groups. In Example 3, methyl acrylate is specifically polymerized with N-vinylphthalimide under the catalysis of ethylaluminium-sequichloride. This starting polymer is dissolved in chloroform in Example 6 and treated with hydrazine. Methoxy groups, amino groups and lactam units are described for the obtained final polymer. In Example 7, the final polymer obtained in Example 6 is treated with aqueous potassium hydroxide solution at 70° C., whereupon the obtaining of a polymer having alternating amino and carboxylic acid groups is described. The use of the final polymers is recommended as anti-static agents or as thickeners in oil production.

"A novel synthetic procedure for N-vinylformamide and free radical polymerization", S. Sawayama et al., Mitsubishi Kasei R&D Review, 1993, Vol. 7, page 55-61, chapter 3.5, FIG. 4, mentions the copolymerization of N-vinylformamide with acrylamide and the copolymerization of N-vinylformamide with styrene in respectively different molar ratios.

"Alternating copolymerization of methyl acrylate with donor monomers having a protected amine Group", R. N. Majumdar et al., Journal of Polymer Science, 1983, Vol. 21, pages 1717-1727, among other thing, describes Example 6 of the aforementioned U.S. Pat. No. 4,898,915 and entitles an alternating copolymer of methyl acrylate and N-vinylphthalimide as hydrazinolysis. FIG. 4 shows the $^{13}$C NMR of a copolymer of methyl acrylate and N-vinyl phthalimide and the $^{13}$C NMR of an alternating copolymer of methyl acrylate and N-vinyl phthalimide.

"Amine functional polymers based on N-ethenylformamide", R. K. Pinschmidt et al., Progress in Organic Coatings, 1996, 27, pages 209-218, in Section 2.1 describes the polymerizing of 32 mol % of N-vinylformamide, 38 mol % of butyl acrylate and 30 mol % of methyl methacrylate in a solvent, for example, alcohol, ketone or alcohol/toluene, with the free radical initiator Vazo 52. The basic hydrolysis of (meth) acrylate/N-vinylformamide copolymers and terpolymers with potassium hydroxide in an alcoholic solvent is described as fast in Section 2.2. With a starting polymer from polymerizing acrylate: N-vinylformamide=1:1, a lactam-containing polymer, which is known from the aforementioned U.S. Pat. No. 4,898,915, also precipitates. Section 3.4 and Scheme 3 mention the hydrolysis and lactam formation of copolymers of N-vinylformamide and (meth)acrylates. High lactam content leads to insolubility in normal solvents.

"N-vinylformamide—building block for novel polymer structures", R. K. Pinschmidt et al., Pure Applied Chemistry, 1997, A34 (10), pages 1885-1905, among other things, describes the hydrolysis of copolymers of N-vinylformamide and (meth)acrylates or acrylonitrile under acidic conditions as easy and with successful high conversion. This is attributed to the lack of strong charge repulsion between vinylamine units in these highly alternating copolymers. Unfortunately, neutralization or basic hydrolysis leads to very rapid lactam formation. This is represented schematically in FIG. 9 and the lactam structure is referred to as insoluble.

GB 752290 discloses as a subject according to the invention polymers which have five-membered lactams as structural units (=pyrrolidin-2-one structural units). The radical polymerization of acryloyl chloride to a starting polymer takes place first for producing the example polymers. This starting polymer is dissolved in dimethylformamide and reacted with sodium azide or hydroxylamine. After filtration and addition of acetone, the final polymer is precipitated, dissolved in water and precipitated with the addition of hydrochloric acid. Among other things, a final polymer having 70 mol % lactam structural units, 23 mol % acid groups and 7 mol % amino groups and a final polymer having 63 mol % lactam structural units, 24.5 mol % acid groups and 12.5 mol % amino groups is described. The final polymers are recommended, among other things, as film formers and for use in photographic layers.

Final polymers obtained from the Schmidt reaction of polyacrylic acid with hydrazoic acid and containing primary amino group and carboxylic acid groups are investigated by nuclear magnetic resonance in "Determination of the sequence distribution and ionization constant of poly(acrylic acid-co-vinylamine) by C-13 NMR", C. Chang et al., Journal of Polymer Science, Polymer Symposium, 1986, 74, pages 17-30. Lactam formation is described for the investigated final polymers in which 12% or 30% or 52% of the carboxylic acid groups have been converted into amino groups.

"Polymers and group interaction. IV. Hofmann reaction on polyvinylamides", M. Mullier et al., Journal of Polymer Science, 1957, XXIII, pages 915-930, investigate, among other things, Hofmann degradation products of polyacrylamide and polymethacrylamide. In the examples, polyacrylamides are reacted as starting polymers with sodium hypochlorite for the production, whereupon polymers having amino groups are formed as final polymers. These final polymers are allocated a high proportion of five-membered lactam structural units. Table 1 shows the final polymer "Polymer I" obtained from the Hofmann reaction of polyacrylamide with 1 equivalent of sodium hypochlorite:

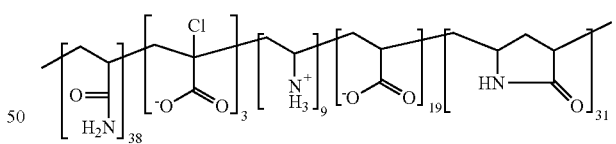

Table 1 shows the final polymer "Polymer II" obtained from the Hofmann reaction of polymethacrylamide with 1 equivalent of sodium hypochlorite:

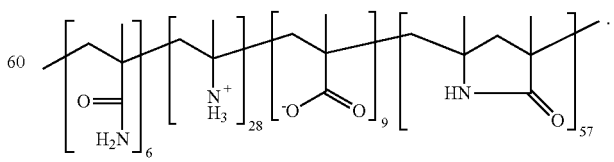

JP 2016-186023 A describes in its Example 1 the radical polymerization of 43 mol % of N-vinylformamide and 57 mol % of methyl methacrylate in methyl ethyl ketone. Example 2 describes the radical polymerization of 24 mol % of N-vinylformamide and 76 mol % of methyl methacrylate in methyl ethyl ketone. The resulting polymers are interesting for optical lenses, etc.

JP 2017-061602 A describes in its Example 3 the radical polymerization of 32 mol % of N-vinylformamide and 68 mol % of methyl methacrylate in methyl ethyl ketone. The resulting polymer is interesting for optical components.

JP 2017-039867 A describes in its Example 4 the radical polymerization of 20 mol % of N-vinylformamide and 80 mol % of methyl methacrylate in methyl ethyl ketone. Example 5 describes the radical polymerization of 32 mol % of N-vinylformamide and 68 mol % of methyl methacrylate in methyl ethyl ketone. The resulting polymers are interesting for optical components.

JP 2017-039868 A describes in its Example 2 the radical polymerization of 32 mol % of N-vinylformamide and 68 mol % of methyl methacrylate in methyl ethyl ketone. Example 3 describes the radical polymerization of 48 mol % of N-vinylformamide and 52 mol % of methyl methacrylate in methyl ethyl ketone. Example 4 describes the radical polymerization of 20 mol % of N-vinylformamide and 80 mol % of methyl methacrylate in methyl ethyl ketone. The resulting polymers are interesting for optical components.

There is a need for further methods for producing a final polymer which can be carried out as simply as possible, in particular also with regard to large scale industry. In large scale industry, some common laboratory chemicals prove to be problematic in terms of toxicity, corrosivity or generally their risk potential. Also, situations during a reaction which are still manageable on a laboratory scale prove to be problematic large-scale industry. Especially for final polymers, which are used, among other things, for producing paper or cardboard, a method is interesting when it requires less effort to avoid measures for dealing with such potential hazards or situations during a reaction. This is in particular true for final polymers that are used in a method for producing paper or cardboard, therefore, so that paper or cardboard obtained thereby has a good dry strength.

A method has been found for producing final polymer A containing the steps
 (A) providing a starting polymer V, wherein the starting polymer V is obtainable by
  radical polymerization of the monomers
  (i) 25 to 90 mol % of a monomer of the formula I

in which $R^1$ denotes H or $C_1$-$C_6$ alkyl,
  (ii) 3 to 65 mol % of a $C_1$-$C_4$ alkyl ester of acrylic acid or of a $C_1$-$C_4$ alkyl ester of methacrylic acid,
  (iii) 1 to 45 mol % of a monoethylenically unsaturated carboxylic acid, a monoethylenically unsaturated sulfonic acid or a monoethylenically unsaturated phosphonic acid, or salt forms thereof,
  (iv) 0 to 35 mol % of one or more ethylenically unsaturated monomers which are different from a monomer (i), (ii) and (iii), wherein the total amount of all monomers (i), (ii), (iii) and (iv) is 100 mol %, and
 (B) hydrolyzing the provided starting polymer V under alkaline conditions to obtain the final polymer A,
  wherein the N—C(=O)$R^1$ groups of the formula (I) of the monomers (i) polymerized into the starting polymer V at least partially hydrolyze to form primary amino groups.

In step (A), the synthetic precursor of the final polymer A is provided with the starting polymer V.

The starting polymer V is obtainable by a radical polymerization of the monomers (i), (ii), (iii) and optionally (iv). Solution, precipitation, inverse suspension or emulsion polymerization are available for the polymerization of the monomers (i), (ii), (iii) and optionally (iv) to the starting polymer V. Preference is given to solution polymerization in aqueous media. Suitable aqueous media are water and mixtures of water and at least one water-miscible solvent, for example, an alcohol. Examples of an alcohol are methanol, ethanol, n-propanol, ethylene glycol or propylene glycol. The polymerization takes place radically, for example, by using radical polymerization initiators, for example, peroxides, hydroperoxides, so-called redox catalysts or radical-decomposing azo compounds. Examples of peroxides are alkali or ammonium peroxydisulfates, diacetyl peroxide, dibenzoyl peroxide, succinyl peroxide, di-tert-butyl peroxide, tert-butyl perbenzoate, tert-butyl perpivalate, tert-butyl peroxy-2-ethylhexanoate, tert-butyl permaleinate, cumene hydroperoxide, diisopropyl peroxydicarbamate, bis-(o-toluoyl) peroxide, didecanoyl peroxide, dioctanoyl peroxide, dilauroyl peroxide, tert-butyl perisobutyrate, tert-butyl peracetate or ditert-amyl peroxide. An example of hydroperoxide is tert-butyl hydroperoxide. Examples of radical decomposing azo compounds are azo-bis-isobutyronitrile, 2,2'-azobis (2-methylpropionamidine) dihydrochloride or 2-2'-azo-bis (2-methyl-butyronitrile). Examples of so-called redox catalysts are ascorbic acid/iron (II) sulfate/sodium peroxodisulfate, tert-butyl hydroperoxide/sodium disulfite, tert-butyl hydroperoxide/sodium hydroxymethanesulfinate or $H_2O_2$/CuI.

The polymerization is carried out, for example, in water or a water-containing mixture as a solvent in a temperature range from 30 to 150° C., preferably 40 to 110° C., which can be performed under ambient pressure, reduced pressure or elevated pressure. A water-soluble polymerization initiator is used, for example, 2,2'-azobis (2-methylpropionamidine) dihydrochloride, for the solution polymerization. The radical polymerization of the monomers is preferably carried out in water or a water-containing solvent mixture. Very preferred is water or a water-containing solvent mixture which contains at least 50% by weight of water, based on the total amount of solvent mixture. Particular preference is given to water or a water-containing solvent mixture which contains at least 80% by weight of water, more preferably at least 90% by weight of water and very particularly preferably at least 95% by weight of water. The polymerization preferably takes place in water or in a water-containing solvent mixture, the pH value of which is above pH=6, very preferably between pH 6.1 and pH 9 and particularly preferably between pH 6.2 and pH 6.8. The setting of a corresponding pH value is possible, for example, via the addition of an acid and/or base, optionally with buffer function.

Preference is given to a method in which the radical polymerization of the monomers is carried out in water or in a water-containing solvent mixture.

Polymerization regulators can be added to the reaction in polymerizing the monomers (i), (ii), (iii) and optionally (iv)

to the starting polymer V. Typically, 0.001 to 5 mol % based on the total amount of all monomers (i), (ii), (iii) and (iv) is used. Polymerization regulators are known from the literature and, for example, sulfur compounds, sodium hypophosphite, formic acid or tribromochloromethane. Specific examples of sulfur compounds are mercaptoethanol, 2-ethylhexyl thioglycolate, thioglycolic acid and dodecylmercaptan.

Preferably, the starting polymer V has a weight-average molecular weight $M_w$ between 75,000 and 5,000,000 daltons. Very preferably, the starting polymer V has a weight-average molecular weight $M_w$ between 100,000 and 4,500,000 daltons, more preferably between 180,000 and 2,500,000 daltons, more preferably between 210,000 and 1,500,000 daltons and very particularly preferably between 250,000 and 1,000,000 daltons. The weight-average molecular weight can be determined by static light scattering, for example, at a pH value of 7.0 in a 0.2 molar $NaNO_3$ solution.

Examples of monomers (i) of the formula I are N-vinylformamide ($R^1$=H), N-vinylacetamide ($R^1$=$C_1$ alkyl), N-vinylpropionamide ($R^1$=$C_2$ alkyl) and N-vinylbutyramide ($R^1$=$C_3$ alkyl). The $C_3$-$C_6$ alkyls can be linear or branched. An example of $C_1$-$C_6$ alkyl is methyl, ethyl, n-propyl, 1-methylethyl, n-butyl, 2-methylpropyl, 3-methylpropyl, 1,1-dimethylethyl, n-pentyl, 2-methylbutyl, 3-methylbutyl, 2,2-dimethylpropyl or n-hexyl. $R^1$ is preferably H or $C_1$-$C_4$ alkyl, very preferably H or $C_1$-$C_2$ alkyl, more preferably H or $C_1$ alkyl and most preferably H, that is, the monomer (i) is N-vinylformamide. A mixture of different monomers of formula I is also encompassed herein as monomer (i) with a monomer of Formula I in single number. The numeric proportion of the monomer with $R^1$=H in the total number of all monomers (i) of the formula I is preferably 85 to 100%, very preferably 90 to 100%, particularly preferably 95 to 100% and very particularly preferably 99 to 100%.

A preferred method is one in which the monomer (i) is N-vinylformamide, that is, $R^1$=H in formula I.

The total amount of all monomers (i) is preferably 30 to 90 mol % based on all monomers polymerized to obtain the starting polymer V, that is, all monomers (i), (ii), (iii) and optionally (iv), more preferably 50 to 89 mol %, particularly preferably 58 to 83 mol %, very particularly preferably 60 to 83 mol % and especially preferably 65 to 80 mol %. The condition remains that the sum of all monomers (i), (ii), (iii) and (iv) yields 100 mol %.

Examples of monomers (ii) are methylacrylate, ethylacrylate, n-propylacrylate, i-propylacrylate, n-butylacrylate, sec-butylacrylate, tert-butylacrylate, methylmethacrylate, ethylmethacrylate, n-propylmethacrylate, i-propylmethacrylate, n-butylmethacrylate, sec-butylmethacrylate and tert-butyl methacrylate. A mixture of different monomers (ii) is also encompassed herein as monomer (ii) with a monomer (ii) in single number. $C_1$-$C_4$ alkyl esters of acrylic acid and $C_1$ alkyl esters of methacrylic acid are preferred, $C_1$-$C_3$ alkyl esters of acrylic acid and $C_1$ alkyl esters of methacrylic acid are particularly preferred, $C_1$-$C_3$ alkyl esters or acrylic acid are more particularly preferred, $C_1$-$C_2$ alkyl esters of acrylic acid are very particularly preferred and $C_2$ alkyl ester of acrylic acid (=ethyl acrylate) is especially preferred. The numeric proportion of the $C_2$ alkyl ester of acrylic acid in the total number of all monomers (ii) is preferably at 30 to 100%, very preferably at 50 to 100%, particularly preferably at 80 to 100% and very particularly preferably at 95 to 100%. A $C_1$-$C_4$ alkyl ester of acrylic acid is preferably present in the case of a $C_1$-$C_4$ alkyl ester of methacrylic acid, more preferably at least numerically a $C_1$-$C_4$ alkyl ester of methacrylic acid to numerically a $C_1$-$C_4$ alkyl ester of methacrylic acid.

Preference is given to a method in which the monomer (ii) is a $C_1$-$C_3$ alkyl ester of acrylic acid or $C_1$ alkyl ester of methacrylic acid.

Preference is given to a method in which the monomer (ii) is a $C_1$-$C_2$ alkyl ester of acrylic acid.

Preferred is a method in which the monomer (ii) is ethyl acrylate.

The total amount of all the monomers (ii) is preferably 3 to 60 mol % based on all monomers polymerized to obtain the starting polymer V, that is, all monomers (i), (ii), optionally (iii) and optionally (iv), more preferably 5 to 45 mol %, particularly preferably 8 to 39 mol %, very particularly preferably 8 to 30 mol %, especially preferably 8 to 25 mol % and most particularly preferably 8 to 21 mol %. The condition remains that the sum of all monomers (i), (ii), (iii), (iv) and (v) yields 100 mol %.

An ethylenically unsaturated monomer herein is a monomer containing at least one $C_2$ unit, the two carbon atoms of which are linked by a carbon-carbon double bond. In the case of hydrogen atoms as the only substituent, this is ethylene. In the case of substitution with 3 hydrogen atoms, a vinyl derivative is present. In the case of substitution with two hydrogen atoms, an E/Z isomer or an ethene-1,1-diyl derivative is present. Monoethylenically unsaturated monomer herein means that exactly one $C_2$ unit is present in the monomer.

In the case of a cationically charged group of a given molecule or a class of molecules, salt form means that a corresponding anion provides charge neutrality. Such anions are, for example, chloride, bromide, hydrogen sulfate, sulfate, hydrogen phosphate, methyl sulfate, acetate or formate. Preference is given to chloride, formate or hydrogen sulfate, particularly preferably chloride or formate. In the case of an anionically charged group of a given compound or class of compounds, salt form means that a corresponding cation provides charge neutrality. Such cations are, for example, cations of the alkali metals, alkaline earth metals, ammonia, alkylamines or alkanolamines. Preferred are $Li^+$, $Na^+$, $K^+$, $Rb^+$, $Cs^+$, $Mg^{2+}$, $Ca^{2+}$, $Sr^{2+}$, $Ba^{2+}$ or $NH_4^+$. Very preferred are $Li^+$, $Na^+$, $K^+$, $Mg^{2+}$, $Ca^{2+}$ or $NH_4^+$, more preferably $Na^+$, $K^+$, $Ca^{2+}$ or $NH_4^+$, very preferably $Na^+$, $K^+$ or $NH_4^+$, especially more preferably $Na^+$ or $K^+$ and most preferably $Na^+$.

The monomer (iii) also comprises a mixture of single monomers falling under the monomer (iii).

Examples of a monomer (iii) which is a monoethylenically unsaturated carboxylic acid or its salt form are monoethylenically unsaturated $C_3$ to $C_8$ mono- or dicarboxylic acids or salt forms thereof. Examples are acrylic acid, sodium acrylate, methacrylic acid, sodium methacrylate, dimethacrylic acid, ethacrylic acid, maleic acid, fumaric acid, itaconic acid, mesaconic acid, citraconic acid, methylenemalonic acid, allylacetic acid, vinylacetic acid or crotonic acid.

Examples of a monomer (iii) which is a monoethylenically unsaturated sulfonic acid or its salt form are vinylsulfonic acid, acrylamido-2-methylpropanesulfonic acid, methacrylamido-2-methylpropanesulfonic acid, allylsulfonic acid, methallylsulfonic acid, sulfoethyl acrylate, sulfoethyl methacrylate, sulfopropyl acrylate, sulfopropyl methacrylate, 2-hydroxy-3-methacryloxypropylsulfonic acid or styrenesulfonic acid.

Examples of a monomer (iii) which is a monoethylenically unsaturated phosphonic acid or its salt form are vinylphosphonic acid, vinylphosphonic acid monomethyl ester, allylphosphonic acid, allyl phosphoric acid monomethyl ester, acrylamidomethylpropylphosphonic acid or acrylamidomethylenephosphonic acid.

The monomer (iii) is preferably a monoethylenically unsaturated carboxylic acid or a monoethylenically unsaturated sulfonic acid, or salt forms thereof. Preferably, the monomer (iii) is a monoethylenically unsaturated $C_3$ to $C_8$ mono- or dicarboxylic acid, a monoethylenically unsaturated sulfonic acid or vinylphosphonic acid or salt forms thereof. Very preferably, the monomer (iii) is a monoethylenically unsaturated $C_3$ to $C_8$ mono- or dicarboxylic acid, vinylsulfonic acid, acrylamido-2-methylpropanesulfonic acid, methacrylamido-2-methylpropanesulfonic acid or vinylphosphonic acid, or salt forms thereof. Particularly preferred is a monoethylenically unsaturated $C_3$ to $C_8$ mono- or dicarboxylic acid or salt forms thereof. Particularly preferred is acrylic acid, methacrylic acid, vinylsulfonic acid or acrylamido-2-methyl-propanesulfonic acid or salt forms thereof. Especially preferred is acrylic acid or methacrylic acid or salt forms thereof. Especially preferred is acrylic acid, sodium acrylate, methacrylic acid or sodium methacrylate. The numeric proportion of the acrylic acid and the methacrylic acid or salt forms thereof in the total number of all monomers (iii) is preferably at 30 to 100%, very preferably at 50 to 100%, particularly preferably at 80 to 100% and very particularly preferably at 95 to 100%.

Preferred is a method in which the monomer (iii) is a monoethylenically unsaturated carboxylic acid or a monoethylenically unsaturated sulfonic acid, or salt forms thereof.

Preferred is a method in which the monomer (iii) is acrylic acid, methacrylic acid, vinylsulfonic acid or 2-acrylamido-2-methylpropanesulfonic acid or salt forms thereof.

The total amount of all monomers (iii) is preferably 1 to 40 mol %, based on all monomers polymerized to obtain the starting polymer V, that is, all monomers (i), (ii), (iii) and optionally (iv), very preferably 1 to 30 mol %, particularly preferably 1 to 25 mol %, particularly preferably 2 to 25 mol %, very particularly preferably 2 to 23 mol %, expressly preferably 3 to 21 mol % and most particularly preferably 5 to 18 mol %. The condition remains that the sum of all monomers (i), (ii), (iii) and (iv) yields 100 mol %.

Preferred is a method in which the monomer (iii) is used in an amount of 1 to 25 mol %.

Preferred is a method in which the monomer (iii) is used in an amount of 3 to 25 mol %.

The monomer (iv) also comprises a mixture of single monomers falling under the monomer (iv).

Examples of monomers (iv) are
(iv-1) a monoethylenically unsaturated monomer which carries no charge at pH=7,
(iv-2) a double ethylenically unsaturated monomer which carries no charge at pH=7 and the two ethylenic double bonds of which are conjugated,
(iv-3) a monoethylenically unsaturated monomer carrying at least one primary, secondary or tertiary amino group carrying a positive charge at pH=7 or salt form thereof,
(iv-4) a di-allyl-substituted amine the nitrogen atom of which is not quaternized,
(iv-5) a monoethylenically unsaturated monomer carrying at least one permanent positive charge,
(iv-6) a monomer which has at least two ethylenically unsaturated double bonds which are not conjugated and which is different from a di-allyl-substituted amine.

For monomers (iv) carrying a charge, their salt form is also meant and encompassed accordingly. A permanently positive charge is always a positive charge regardless of the pH value.

Examples of a monomer (iv-1) are monoesters of $\alpha,\beta$-ethylenically unsaturated monocarboxylic acids with $C_5$-$C_{18}$ alkanols, monoesters of $\alpha,\beta$-ethylenically unsaturated monocarboxylic acids with $C_2$-$C_{18}$ alkanediols, diesters of $\alpha,\beta$-ethylenically unsaturated dicarboxylic acids with $C_1$-$C_{18}$ alkanols or $C_2$-$C_{18}$ alkanediols, primary amides of $\alpha,\beta$-ethylenically unsaturated monocarboxylic acids, N-alkylamides of $\alpha,\beta$-ethylenically unsaturated monocarboxylic acids, N,N-dialkylamides of $\alpha,\beta$-ethylenically unsaturated monocarboxylic acids, nitriles of $\alpha,\beta$-ethylenically unsaturated monocarboxylic acids, dinitriles of $\alpha,\beta$-ethylenically unsaturated dicarboxylic acids, esters of vinyl alcohol with $C_1$-$C_{18}$ monocarboxylic acids, esters of allyl alcohol with $C_1$-$C_{30}$ monocarboxylic acids, N-vinyllactams, nitrogen-free heterocycles having an $\alpha,\beta$-ethylenically unsaturated double bond, vinylaromatics, vinyl halides, vinylidene halides or $C_2$-$C_8$ monoolefins.

Monoesters of $\alpha,\beta$-ethylenically unsaturated monocarboxylic acids with $C_5$-$C_{18}$ alkanols are, for example, n-hexyl acrylate, n-hexyl methacrylate, n-octyl acrylate, n-octyl methacrylate, 1,1,3,3-tetramethylbutyl acrylate, 1,1,3,3-tetramethylbutyl methacrylate or 2-ethylhexyl acrylate.

Monoesters of $\alpha,\beta$-ethylenically unsaturated monocarboxylic acids with $C_2$-$C_{18}$ alkanediols are, for example, 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate or 6-hydroxyhexyl methacrylate.

Primary amides of $\alpha,\beta$-ethylenically unsaturated monocarboxylic acids are, for example, acrylamide or methacrylamide.

N-alkylamides of $\alpha,\beta$-ethylenically unsaturated monocarboxylic acids are, for example, N-methylacrylamide, N-methylmethacrylamide, N-isopropylacrylamide, N-isopropylmethacrylamide, N-ethylacrylamide, N-ethylmethacrylamide, N-(n-propyl) acrylamide, N-(n-propyl) methacrylamide, N-(n-butyl) acrylamide, N-(n-butyl) methacrylamide, N-(tert-butyl) acrylamide, N-(tert-butyl) methacrylamide, N-(n-octyl) acrylamide, N-(n-octyl) methacrylamide, N-(1,1,3,3-tetramethylbutyl) acrylamide, N-(1,1,3,3-tetramethylbutyl) methacrylamide, N-(2-ethylhexyl) acrylamide or N-(2-ethylhexyl) methacrylamid.

N,N-dialkylamides of $\alpha,\beta$-ethylenically unsaturated monocarboxylic acids are, for example, N,N-dimethylacrylamide or N,N-dimethylmethacrylamide.

Nitriles of $\alpha,\beta$-ethylenically unsaturated monocarboxylic acids are, for example, acrylonitrile or methacrylonitrile.

Esters of vinyl alcohol with $C_1$-$C_{30}$ monocarboxylic acids are, for example, vinyl formate, vinyl acetate or vinyl propionate.

N-vinyllactams are, for example, N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam or N-vinyl-7-ethyl-2-caprolactam.

Vinylaromatics are, for example, styrene or methylstyrene. Vinyl halides are, for example, vinyl chloride or vinyl fluoride. Vinylidene halides are, for example, vinylidene chloride or vinylidene fluoride. $C_2$-$C_8$ monoolefins are, for example, ethylene, propylene, isobutylene, 1-butene, 1-hexene or 1-octene.

Preferred as monomer (iv-1) is 2-hydroxyethyl acrylate, 2-hydroxyethyl methacrylate, 2-hydroxyethyl ethacrylate, 2-hydroxypropyl acrylate, 2-hydroxypropyl methacrylate, vinyl pyrrolidone or vinyl acetate.

Examples of a monomer (iv-2) are $C_4$-$C_{10}$ olefins having exactly two double bonds which are conjugated, for example, butadiene or isoprene.

Examples of a monomer (iv-3) are esters of α,β-ethylenically unsaturated monocarboxylic acids with aminoalcohols, mono- and diesters of α,β-ethylenically unsaturated dicarboxylic acids with aminoalcohols, amides of α,β-ethylenically unsaturated monocarboxylic acids with dialkylated diamines, N-vinylimidazole or vinylpyridine.

The acid component is preferably acrylic acid or methacrylic acid in the esters of α,βethylenically unsaturated monocarboxylic acids with aminoalcohols. The amino alcohols, preferably $C_2$-$C_{12}$ amino alcohols, can be $C_1$-$C_8$ mono- or $C_1$-$C_8$ dialkylated on the amine nitrogen. Examples are dialkylaminoethyl acrylates, dialkylaminoethyl methacrylates, dialkylaminopropyl acrylates or dialkylaminopropyl methacrylates. Individual examples are N-methylaminoethyl acrylate, N-methylaminoethyl methacrylate, N,N-dimethylaminoethyl acrylate, N,N-dimethylaminoethyl methacrylate, N,N-diethylaminoethyl acrylate, N,N-diethylaminoethyl methacrylate, N,N-dimethylaminopropyl acrylate, N,N-dimethylaminopropyl methacrylate, N,N-diethylaminopropyl acrylate, N,N-diethylaminopropyl methacrylate, N,N-dimethylaminocyclohexyl acrylate or N,N-dimethylaminocyclohexyl methacrylate.

In the mono- and diesters of α,β-ethylenically unsaturated dicarboxylic acids with amino alcohols, the acid component is preferably fumaric acid, maleic acid, monobutyl maleate, itaconic acid or crotonic acid. The amino alcohols, preferably $C_2$-$C_{12}$ amino alcohols, can be $C_1$-$C_8$ mono- or $C_1$-$C_8$ dialkylated on the amine nitrogen.

Amides of α,β-ethylenically unsaturated monocarboxylic acids with dialkylated diamines are, for example, dialkylaminoethylacrylamides, dialkylaminoethylmethacrylamides, dialkylaminopropylacrylamides or dialkylaminopropylacrylamides. Individual examples are N-[2-(dimethylamino) ethyl] acrylamide, N-[2-(dimethylamino) ethyl] methacrylamide, N-[3-(dimethylamino) propyl]acrylamide, N-[3-(dimethylamino) propyl] methacrylamide, N-[4-(dimethylamino) butyl] acrylamide, N-[4-(dimethylamino) butyl] methacrylamide, N-[2-(diethylamino) ethyl] acrylamide or N-[2-(diethylamino) ethyl] methacrylamide.

Examples of a monomer (iv-4) are diallylamine or methyldiallylamine.

Examples of a monomer (iv-5) are diallylamines quaternized on the nitrogen atom, a salt form of an N-alkyl-N'-vinylimidazolium, a salt form of an N-alkylated vinylpyridinium, a salt form of an acrylamidoalkyltrialkylammonium or a salt form of a methacrylamidoalkyltrialkylammonium. A diallylamine quaternized on the nitrogen atom is, for example, diallyldimethylammonium chloride, diallyldiethylammonium chloride, diallyldipropylammonium chloride or diallyldibutylammonium chloride. A salt form of an N-alkyl-N'-vinylimidazolium is, for example, 1-methyl-3-vinylimidazol-1-ium chloride, 1-methyl-3-vinyl-imidazol-1-ium methylsulfate or 1-ethyl-3-vinylimidazole-1-ium chloride. A salt form of an N-alkylated vinylpyridinium is, for example, 1-methyl-4-vinylpyridine-1-ium chloride, 1-methyl-3-vinylpyridine-1-ium chloride, 1-methyl-2-vinylpyridine-1-ium chloride or 1-ethyl-4-vinyl-pyridine-1-ium chloride. A salt form of an acrylamidoalkyltrialkylammonium is, for example, acrylamidoethyltrimethylammonium chloride (trimethyl-[2-(prop-2-enoylamino) ethyl] ammonium chloride), acrylamidoethyldiethylmethylammonium chloride (diethylmethyl-[3-(prop-2-enoylamino) ethyl] ammonium chloride), acrylamidopropyltrimethylammonium chloride (trimethyl-[3-(prop-2-enoylamino) propyl] ammonium chloride) or acrylamidopropyldiethylmethylammonium chloride (diethylmethyl-[3-(prop-2-enoylamino) propyl]ammonium chloride). A salt form of a methacrylamidoalkyltrialkylammonium is, for example, methacrylamidoethyltrimethylammonium chloride (trimethyl-[2-(2-methylprop-2-enoylamino) ethyl] ammonium chloride), methacrylamidoethyldiethylmethyl ammonium chloride (diethylmethyl-[3-(2-methylprop-2-enoylamino) ethyl] ammonium chloride), methacrylamidopropyltrimethyl ammonium chloride (trimethyl-[3-(2-methylprop-2-enoylamino) propyl] ammonium chloride) or methacrylamidopropyldiethylmethyl ammonium chloride (diethylmethyl-[3-(2-methylprop-2-enoylamino) propyl] ammonium chloride).

An example of a monomer (iv-6) are tetraallylammonium chloride, triallylamine, methylenebisacrylamide, glycol diacrylate, glycol dimethacrylate, glycerol triacrylate, pentaerythritol triallyl ether, N,N-divinylethyleneurea, polyalkylene glycols esterified at least twice with acrylic acid and/or methacrylic acid or polyols such as pentaerythritol, sorbitol and glucose.

Preferred is a monomer (iv) which is not an ester of acrylic acid or methacrylic acid. Very preferred is a monomer (iv) which is not an ester of an ethylenically unsaturated carboxylic acid.

The numeric proportion of the monomers (iv-1) is preferably at 50 to 100% of the total number of all monomers (iv). Particularly preferred are 80 to 100% and most preferred 95 to 100%. Especially preferred are the monomers (iv-1) for the aforementioned proportions of the total number of all monomers (iv) 2-hydroxyethyl acrylate, 2-hydroxyethyl methacrylate, 2-hydroxyethyl methacrylate, 2-hydroxypropyl acrylate, 2-hydroxypropyl methacrylate, vinylpyrrolidone or vinyl acetate.

Preferably, the numeric proportion of monomers (iv-3), (iv-4) and (iv-5) is at 50 to 100% of the total number of all monomers (iv). Particularly preferred are 80 to 100% and most preferred 95 to 100%.

Preferably, the numeric proportion of monomers (iv-4) and (iv-5) is at 50 to 100% of the total number of all monomers (iv). Particularly preferred are 80 to 100% and most preferred 95 to 100%.

The total amount of all monomers (iv) is preferably 0 to 25 mol %, based on all monomers polymerized to obtain the starting polymer V, that is, all monomers (i), (ii), (iii) and optionally (iv), very preferably 0 to 24 mol %, particularly preferably 0 to 19 mol %, more particularly preferably 0.01 to 15 mol %, very particularly preferably 0.1 to 8 mol %, expressly preferably 0.2 to 4 mol % and most particularly preferably 0.4 to 2 mol %. The condition remains that the sum of all monomers (i), (ii), (iii) and (iv) yields 100 mol %.

In the case of acrylamide as a representative of a monomer (iv-1), the amount of acrylamide is preferably 0 to 6 mol %, wherein the molar percent is based on the total number of all monomers (i), (ii), (iii) and (iv) and the total number of all monomers is 100 mol %. Very preferably, the amount of acrylamide is 0 to 5 mol %, particularly preferably 0 to 3 mol %, very particularly preferably 0 to 2 mol %, especially preferably 0 to 1 mol % and expressly preferably no acrylamide is present.

Preferably, a method in which the monomers (v) comprise an amount of 0 to 6 mol % of acrylamide, the molar percent is based on the total number of all monomers (i), (ii), (iii), (iv) and (v) and the total number of all monomers is 100 mol %.

In the case of acrylonitrile or methacrylonitrile as a representative of a monomer (iv-1), the total amount of acrylonitrile and methacrylonitrile is preferably 0 to 9 mol %, wherein the molar percent is based on the total number of all monomers (i), (ii), (iii) and (iv) and the total number of all monomers is 100 mol %. The total amount of acrylonitrile and methacrylonitrile is very preferably 0 to 7 mol %, particularly preferably 0 to 5 mol %, very particularly preferably 0 to 3 mol %, especially preferably 0.5 to 2 mol % and most particularly preferably 1 to 1.5 mol %.

A monomer (iv-6) acts as a crosslinker. If a crosslinker is used, an amount used is preferably 0.001 to 1 mol % based on the total number of all monomers (i), (ii), (iii) and (iv) and the total number of all monomers is 100 mol %, more preferably 0.01 to 0.5 mol % and particularly preferably 0.015 to 0.1 mol %. Preferably, no monomer (iv-6) is used for the radical polymerization.

The starting polymer V is preferably present as an aqueous dispersion or solution. Very preferably, the water content of the aqueous dispersion or solution is 75 to 95% by weight and the content of starting polymer V 5 to 25% by weight, wherein the content of starting polymer V is determined as a solid content. The determination of the solid content is described in the experimental part. The aqueous dispersion or solution preferably has a pH value of above 6, very preferably between pH 6.1 and pH 9 and particularly preferably between pH 6.2 and pH 6.8.

The setting of a corresponding pH value is possible, for example, via the addition of an acid and/or base, optionally with buffer function.

Preferred is a method in which for the radical polymerization
(i) 30 to 89 mol % of a monomer of the formula I,
(ii) 5 to 60 mol % of a $C_1$-$C_4$ alkyl ester of acrylic acid or of a $C_1$-$C_4$ alkyl ester of methacrylic acid,
(iii) 1 to 30 mol % of a monoethylenically unsaturated carboxylic acid, a monoethylenically unsaturated sulfonic acid or a monoethylenically unsaturated phosphonic acid, or salt forms thereof,
(iv) 0 to 25 mol % of one or more ethylenically unsaturated monomers which are different from a monomer (i), (ii) and (iii),
are used.

Preferred is a method in which for the radical polymerization, the monomers
(i) 50 to 89 mol % of a monomer of the formula I,
(ii) 5 to 45 mol % of a $C_1$-$C_4$ alkyl ester of acrylic acid or of a $C_1$-$C_4$ alkyl ester of methacrylic acid,
(iii) 0 to 30 mol % of a monoethylenically unsaturated carboxylic acid, a monoethylenically unsaturated sulfonic acid or a monoethylenically unsaturated phosphonic acid, or salt forms thereof,
(iv) 0 to 25 mol % of one or more ethylenically unsaturated monomers which are different from a monomer (i), (ii) and (iii),
are used.

Preferred is a method, in which for the radical polymerization, the monomers
(i) 58 to 83 mol % of a monomer of the formula I,
(ii) 8 to 39 mol % of a $C_1$-$C_4$ alkyl ester of acrylic acid or of a $C_1$-$C_4$ alkyl ester of methacrylic acid,
(iii) 0 to 25 mol % of a monoethylenically unsaturated carboxylic acid, a monoethylenically unsaturated sulfonic acid or a monoethylenically unsaturated phosphonic acid, or salt forms thereof,
(iv) 0 to 25 mol % of one or more ethylenically unsaturated monomers which are different from a monomer (i), (ii) and (iii),
are used.

Preferred is a method, in which for the radical polymerization, the monomers
(i) 60 to 83 mol % of N-vinylformamide,
(ii) 8 to 25 mol % ethyl acrylate,
(iii) 3 to 21 mol % of acrylic acid or methacrylic acid or salt forms thereof,
(iv) 0 to 24 mol % of one or more ethylenically unsaturated monomers which are different from a monomer (i), (ii) and (iii),
are used.

Preferred is a method, in which for the radical polymerization, the monomers
(i) 60 to 83 mol % of N-vinylformamide,
(ii) 8 to 21 mol % ethyl acrylate,
(iii) 3 to 21 mol % of acrylic acid or methacrylic acid or salt forms thereof,
(iv) 0 to 24 mol % of one or more ethylenically unsaturated monomers which are different from a monomer (i), (ii) and (iii),
are used.

In step (B), the final polymer A is obtained by partially or completely hydrolyzing the starting polymer V. As is known, thus, for example, in EP 0438744 A1, page 8/lines 26 to 34, the amide group of the units of the monomers (i) can be polymerized into the starting polymer V, that is, the N—C(=O)R$^1$ group in the formula (I), at least partially hydrolyzing to form primary amino groups. Cleavage of a carboxylic acid, for example, formic acid or formate in the case of R$^1$=H, leads to the formation of a primary amino group. If not all of the amide groups are hydrolyzed, it is known that the formation of a cyclic, six-membered amidine in the final polymer A is possible by condensation of the primary amino group with an adjacent amide group according to the following reaction scheme.

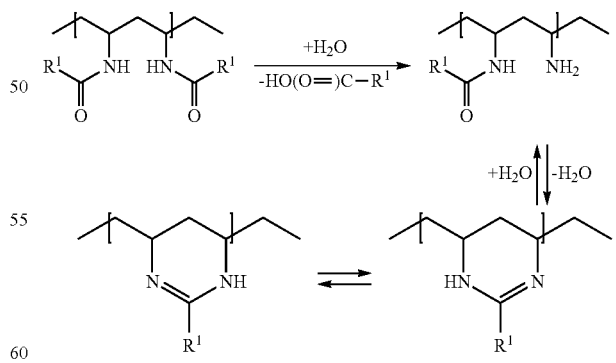

In the case of polymerization of ethylene derivatives directly substituted on the ethylene function by cyanogen, for example, acrylonitrile, the starting polymer V additionally contains cyano groups. The primary amino group formed by hydrolysis in the final polymer A can be known to react with one of these cyano groups to form a cyclic, 5-membered amidine. In this respect, the hydrolysis of an amide group in this case leads to a five-membered amidine group on the final polymer A according to the following reaction scheme. The cyan-substituted ethylene derivative is acrylonitrile polymerized into the reaction scheme.

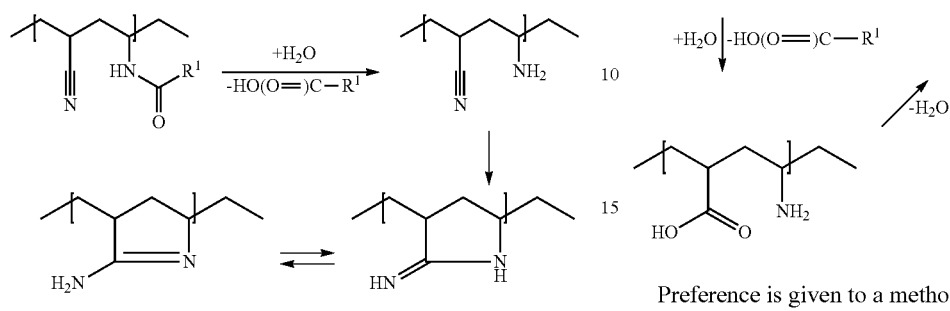

In both illustrated cases, the hydrolysis of an amide group derived from a monomer of formula I results in a primary amino group or an amidine group. A primary amino group or an amidine group is positively charged at pH=7 and corresponds to a cationic charge in the final polymer A.

The conditions for hydrolysis of the amide groups in the final polymer A, which result from monomers of the formula I, can also lead to the hydrolysis of other groups in the starting polymer V which are sensitive to hydrolysis under these conditions. In a manner known, for example, in EP 0216387 A2, column 6/lines 7 to 43, or in WO 2016/001016 A1, page 17/lines 1 to 8, acetate groups hydrolyze in starting polymer V which result from vinyl acetate as polymerized monomer (v-1). Accordingly, a secondary hydroxy group is formed in the final polymer A as shown below.

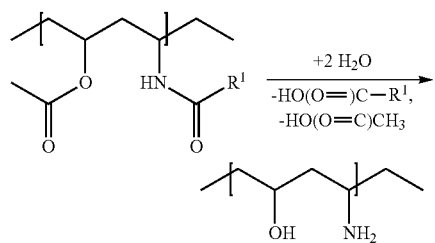

Monomers (ii) cause ester groups to be present in the starting polymer V. For example, an at least partial reaction of the ester groups is observed under the basic conditions for the hydrolysis of the amide groups in the final polymer A, which result from monomers of the formula I. One reaction is the formation of a five-membered lactam structural unit with an obtained amino group. Another reaction is the formation of a carboxylic acid group. The following reaction scheme shows some reaction pathways.

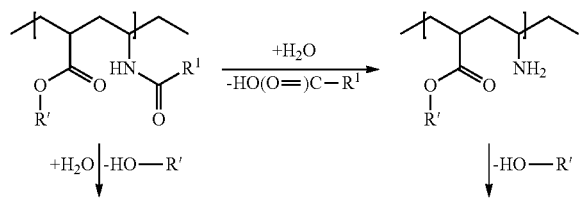

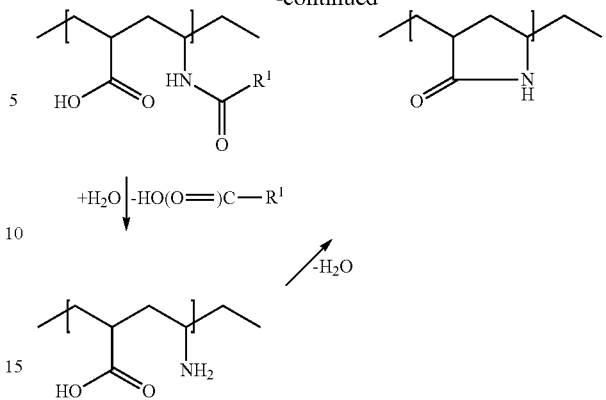

Preference is given to a method in which the ester groups of the monomers (ii) polymerized into the starting polymer V react at least partially and at least part of the reaction is the formation of five-membered lactam structural units with the obtained primary amino groups or the formation of carboxylic acid groups or salt forms thereof.

The number of units of monomers of the formula (I) polymerized into the starting polymer V that are hydrolyzed in the final polymer A can be experimentally determined by quantitative detection of carboxylic acids $HOC(=O)R^1$ split off from the groups $N-C(=O)R^1$. In the case of $R^1=H$, the amount released and formic acid or formate can be determined, for example, enzymatically with the aid of a test kit from Boehringer Mannheim. The number of hydrolyzed $N-C(=O)R^1$ groups from the polymerized units of the formula I based on all polymerized units of the formula I gives 100 mol % multiplied by the degree of hydrolysis (=HA). At least 50 to 100 mol % of the monomers (i) polymerized into the starting polymer V are preferably hydrolyzed, based on the number of all monomers (i) polymerized into the starting polymer V. Very preferably, at least 65 to 100% are hydrolyzed, especially 70 to 100%, more particularly 72 to 100%, especially preferably 85 to 99.9%, very especially preferably 94 to 99.5% and expressly preferably 94 to 99%.

Preference is given to a method in which at least 50 to 100% of the monomers (i) polymerized into the starting polymer V are hydrolyzed, based on the number of all monomers (i) polymerized into the starting polymer V.

Preference is given to a method in which at least 70 and at most 99.5% of the polymerized monomers (i) are hydrolyzed, based on the number of all monomers (i) polymerized into the starting polymer V.

The number of units of the monomers (ii) polymerized into the starting polymer V, which are reacted in the final polymer A, can be determined experimentally by quantitative detection of the alcohols split off from the ester groups. Gas chromatography or high-pressure liquid chromatography is suitable for the quantitative detection of the split-off alcohol. The number of reacted ester groups from the polymerized monomers (ii) based on all polymerized monomers (ii) gives the degree of reaction (=HE) multiplied by 100 mol %. At least 50 to 100 mol % of the monomers (ii) polymerized into the starting polymer V are preferably reacted, based on the number of all monomers (ii) polymerized into the starting polymer V. Very preferably, at least 70 to 100% are reacted, especially 86 to 100%, more particularly 90 to 100%, especially preferably 95 to 99.9%, very especially preferably 98 to 99.5% and expressly preferably 100%.

Preference is given to a method in which at least 50 to 100% of the monomers (ii) polymerized into the starting polymer V are reacted, based on the number of all monomers (ii) polymerized into the starting polymer V.

Preference is given to a method in which at least 90 and at most 99.5% of the polymerized monomers (ii) are reacted, based on the number of all monomers (ii) polymerized into the starting polymer V.

Preference is given to a method in which at least 70 to 100% of the monomers (i) polymerized into the starting polymer V are hydrolyzed, based on the number of all monomers (i) polymerized into the starting polymer V and at least 90 to 100% of the monomers (ii) polymerized into the starting polymer V are reacted based on the number of all monomers (ii) polymerized into the starting polymer V.

The hydrolysis of the starting polymer V is alkaline. The achieved degree of hydrolysis (=HA) and the achieved degree of reaction (=HE) are dependent on the base used, the amount of base used, on the applied temperature and on the reaction time. The hydrolysis is preferably carried out at temperatures of 20 to 170° C., very preferably in the range of 50 to 140° C. The hydrolysis can be carried out at atmospheric pressure, under reduced pressure or under elevated pressure, that is, in the range of 100 mbar to 16 bar. Preference is given to hydrolysis at atmospheric pressure. Metal hydroxides of the first and second main group of the periodic table of the elements, for example, lithium hydroxide, sodium hydroxide, potassium hydroxide, magnesium hydroxide or calcium hydroxide, and ammonia and derivatives of ammonia, for example triethylamine, monoethanolamine, diethanolamine, triethanolamine or morpholine are suitable as a base for the alkaline hydrolysis. Preference is given to metal hydroxides of the first and second main groups of the periodic table of the elements, further preference is given to sodium hydroxide, potassium hydroxide, magnesium hydroxide or calcium hydroxide, more preferably sodium hydroxide or potassium hydroxide and very particularly sodium hydroxide. 0.2 to 2.0 equivalents of the base are preferably used based on the sum of the molar proportions of N-vinylamides and (meth) acrylic acid esters in the starting polymer V. Most preferred are 0.5 to 1.5 equivalents, and more preferably 0.7 to 1.2 equivalents. Preferably, a base is added numerically in an amount to the starting polymer V, which corresponds to between 30 and 150 mol % of number of monomers (i) polymerized into the starting polymer V. Very preferably, the amount is between 90 and 150 mol %, particularly preferably between 100 and 140 mol %, and very particularly preferably between 110 and 130 mol %. Preferably, a base is added in an amount of 30 to 130 mol % based on all monomers (i), (ii), (iii) and (iv). The hydrolysis is preferably carried out in an aqueous solution, very preferably in an aqueous solution having a water content of between 40 and 95% by weight, based on the total weight of the aqueous solution, more preferably between 60 and 94% by weight and most preferably between 75 and 93% by weight.

Preference is given to a method in which in step (B) a base in a numerical amount which corresponds to between 30 and 150 mol % of the number of monomers (i) polymerized into starting polymer V is used.

It has surprisingly been found that the starting polymer V has an advantageous property in alkaline hydrolysis due to the monomer (iii). This advantage is particularly relevant in a large-scale production of the final polymer A by alkaline hydrolysis of a starting polymer V. In the case of an alkaline hydrolysis to the final polymer A, an avoidance or at least a damping of an occurring viscosity peak during the alkaline hydrolysis is evident. The occurrence, damping or avoidance of the viscosity peak is described in FIG. 1 and in Table A-4-1 of the example part. The observation of a reduced or even inverted spout on the stirrer shaft during the hydrolysis experiments of the example part serves as an indicator of the occurrence of a viscosity peak and its quantitative classification. The ratings none, minimal, low and moderate in the example part are herein considered to be an intermediate increase in viscosity still acceptable and manageable in a scale-up production. Preferably, the classification is none, minimal and low and most preferably none and minimal.

In step (B), the ester groups of the monomers (ii) polymerized into the starting polymer V are preferably at least partially reacted, and at least part of the reaction is the formation of five-membered lactam structural units with the obtained primary amino groups or the formation of carboxylic acid groups or salt forms thereof. Very preferably, the ester groups of the monomers (ii) polymerized into the starting polymer V are at least partly reacted in step (B) and at least part of the reaction is the formation of five-membered lactam structural units with the obtained primary amino groups. The final polymer A thus preferably contains five-membered lactam structural units. The structural units of the final polymer A are, on the one hand, all the monomers (i), (ii), (iii) and optionally (iv) polymerized into the starting polymer V. Furthermore, it is also the structural units which can be obtained by hydrolyzing. These include the aforementioned six-membered amidines, the aforementioned five-membered amidines, the aforementioned ethylene units with secondary hydroxyl groups, the aforementioned five-membered lactams and the aforementioned esters of acrylic acid or methacrylic acid hydrolyzed to the carboxylic acid. Two polymerized monomers of the starting polymer V are consumed for individuals of these structural units. Therefore, the total number of all structural units of the final polymer A is that of the total of all the monomers (i), (ii), (iii) and (iv) polymerized to the starting polymer V minus a correction number for those structural units which are formed from two polymerized monomers. By way of example, this is shown below by the formula (II).

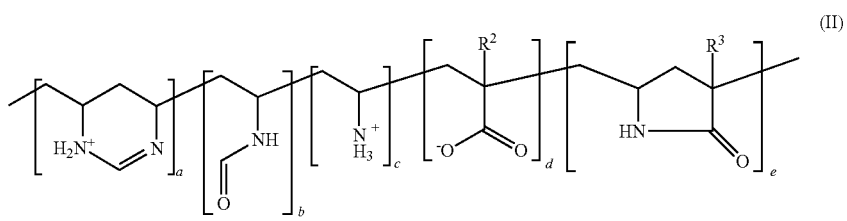

(II)

where $R^2$=H or $C_1$ alkyl and $R^3$=H or $C_1$ alkyl, a, b, c, d and e are the mole percentage proportion (=mol %) of the respective structural unit, f is the mole percent proportion (=mol %) of at least one polymerized further structural unit (not shown in formula (II)), and the sum of a, b, c, d, e and f is 100 mol %.

Preference is given to a final polymer A of the formula (II). Very preferred is a final polymer A having formula (II) wherein in formula (II) a is 0.1 to 20 mol %, b is 0 to 20 mol %, c is 25 to 85 mol %, d is 1 to 50 mol %, e is 1 to 50 mol % and f is 0 to 40 mol %, and wherein the sum of all the structural units a, b, c, d, e and f is 100 mol %. In formula (II), a is particularly preferably 0.1 to 20 mol %, b is 0 to 20 mol %, c is 25 to 85 mol %, d is 1 to 50 mol % and e is 1 to 50 mol %, wherein the sum of all structural units a, b, c, d and e is 100 mol %. Very preferably in formula (II), $R^2$=$R^3$=H, a is 0.1 to 20 mol %, b is 0 to 20 mol %, c is 25 to 85 mol %, d is 1 to 50 mol %, e is 1 to 50 mol % and any other structural units thereof f is 0 to 40 mol %, wherein the sum of all structural units a, b, c, d, e and f is 100 mol %. In formula (II) $R^2$=$R^3$=H, a is particularly preferably 0.1 to 20 mol %, b is 0 to 20 mol %, c is 25 to 85 mol %, d is 1 to 50 mol % and e is 1 to 50 mol %, wherein the sum of all structural units a, b, c, d and e is 100 mol %.

The content of lactam structural units is very preferably 10 to 60 mol %, wherein the percentage is based on the total number of structural units of the final polymer A. The content is particularly preferably 15 to 50 mol %, very particularly preferably 17 to 35 mol %. Especially preferably, the aforementioned contents for a final polymer A in an aqueous environment apply at a pH value of 3.5 to 9 and expressly at a pH value of 3.5.

Preference is given to a method in which, in step (B), the ester groups of the monomers (ii) polymerized into the starting polymer V are at least partially reacted and at least part of the reaction is the formation of five-membered lactam structural units with the obtained primary amino groups.

Preferably, the final polymer A has a weight-average molecular weight $M_w$ of between 8,000 and 8,000,000 daltons. Very preferably, the final polymer A has a weight-average molecular weight $M_w$ between 16,000 and 4,000,000 daltons, more preferably between 80,000 and 36,000,000 daltons, most preferably between 150,000 and 2,000,000 daltons, and especially preferably between 170,000 and 1,200,000 daltons. The weight-average molecular weight can be determined by static light scattering.

Preferably, the final polymer A is cationic, very preferably amphoteric cationic. The final polymer A is cationic when the total number of all positive charges in the final polymer A is greater than the total number of all negative charges in the final polymer A at the present pH value, preferably at a pH value of 7. The corresponding charge-carrying structural units with their charge at a formal pH value of 7 are considered for this purpose. The final polymer A is amphoteric cationic when the total number of all positive charges in the final polymer A is greater than the total number of negative charges in the final polymer A and at the same time negative charges in the final polymer A are present at the present pH value, preferably at a pH value of 7. This is also the case when considering the charge-carrying structural units at a formal pH value of 7. The number of monomers (i) polymerized into the starting polymer V and their degree of hydrolysis in the final polymer A are the most important possibility for generating positive charges in the final polymer A. In addition, there is the possibility that monomers (iv) introduce a positive charge into the starting polymer V and this positive charge is still present in the final polymer A even after hydrolysis to the final polymer A.

Preferably, the final polymer A has a positive charge density. The charge density is very preferably determined by polyelectrolyte titration with potassium polyvinyl sulfonate. The charge density is very preferably determined at a pH value of 3.5 in an aqueous environment. The charge density is particularly preferably determined by polyelectrolyte titration with potassium polyvinyl sulfonate at a pH value of 3.5 in an aqueous environment. The positive charge density is preferably between 2 and 16 mmol/g, wherein 1 g refers to the polymer content of the final polymer A. Very preferred is 4 to 14 mmol/g, more preferably 5 to 12 mmol/g.

The final polymer A is preferably present as an aqueous dispersion or solution. Very preferably, the water content of the aqueous dispersion or solution is 75 to 95% by weight and the content of final polymer A is 5 to 25% by weight, wherein the content of final polymer A is determined as the polymer content. Preferably, the aqueous dispersion or solution has a pH value of above 5, more preferably between pH 6 and 9, more preferably between pH 6 and 8, and most preferably between pH 6.1 and 6.8. The setting of a corresponding pH value is possible, for example, via the addition of an acid or base. The positive charge density of the final polymer A, which is present as an aqueous dispersion or solution, is preferably between 20 and 120 mmol/100 g, wherein the 100 g relates to aqueous dispersion or solution of the final polymer A. Very preferred is 30 to 100 mmol/100 g, more preferably 35 to 90 mmol/100 g.

The preferences for the method for producing final polymer A also apply to the further subjects of the invention.

A further subject of the invention is a starting polymer V, which is obtainable by radical polymerization of the monomers (i) 25 to 90 mol % of a monomer of the formula I

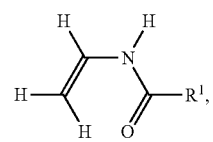

in which $R^1$ denotes H or $C_1$-$C_6$ alkyl, (ii) 3 to 65 mol % of a $C_1$-$C_4$ alkyl ester of acrylic acid or of a $C_1$-$C_4$ alkyl ester of methacrylic acid, (iii) 1 to 45 mol % of a monoethylenically unsaturated carboxylic acid, a monoethylenically unsaturated sulfonic acid or a monoethylenically unsaturated phosphonic acid, or salt forms thereof, (iv) 0 to 35 mol % of one or more ethylenically unsaturated monomers which are different from a monomer (i), (ii) and (iii), wherein the total amount of all monomers (i), (ii), (iii) and (iv) is 100 mol %.

A further subject of the invention is a method for producing starting polymer V, containing the step
(AB) free radical polymerization of the monomers
(i) 25 to 90 mol % of a monomer of the formula I

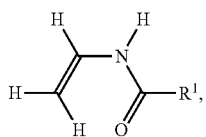

in which $R^1$ denotes H or $C_1$-$C_6$ alkyl,
(ii) 3 to 65 mol % of a $C_1$-$C_4$ alkyl ester of acrylic acid or of a $C_1$-$C_4$ alkyl ester of methacrylic acid,
(iii) 1 to 45 mol % of a monoethylenically unsaturated carboxylic acid, a monoethylenically unsaturated sulfonic acid or a monoethylenically unsaturated phosphonic acid, or salt forms thereof,
(iv) 0 to 35 mol % of one or more ethylenically unsaturated monomers which are different from a monomer (i), (ii) and (iii),
wherein the total amount of all monomers (i), (ii), (iii) and (iv) is 100 mol %.
to obtain the starting polymer V.

A final polymer A is obtainable through the method for producing a final polymer A.

A further subject of the invention is a final polymer A which is obtainable by the aforementioned method for producing final polymer A.

Preferred is an end polymer A obtainable by
(A) providing a starting polymer V, wherein the starting polymer V is obtainable by
radical polymerization of the monomers
(i) 58 to 83 mol % of a monomer of the formula I

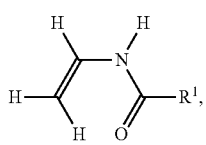

in which $R^1$ denotes H or $C_1$-$C_6$ alkyl,
(ii) 8 to 39 mol % of a $C_1$-$C_4$ alkyl ester of acrylic acid or of a $C_1$-$C_4$ alkyl ester of methacrylic acid,
(iii) 1 to 25 mol % of a monoethylenically unsaturated carboxylic acid, a monoethylenically unsaturated sulfonic acid or a monoethylenically unsaturated phosphonic acid, or salt forms thereof,
(iv) 0 to 25 mol % of one or more ethylenically unsaturated monomers which are different from a monomer (i), (ii) and (iii),
wherein the total amount of all the monomers (i), (ii), (iii) and (iv) is 100 mol % to obtain a starting polymer V, and
(B) hydrolyzing the starting polymer V under alkaline conditions to obtain the final polymer A,
wherein the N—C(=O)$R^1$ groups of the formula (I) of the monomers (i) polymerized into the starting polymer V at least partially hydrolyze to form primary amino groups, wherein the ester groups of the monomers (ii) polymerized into the starting polymer V are at least partially reacted and at least part of the reaction is the formation of five-membered lactam structural units with the obtained primary amino groups or the formation of carboxylic acid groups or salt forms thereof.

Preference is given to a final polymer A in which from 0 to 9 mol % of acrylonitrile or methacrylonitrile are used as monomers for the radical polymerization.

Many end polymers A are found to be useful in a method for producing paper or cardboard. This method of producing paper or cardboard comprises adding certain final polymers A to a first aqueous pulp suspension, dewatering the resulting second aqueous pulp suspension containing the certain final polymer A on a water-permeable substrate to a wet paper structure, and further dewatering the wet paper structure into a paper or cardboard. The resulting paper or cardboard has good dry strength.

A further subject of the invention is a method for producing paper or cardboard containing the steps
(AC) adding a final polymer A to a first aqueous pulp suspension whereby a second aqueous pulp suspension containing final polymer A is created,
wherein the final polymer A is obtainable by
radical polymerization of the monomers
(i) 30 to 90 mol % of a monomer of the formula I

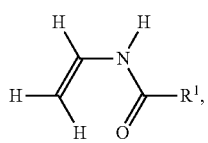

in which $R^1$ denotes H or $C_1$-$C_6$ alkyl,
(ii) 3 to 60 mol % of a $C_1$-$C_4$ alkyl ester of acrylic acid or of a $C_1$-$C_4$ alkyl ester of methacrylic acid,
(iii) 1 to 45 mol % of a monoethylenically unsaturated carboxylic acid, a monoethylenically unsaturated sulfonic acid or a monoethylenically unsaturated phosphonic acid, or salt forms thereof,
(iv) 0 to 35 mol % of one or more ethylenically unsaturated monomers which are different from a monomer (i), (ii), (iii) and (iv),
wherein acrylonitrile or methacrylonitrile are used in an amount of 0 to 9 mol %, wherein the total amount of all monomers (i), (ii), (iii) and (iv) is 100 mol % to obtain a starting polymer V, and
hydrolyzing the starting polymer V under alkaline conditions to obtain the final polymer A,
wherein the N—C(=O)$R^1$ groups of the formula (I) of the monomers (i) polymerized into the starting polymer V at least partially hydrolyze to form primary amino groups, wherein the ester groups of the monomers (ii) polymerized into the starting polymer V are at least partially reacted and at least part of the reaction is the formation of five-membered lactam structural units with the obtained primary amino groups or the formation of carboxylic acid groups or salt forms thereof,
(BC) dewatering the second aqueous pulp suspension containing final polymer A on a water-permeable substrate to a wet paper structure,
(CC) dewatering the wet paper structure, resulting in the paper or cardboard.

In step (AC), the first aqueous pulp suspension is understood to mean a composition containing (a-a) water and (a-b) pulp containing cellulose fibers. An alternative designation for pulp suspension is pulp.

Mechanical and/or chemical methods can be used to obtain the first aqueous pulp suspension. For example, grinding an aqueous pulp suspension is a mechanical method of shortening fibers, and in the case of cellulose fibers, also defibrillating the fibers. The ability to dewater of the aqueous pulp suspension is determined by the degree of grinding achieved. A method for measuring the degree of grinding of a pulp suspension is the determination of the dewatering kinetics according to Schopper Riegler in units Schopper Riegler (° SR).

Native and/or recovered fibers can be used as fibrous material. All fibers from wood or annual plants conventionally used in the paper industry can be used. Suitable annual plants for producing fibrous materials are, for example, rice, wheat, sugarcane and kenaf. Wood pulp, for example, from coniferous or deciduous woods, include, for example, groundwood, thermomechanical pulp (TMP), chemo-thermo-mechanical pulp (CTMP), pressure groundwood, semi-pulp, high yield pulp, and refiner mechanical pulp (RMP). Coarse-cut wood pulp typically has a grinding degree of 40-60° SR compared to normal-cut wood pulp of 60-75° SR and fine-grained wood pulp of 70-80° SR. Celluloses, for example, from coniferous or hardwoods, include the chemically digested sulfate, sulfite or soda celluloses. Cellulose can further be bleached or unbleached. Unbleached cellulose, which is also referred to as unbleached kraft pulp, is preferred. Unground cellulose typically has 13-17° SR versus low or medium ground cellulose with 20-40° SR and high ground cellulose with 50-60° SR. For example, recovered fibers can come from used paper. The used paper can optionally be subjected to a deinking process beforehand. Typically, mixed used paper can be about 40° SR versus used paper from a deinking process at around 60° SR. Recovered fibers from used paper can be used alone or in admixture with other, in particular native fibers.

Preference is given to a method for producing paper or cardboard in which the first aqueous pulp suspension has a dewatering kinetics according to Schopper Riegler between 13 and 70° SR, very preferably between 20 and 60° SR and particularly preferably between 30 and 50° SR.

The first aqueous pulp suspension can be obtained, for example, by recycling existing paper or cardboard, for example, by mechanically treating used paper in a pulper together with water until the aqueous pulp suspension has the desired consistency. Another example of the combination of two fiber sources is the mixing of a primary pulp suspension with recycled scrap of a coated paper produced using the primary pulp suspension.

In addition to water (a-a) and fibrous material (a-b), the first aqueous pulp suspension can contain further constituents which are optionally added to it deliberately or, if appropriate, are present through the use of used paper or existing paper.

Dry content is understood herein to mean the ratio of the mass of a sample after drying to the mass of the sample before drying expressed in weight percentages. Preferably, the dry content is determined by drying at 105° C. to constant mass. For this purpose, the drying takes place at 105° C. (±2° C.) in a drying oven until constant mass is reached. Constant mass is achieved herein when, at dry contents of 1 to 100%, the rounded first decimal place of the percentage no longer changes and at dry contents from 0 to less than 1%, the rounded second decimal place of the percentage no longer changes. The drying takes place at ambient pressure, optionally 101.32 KPa, without any correction being made for a deviation resulting from weather and sea level. In the example part, there are still details for the practical implementation of the determination of dry content.

At a dry content of more than 1.5 to 6% by weight based on the first aqueous pulp suspension (corresponds approximately to a pulp concentration of more than 15 to 60 g/L, if almost exclusively fibrous material is present), preferably from 2.0 to 4.0% by weight, is herein referred to as thick matter. A difference here is a dry content of 0.1 to 1.5% by weight, usually referred to as a thin stock, based on the aqueous pulp suspension (corresponds approximately to a pulp concentration of 1 to 15 g/l, if almost exclusively fibrous material is present), in particular 0.3 to 1.4% by weight. The dry content or the dry weight of an aqueous pulp suspension comprises all constituents which are not volatile or are preferably nonvolatile in the dry content determination by drying at 105° C. to constant mass.

The dry content of the first aqueous pulp suspension is preferably between 0.1 and 6% by weight, very preferably between 0.12 and 5% by weight, particularly preferably between 0.15 and 4% by weight, most preferably between more as 1.5 and 4.0% by weight, and especially preferably between 2.0 and 4.0% by weight.

Preference is given to a method for producing paper or cardboard in which, in step (AC), the first aqueous pulp suspension has a dry content of between 0.1 and 6% by weight.

The final polymer A is preferably added in step (AC) to a first pulp suspension, the dry content of which is greater than 1.5 and up to 6.0% by weight. Most preferably, the resulting second pulp suspension containing final polymer A is then diluted to a dry content of 0.1 and up to 1.5% by weight. The final polymer A is preferably added in step (AC) to a first pulp suspension, the dry content of which is between 0.1 and up to 1.5% by weight.

Preference is given to a method for producing paper or cardboard in which, in step (AC), the final polymer A is added to the first aqueous pulp suspension having a dry content of more than 1.5 to 6% by weight.

After adding the final polymer A to the first aqueous pulp suspension, dewatering in step (BC) is preferably maintained for 0.5 seconds to 2 hours, more preferably 1.0 seconds to 15 minutes, and most preferably 2 to 20 seconds. An exposure time of the final polymer A is thus ensured.

The amount of final polymer A added is preferably from 0.01 to 3.0% by weight, based on the dry content of the first aqueous pulp suspension. The amount of final polymer A in this case is calculated as the polymer content. The polymer content indicates the content of final polymer A without counterions in the aqueous solution in % by weight, that is, counterions are not taken into account. The polymer content is thus the sum of the weight proportions of all structural units of the final polymer A in g, which are contained in 100 g of an aqueous dispersion or solution of the final polymer A. In the example part, there are still details for practical implementation under polymer content. More preference is given to an amount of from 0.02 to 1.0% by weight, particularly preferably from 0.06 to 0.8% by weight, very particularly preferably from 0.09 to 0.6% by weight, especially preferably from 0.12 to 0.5% by weight, yet more preferably 0.15 to 0.5% by weight and expressly preferably 0.2 to 0.4% by weight.

Preference is given to a method for producing paper or cardboard in which in step (AC), the final polymer A is added in an amount of 0.2 to 0.5% by weight to the first pulp suspension, wherein the dry content of the first pulp suspension is greater than 1.5 and up to 6.0% by weight. Most preferably, the resulting second pulp suspension containing final polymer A is then diluted to a dry content between 0.1 and up to 1.5% by weight.

The addition of the final polymer A to the first aqueous pulp suspension preferably takes place as an aqueous dispersion or solution of the final polymer A having a pH value of above 5, very preferably between pH 6 and 9, particularly preferably between pH 6 and 8 and very particularly preferably between pH 6.1 and 6.8.

Preference is given to a method for producing paper or cardboard in which, in step (AC), the addition of the final polymer A takes place as an aqueous dispersion or aqueous solution having a pH value of 5 to 9 to the first aqueous pulp suspension.

The second aqueous pulp suspension containing final polymer A contains
  (a-a) water
  (a-b) pulp
  (a-c) final polymer A.

A possible further constituent of the second aqueous pulp suspension is (a-d) an organic polymer different from a pulp and final polymer A. The organic polymer (a-d) can be neutral, cationic or anionic.

A neutral organic polymer (a-d) can be uncharged-neutral because it contains no polymer units having a functional group that carries a charge at least at a pH value of 7. Examples of a neutral organic polymer (a-d) containing no polymer units having a functional group that carry a charge at least at a pH value of 7 are polyacrylamide, poly (acrylamide-co-acrylonitrile), poly (vinyl alcohol), or poly (vinyl alcohol-co-vinyl acetate).

A neutral organic polymer (a-d) can also be amphoteric neutral because it contains polymer units having a functional group that carries a negative charge at least at a pH value of 7, and polymer units having a functional group that carries a positive charge at least at a pH value of 7, and further balances the number of all negative charges and the number of all positive charges of the functional groups.

A cationic organic polymer (a-d) can be purely cationic, that is, it contains polymer units having a functional group which carries a positive charge at least at pH value 7, but does not contain polymer units having a functional group which carries a negative charge at least at a pH value of 7. Examples of a purely cationic organic polymer (a-d) are poly (allylamine), poly (diallylamine), poly (diallyldimethylammonium chloride), poly (acrylamide-co-diallyldimethylammonium chloride) or poly (acrylamide-co-2-(N,N,N-trimethylammonium) ethylacrylatchlorid).

A cationic organic polymer (a-d) can also be amphoteric cationic, that is, it contains polymer units having a functional group which carries a positive charge at least at a pH value of 7, and polymer units having a functional group which carries a negative charge at least at a pH value of 7, and the number of all positive charges is higher than the number of all negative charges of the functional groups.

An anionic organic polymer (a-d) can be purely anionic, that is, it contains polymer units having a functional group which carries a negative charge at least at pH value 7, but does not contain polymer units having a functional group which carries a positive charge at least at a pH value of 7. Examples of a purely anionic organic polymer (a-d) are poly (acrylic acid), poly (styrene-co-n-butyl acrylate-co-acrylic acid) or poly (acrylamide-co-acrylonitrile-co-acrylic acid).

An anionic organic polymer (a-d) can also be amphoteric anionic, that is, it contains polymer units having a functional group which carries a negative charge at least at a pH value of 7, and polymer units having a functional group which carries a positive charge at least at a pH value of 7, and the number of all negative charges is higher than the number of all positive charges of the functional groups.

The organic polymer (a-d) can also be distinguished by linear, branched or crosslinked. Crosslinking can be carried out, for example, by addition of a crosslinker already during the polymerization of the starting monomers or by addition of a crosslinker after the polymerization has taken place, in particular only shortly before the addition of the organic polymer (a-d) to the second aqueous pulp suspension. For example, polyacrylamide can be crosslinked by addition of the crosslinker methylenebisacrylamide to acrylamide already during the polymerization or can be added only after the polymerization with a crosslinker such as glyoxal. Optionally, both types of crosslinking can be combined. Particularly noteworthy here is a crosslinked organic polymer which has a high degree of crosslinking, typically already during the monomer polymerization. It is present in the second aqueous pulp suspension containing the final polymer AP as a particle, in particular as a so-called organic microparticle.

The organic polymer (a-d) can also be differentiated according to natural, modified natural or synthetic. A natural organic polymer is usually derived from nature, wherein, if applicable, appropriate isolation steps but no targeted chemical-synthetic modification are used. An example of a natural organic polymer (a-d) is unmodified starch. Cellulose is not an example of a natural organic polymer (a-d)—this is a pulp (a-b) herein. A modified-natural organic polymer is modified by a chemical-synthetic method step. An example of a modified-natural organic polymer (a-d) is cationic starch. A synthetic organic polymer (a-d) is obtained chemically-synthetically from individual monomers. An example of a synthetic organic polymer (a-d) is polyacrylamide.

Preference is given to a method for producing paper or cardboard in which an organic polymer (a-d) is added in step (AC) to the first pulp suspension or to the second pulp suspension containing final polymer A. Very preferably, an organic polymer (a-d) which is a modified-natural organic polymer is added. Particularly preferably, cationic starch is the organic polymer (a-d). Most preferably, cationic starch is the only organic polymer (a-d) added in step (AC) to the first pulp suspension in addition to final polymer A or the second pulp suspension containing final polymer A.

A possible further constituent of an aqueous pulp suspension containing final polymer A is (a-e) a filler. A filler (a-e) is an inorganic particle, in particular an inorganic pigment. All pigments customarily used in the paper industry based on metal oxides, silicates and/or carbonates are considered inorganic pigments, in particular pigments from the group consisting of calcium carbonate, which can be used in the form of ground lime, chalk, marble (GCC) or precipitated calcium carbonate (PCC), talc, kaolin, bentonite, satin white, calcium sulfate, barium sulfate and titanium dioxide. An inorganic particle is also a colloidal solution of polysilicic acids in which the silica particles typically have a particle size between 5 and 150 nm.

A filler (a-e) herein also comprises two or more different fillers. Correspondingly, filler (a-e) splits into a first filler (ae-1), a second filler (ae-2), etc., as a possible further constituent of an aqueous pulp suspension.

Preference is given to using inorganic pigments having an average particle size (volume average)≤10 μm, preferably from 0.3 to 5 μm, in particular from 0.5 to 2 μm. The determination of the average particle size (volume average) of the inorganic pigments and of the particles of the powder composition is carried out in the context of this document generally by the method of quasi-elastic light scattering (DIN-ISO 13320-1), for example, with a Mastersizer 2000 from Malvern Instruments Ltd.

Preference is given to a method for producing paper or cardboard in which a filler (a-e) is added in step (AC) to the first pulp suspension or to the second pulp suspension containing final polymer A.

The total amount of filler (a-e) is preferably 0 to 40% by weight based on the resulting paper or cardboard and based on a dry content of 100% by weight of the filler (a-e) and a dry content of the paper or cardboard of 100% by weight. Very preferably, the total amount of filler (a-e) is 5 to 30% by weight, more preferably 15 to 25% by weight and most preferably 15 to 20% by weight.

Preferably, the resulting paper or cardboard contains a total amount of filler (a-e) of from 5 to 30% by weight. Such papers are, for example, wood-free papers. Preferably, the resulting paper or cardboard contains a total amount of filler (a-e) of from 5 to 20% by weight. Such papers are used primarily as packaging papers. Preferably, the resulting paper or cardboard contains a total amount of filler (a-e) of from 5 to 15% by weight. Such papers are used primarily for newspaper printing. Preferably, the resulting paper or cardboard contains a total amount of filler (a-e) of from 25 to 40% by weight. Such papers are, for example, SC papers (super calandered).

In step (AC), the addition of the final polymer A to the first aqueous pulp suspension preferably takes place before a filler (a-e) is added. Most preferably, the final polymer A is added before a filler (a-e) and before any organic polymer (a-d) except cationic starch is added. More preferably, the addition of the final polymer A takes place before a filler (a-e), before an organic polymer (a-d) except cationic starch and before another paper auxiliary (a-f) is added to the first aqueous pulp suspension.

In step (AC), the optional addition of a filler (a-e) is preferably carried out to the second pulp suspension containing final polymer A, which has a dry content of 0.1 to 1.5% by weight. This addition corresponds to the so-called thin stock addition. The second pulp suspension containing final polymer A is already present at this dry content or is previously diluted from a dry content of more than 0.15 to 6.0% by weight to a dry content of 0.1 to 1.5% by weight.

In step (AC), the optional addition of a filler (a-e) is preferably to the second pulp suspension containing final polymer A, wherein a first part of the total amount of filler (a-e) to be added to the pulp suspension containing final polymer A which has a dry content above 0.15 up to 6.0% by weight is added and a second part of the total amount of filler (a-e) to be added is added to the pulp suspension containing final polymer A after being diluted to a dry content of 0.1 to 1.5% by weight. The first part and the second part form the total amount of filler to be added (a-e). The weight ratio of the first part to the second part is between 5 and 0.2.

A possible further constituent of an aqueous pulp suspension containing final polymer A is (a-f) another paper auxiliary. Another paper auxiliary (a-f) is different from the aforementioned components (a-b), of the final polymer A as (a-c), (a-d) and (a-e). Another paper auxiliary (a-f) is, for example, a sizing agent, a water-soluble salt of a trivalent metal cation, a defoamer, a nonpolymeric wet strength agent, a biocide, an optical brightener or a paper dye.

Examples of a sizing agent are alkyl ketene dimers (AKD), alkenyl succinic anhydrides (ASA) and resin size.

Examples of a water-soluble salt of a trivalent metal cation are aluminum (III) salts, in particular $AlCl_3$ such as $AlCl_3 \cdot 6H_2O$, $Al_2(SO_4)_3$ such as $Al_2(SO_4)_3 \cdot 18H_2O$, or $KAl(SO_4)_2 \cdot 12H_2O$. The other paper auxiliaries (a-f) can preferably be used in the usual amounts.

Preferably, another paper auxiliary (a-f) is added to the second pulp suspension containing final polymer A, which has a dry content of from 0.1 to 1.5% by weight. This addition corresponds to the so-called thin stock addition. The second pulp suspension containing final polymer A is already present at this dry content or is previously diluted from a dry content of more than 0.15 to 6.0% by weight to a dry content of 0.1 to 1.5% by weight.

Another paper auxiliary (a-f) herein also comprises two or more different other paper auxiliaries. Accordingly, other paper auxiliaries (a-f) as a possible further constituent of a second aqueous pulp suspension containing final polymer A are divided into a first other paper auxiliary (a-f-1), a second other paper auxiliary (a-f-2), . . . etc.

In aqueous paper production, more than one organic polymer (a-d) and more than one filler (a-e), which is inorganic, are often added to an aqueous pulp suspension. In the case of an organic polymer (a-d), this serves, for example, to influence technical properties of the paper production method itself or technical properties of the paper produced. Retention agents, dewatering agents, wet strength agents or other dry strength agents are thus used.

Examples of retention agents are cationic, amphoteric or anionic organic polymers (a-d). Examples are an anionic polyacrylamide, a cationic polyacrylamide, a cationic starch, a cationic polyethyleneimine or a cationic polyvinylamine. In addition, inorganic fillers (a-e) which act as so-called anionic microparticles can also be added as a retention agent. These include in particular colloidal silica or bentonite. Combinations of the aforementioned examples are also possible. In particular, a dual system that consists of a cationic polymer with an anionic microparticle or an anionic polymer with a cationic microparticle can be mentioned as a combination. Preferred as a retention agent is a synthetic organic polymer (a-d) or a dual system. In the case of a dual system as a retention agent, for example, there is then a cationic first organic polymer (a-d-1) in combination with an anionic inorganic microparticle, for example, a suitable bentonite, as the first filler (a-e-1).

Examples of another dry strength agent are a synthetic organic polymer (a-d) such as polyvinylamine, polyethylenimine, polyacrylamide or glyoxylated polyacrylamide, a natural organic polymer (a-d) such as unmodified starch or a modified natural organic polymer (a-d) such as a cationic modified starch or an oxidatively or enzymatically degraded starch. The addition of another dry strength agent is preferably carried out to the first aqueous pulp suspension or the second aqueous pulp suspension containing final polymer A, both of which have a dry content of about 1.5 to 6.0% by weight. An addition to the first aqueous pulp suspension or the second aqueous pulp suspension containing final polymer A, each having a dry content of from 0.1 up to 1.5% by weight, is possible.

In step (BC), the second aqueous pulp suspension containing final polymer A is applied to the water-permeable substrate. The water-permeable substrate has a top side and bottom side and fine openings that allow the water through but not substantially fibrous constituents. The second pulp suspension containing final polymer A is uniformly applied to the water-permeable substrate. The top side of the water-permeable substrate is a substantially flat surface at the moment of application, that is, apart from the fine openings or other material-related unevenness and a certain possible radius bending. This allows the production of a uniformly thin, as homogeneous as possible wet fibrous web or a wet paper structure or a wet paper sheet. After application of the second aqueous pulp suspension containing final polymer A, parts of the water (a-a) drain off through the fine openings, whereupon sheet formation occurs on the top side, resulting in the wet paper structure. A wet paper structure produced in this way is flat, that is, it has a very small height in relation to the length and width. The pulp of the second pulp suspension containing final polymer A and possible other components which are to be present in the paper or cardboard ultimately produced, for example, a filler (a-e), are ideally retained wholly or at least substantially in the forming wet paper structure. Possible further components of the second aqueous pulp suspension containing final polymer A added to assist in retaining the other components, assist dewatering or assist uniform sheet formation, for example, an organic polymer (a-d), are effective in this method. Most of these possible further components of the pulp suspension also remain wholly or at least substantially in the resulting fibrous web. The proportion of wet paper structure that determines the dry content of the wet paper structure contains the retained constituents pulp, possible other components to be present in the final paper produced, and the possible further components. Depending on their retention behavior, these constituents are, for example, said pulp, organic polymers, fillers and other paper auxiliaries. The wet paper structure is strong enough at the end of the step (BC) to be able to detach it from the water-permeable substrate.

The water-permeable substrate in step (BC) is preferably a sieve. The sieve, which has a sieve top side and a sieve bottom side, has sieve meshes as fine openings. The sieve contains, for example, a metal or plastic fabric. In the case of a paper machine, the sieve is very preferably an endless sieve. After the resulting wet paper structure is separated from an endless sieve, the endless sieve runs back to the fabric order, where new second pulp suspension containing final polymer A is applied to the running endless sieve. Most preferably, the sieve is an endless sieve that passes around multiple rollers.

The dry content of the wet paper structure produced in step (BC) is preferably 15 to 25% by weight, very preferably 18.7 to 24% by weight, particularly preferably 18.8 to 23% by weight, very particularly preferably from 18.9 to 22% by weight, more preferably from 19.0 to 21% by weight and most preferably from 19.0 to 20.7% by weight.

Preference is given to a method for producing paper or cardboard in which, in step (BC), the wet paper structure has a dry content of between 18.5 and 25% by weight.

Preference is given to a method in which the addition of the final polymer A to the first aqueous pulp suspension, which has a dry content of more than 1.5 to 6% by weight in the addition, takes place in step (AC) and in which step (BC), the wet paper structure has a dry content of between 18.5 and 25% by weight.

In step (CC), the wet paper structure obtained in step (BC) is dewatered into a paper or cardboard. Preferably, the dewatering in step (CC) is carried out comprising the steps
 (CC-1) dewatering the wet paper structure by pressing to form a damp paper sheet,
 (CC-2) dewatering the damp paper sheet by applying heat, resulting in paper or cardboard.

The pressing of the wet paper structure in step (CC-1) results in further dewatering and corresponding increase in the dry content. Pressing exerts mechanical pressure on the wet paper structure during dewatering. The removal of water by mechanical pressure is more energy efficient than drying by the application of heat. By placing the wet paper structure on a water-absorptive or belt, for example, a felt-like fabric, the dewatering is supported via the absorption of the pressed water. A roller is suitable for exerting pressure to the layer composite. In particular, passing the layer composite through two rollers, optionally lying on the water-absorptive belt, is suitable. The surface of the roller consists, for example, of steel, granite or hard rubber. The surface of a roller can be coated with a water-absorptive material. The water-absorptive materials have a high level of absorbency, porosity, strength and elasticity. A damp paper sheet is formed at the end of step (CC-1). The damp paper sheet is solid enough at the end of step (CC-1) to be able to be fed to the next step (CC-2) without mechanical assistance. The damp paper sheet preferably has a dry content of between 35 and 65% by weight, more preferably between 37 and 60% by weight, most preferably between 38 and 55% by weight, even more preferably between 40 and 50% by weight.

In step (CC-2), supplying heat further dewaters the damp paper sheet from step (CC-1), whereby the paper or cardboard is formed. The heat is supplied to the damp paper sheet, for example, by heated plates on which the damp paper sheet is placed, by heated cylinders over which the damp paper sheet is passed, by IR emitters, by warm air which is passed over the damp paper sheet, or through a combination of two, three or all measures.

The obtained paper or cardboard has the highest strength in comparison with a wet paper structure or the damp paper sheet. It is believed that from a dry content of 80% by weight, a compounding of the hydroxyl groups of cellulose fibers via hydrogen bonds, which supplements the previous mechanical entanglement of the fibers, is intensified. A measure of the strength of the resulting paper or cardboard, for example, is the internal strength.

The dry content of the obtained paper or cardboard is preferably at least 88% by weight. The dry content of the paper or cardboard is very preferably between 89 and 100% by weight, more preferably between 90 and 98% by weight and most preferably between 91 and 96% by weight.

Depending on the area-related mass, which is also referred to as basis weight or grammage, the designation for the flat molded body resulting from the second pulp suspension containing final polymer A changes. A dried molded body having a basis weight mass of from 7 $g/m^2$ to 225 $g/m^2$ is referred to herein as paper and having a basis weight mass of from 225 $g/m^2$ as a cardboard. The grammage of the paper or cardboard is preferably 20 to 400 $g/m^2$, very preferably 40 to 280 $g/m^2$, particularly preferably 60 to 200 $g/m^2$, very particularly preferably 80 to 160 $g/m^2$, especially preferred 90 to 140 $g/m^2$ and most particularly preferably 100 to 130 $g/m^2$.

The resulting paper or cardboard is preferably a packaging paper, very preferably a corrugated paper.

The resulting paper or cardboard preferably has an internal strength of from 165 to 400 $J/m^2$, more preferably from 190 to 350 $J/m^2$, especially preferably from 200 to 300 $J/m^2$, and most preferably from 220 to 280 $J/m^2$, wherein the internal strength of which corresponds to Tappi's T833 pm-94.

The method of making paper or cardboard provides a paper or cardboard.

A further subject of the invention is a paper or cardboard which is obtainable by the aforementioned method for producing paper or cardboard.

FIG. 1 schematically shows, with the curve A, the time curve in hours of the viscosity in mPas in an alkaline hydrolysis of a first starting polymer obtained from 70 mol % of N-vinylformamide and 30 mol % of methyl acrylate. Curve B schematically shows the time course in hours of the viscosity in mPas in an alkaline hydrolysis of a second starting polymer obtained from 70 mol % N-vinylformamide, 20 mol % methyl acrylate and 10 mol % sodium acrylate.

EXAMPLES

The percentages in the examples are by weight unless otherwise specified.

A) Polymers

A-1) Methods for the Characterization of the Polymers

The dry content of a polymer solution is determined by distributing 0.5 to 1.5 g of the polymer solution in a 4 cm diameter metal cover and then drying in a circulating drying oven at 140° C. for two hours (=2 h). The ratio of the mass of the sample after drying under the above conditions to the weighted sample mass multiplied by 100 gives the solid content of the polymer solution in % by weight.

The degree of hydrolysis of the N-vinylformamide units (=HA) is the proportion in mol % of the hydrolyzed N-vinylformamide units based on the N-vinylformamide units originally present in the polymer. The determination of the degree of hydrolysis is determined by enzymatic analysis of the formic acid or formate released during the hydrolysis (test set from Boehringer Mannheim).

The degree of reaction of the (meth) acrylic acid ester units (=UE) is the proportion in mol % of the reacted (meth) acrylic acid ester units based on the (meth) acrylic acid ester units originally present. Reaction herein is understood to mean the cleavage of the ester structural unit, for example, by hydrolysis to a (meth) acrylic acid unit or its corresponding salt form or under reaction with an adjacent amino group under lactam formation. The determination of the degree of reaction can be determined by analyzing the alcohol released during the reaction. The latter succeeds depending on the released alcohol, for example, with the aid of HPLC or gas chromatography.

The polymer content indicates the content of polymer without counterions in the aqueous solution in % by weight, that is, counterions are not taken into account. The polymer content is the sum of the weight proportions of all the structural units of the polymer in g, which are present in 100 g of the aqueous solution. It is determined by calculation. For this purpose, potentially charge-carrying structural units in the charged form are taken into account, that is, for example, amino groups in the protonated form and acid groups in the deprotonated form. Counterions of the charged structural units such as a sodium cation, chloride, phosphate, formate, acetate, etc. are not considered. The calculation can be carried out in such a way that for an approach based on the amounts of monomers used, optionally taking into account the degree of hydrolysis (HA) and the degree of reaction (UE), the molar amounts of structural units of the polymer present at the end of the reaction are determined and these are converted into weight proportions with the aid of the molar masses of the structural units. The sum of the weight proportions gives the total amount of the polymer in this approach. The polymer content results from the ratio of the total amount of polymer to the total mass of the batch.

The K values are measured according to H. Fikentscher, Cellulose Chemistry, Volume 13, 48-64 and 71-74 under the particular conditions indicated. The figures in parenthesis indicate the concentration of the polymer solution and the solvent.

Charge densities are determined by polyelectrolyte titration with potassium polyvinyl sulfonate at a pH value of 3.5 (see D. Horn, Progress in Colloid & Polymer Science, 65 (1978), pp. 251-264).

Only fully desalted water is used in the production of the polymers, unless otherwise stated.

Monomer Abbreviations:
EA: Ethyl acrylate
MA: Methyl acrylate
VFA: N-vinylformamide
Na acrylate: Sodium salt of acrylic acid
Na methacrylate: Sodium salt of methacrylic acid
Na-AMPS: Sodium salt of 2-acrylamido-2-methylpropanesulfonic acid
Na vinylsulfonate: Sodium salt of vinylsulfonic acid
DADMAC: Diallyl dimethyl ammonium chloride
APTAC: (3-acrylamidopropyl) trimethylammonium chloride
AM: Acrylamide In the hydrolyses, to assess whether there is an intermediate viscosity peak, the spout generated by the vortex on the blade stirrer (glass stirrer having a rounded Teflon blade with a diameter of 7.0 cm and a height of 2.5 cm) is observed and evaluated as follows:

| Viscosity peak | Change spout |
|---|---|
| none | Spout decreases by less than 10% |
| minimal | Spout decreases by more than 10% but less than 50% |
| low | Spout decreases by more than 50% until the complete disappearance of the spout |
| moderate | Spout is inverted; the product bulges less than 1 cm above |
| strong | Spout is inverted; the product bulges more than 1 cm but less than 3 cm above |
| very strong | Spout is inverted; the product bulges more than 3 cm and less than 6 cm (that is, up to the stirring sleeve) upwards |
| extreme | Vortex is inverted; the product bulges up to the stirring sleeve; the stirrer speed must be lowered to ¼ to prevent the product from penetrating into the stirrer sleeve |
| very extreme | Stirrer must be turned off |

Composition of final polymers of the formula II according to calculation:

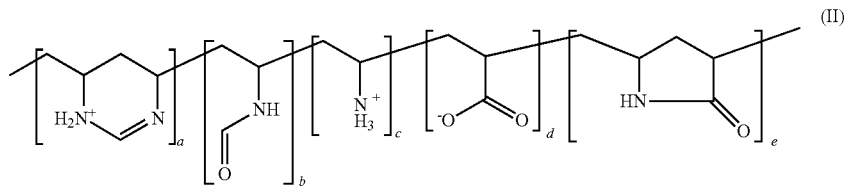
(II)

with a, b, c, d and e as mole percentage proportion (=mol %) of the respective structural unit and the sum of a, b, c, d and e with 100 mol %.

(1.)

$a$=amidinium/(amidinium+VFA+vinylammonium+ acrylate anion+lactam)*100

$b$=VFA/(amidinium+VFA+vinylammonium+acrylate anion+lactam)*100

$c$=vinylammonium/(amidinium+VFA+vinylammonium+acrylate+lactam)*100

$d$=acrylate anion/(amidinium+VFA+vinylammonium+acrylate anion+lactam)*100

$e$=lactam/(amidinium+VFA+vinylammonium+acrylate anion+lactam)*100

(2.)

VFA [mmol/100 g]: Concentration of the VFA structural units as present in the final product Acrylate anion [mmol/100 g]: Concentration of the acrylate-anion structural units as present in the final product Vinyl ammonium [mmol/100 g]: Concentration of the vinylammonium structural units as present in the final product Amidinium [mmol/100 g]: Concentration of amidinium structural units as present in the final product Lactam [mmol/100 g]: Concentration of the lactam structural unit as present in the final product The final product herein refers to the polymer solution obtained from the respective hydrolysis protocol.

(3.)

At a degree of reaction HE of 100 mol %, the following results:

Amidinium=(VFA$^0$−FA)*FAD/(FFA+FAD)

VFA=(VFA$^0$−FA)*FFA/(FFA+FAD)

Vinylammonium=FA−lactam−amidinium

Acrylate anion=Na−AS$^0$+MA$^0$+EA$^0$−FA+LD

Lactam=FA−LD (4.)

FA [mmol/100 g]: Formate content in the final product

LD [mmol/100 g]: Charge density in the final product (alternatively: [meq/100 g])

FFA: Area of integration of the $^{13}$C NMR signal of carbon of the carbonyl group of the VFA structural unit in a polymer between 164 and 168 ppm FAD: Area of integration of the $^{13}$C NMR signal of the imine carbon of the amidinium structural unit in a polymer at 152 ppm VFA$^0$ [mmol/100 g]: Concentration of VFA units that would be present in the final product, when no further reaction of the polymerized monomers took place, is calculated from the polymerization batch Na-AS$^0$ [mmol/100 g]: Concentration of Na acrylate units that would be present in the final product, when no further reaction of the polymerized monomers took place, is calculated from the polymerization batch MA$^0$, EA$^0$ [mmol/100 g]: Concentration of the methyl or ethyl acrylate units that would be present in the final product, when no further reaction of the polymerized monomers took place, is calculated from the polymerization batch A-2) Preparation of Starting Polymers by Polymerization Starting Polymer VE1: Copolymer (VFA/MA=70 mol %/30 mol %)

150.4 g of VFA (99%) are provided as feed 1.

77.3 g of MA are provided as feed 2.

1.13 g of 2,2'-azobis (2-methylpropionamidine) dihydrochloride are dissolved in 112.1 g of water at room temperature (=RT) as feed 3.

0.67 g of 2,2'-azobis (2-methylpropionamidine) dihydrochloride are dissolved in 67.2 g of water at RT as feed 4.

187.3 g of water are provided as feed 5.

782.6 g of water and 2.8 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm (=revolutions per minute), about 3.9 g of a 25% by weight sodium hydroxide solution are added, so that a pH of 6.5 is achieved. Subsequently, the receiver is heated to 70° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 70° C., the 3 feeds 1 to 3 are started at the same time. Feed 1 is fed in in 3 h, feed 2 in 3.5 h and feed 3 in 4 h. After the end of feed 3, the batch is kept at 70° C. for a further hour. Subsequently, feed 4 is added in 5 minutes and the reaction mixture is kept at 70° C. for a further 1.5 hours. Thereafter, the reflux condenser is replaced by a descending condenser and the internal pressure is slowly reduced by means of a water jet pump to about 300 mbar, so that the reactor contents begin to boil. 187.3 g of water are distilled off under these conditions. Subsequently, the vacuum is broken with air, feed 5 is added and the reaction mixture is cooled to RT.

A light yellow, viscous solution having a dry content of 18.8% is obtained. The K value of the copolymer is 84 (0.5% by weight in water)

Starting Polymer VE2: Copolymer (VFA/MA=70 mol %/30 mol %)

150.4 g of VFA (99%) are provided as feed 1.

77.3 g of MA are provided as feed 2.

1.13 g of 2,2'-azobis (2-methylpropionamidine) dihydrochloride are dissolved in 112.1 g of water at RT as feed 3.

0.67 g of 2,2'-azobis (2-methylpropionamidine) dihydrochloride are dissolved in 67.2 g of water at RT as feed 4.

176.6 g of water are provided as feed 5.

782.6 g of water and 2.5 g 75% by weight phosphoric acid are presented in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 3.9 g of a 25% by weight sodium hydroxide solution are added, so that a pH of 6.5 is reached. Subsequently, the receiver is heated to 69° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 69° C., the 3 feeds 1 to 3 are started at the same time. Feed 1 is fed in in 3 h, feed 2 in 3.5 h and feed 3 in 4 h. After the end of feed 3, the batch is kept at 69° C. for a further hour. Subsequently, feed 4 is added in 5 minutes and the reaction mixture is kept at 69° C. for a further 1.5 hours. Thereafter, the reflux condenser is replaced by a descending condenser and the internal pressure is slowly reduced by means of a water jet pump to about 320 mbar, so that the reactor contents begin to boil. 176.6 g of water are distilled off under these conditions. Subsequently, the vacuum is broken with air, feed 5 is added and the reaction mixture is cooled to RT.

A yellow, viscous solution having a dry content of 19.1% is obtained. The K value of the copolymer is 84 (0.5% by weight in water).

Starting Polymer VE3: Terpolymer (VFA/MA/Na Acrylate=70 mol %/29 mol %/1 mol %)

A mixture of 9.3 g of aqueous 32% by weight Na acrylate solution is adjusted to pH 6.4, 158.2 g of VFA (99%) and 210.0 g of water are provided as feed 1.

78.6 g of MA are provided as feed 2.

1.19 g of 2,2'-azobis (2-methylpropionamidine) dihydrochloride are dissolved in 117.5 g of water at RT as feed 3.

0.71 g of 2,2'-azobis (2-methylpropionamidine) dihydrochloride are dissolved in 70.5 g of water at RT as feed 4.

172.7 g of water are provided as feed 5.

547.4 g of water and 2.5 g 75% by weight phosphoric acid are presented in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 4.1 g of a 25% by weight sodium hydroxide solution are added, so that a pH of 6.5 is reached. Subsequently, the receiver is heated to 69° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 69° C., the 3 feeds 1 to 3 are started at the same time. Feed 1 is fed in in 3 h, feed 2 in 3.5 h and feed 3 in 4 h. After the end of feed 3, the batch is kept at 69° C. for a further hour. Subsequently, feed 4 is added in 5 minutes and the reaction mixture is kept at 69° C. for a further 1.5 hours. Thereafter, the reflux condenser is replaced by a descending condenser and the internal pressure is slowly reduced by means of a water jet pump to about 320 mbar, so that the reactor contents begin to boil. 172.7 g of water are distilled off under these conditions. Subsequently, the vacuum is broken with air, feed 5 is added and the reaction mixture is cooled to RT.

A yellow, viscous solution having a dry content of 19.6% is obtained. The K value of the terpolymer is 90 (0.5% by weight in a 5% by weight aqueous NaCl solution).

Starting Polymer VE4: Terpolymer (VFA/MA/Na Acrylate=70 mol %/28 mol %/2 mol %)

A mixture of 18.5 g of aqueous 32% by weight Na acrylate solution is adjusted to pH 6.4, 158.0 g of VFA (99%) and 200.0 g of water are provided as feed 1.

75.8 g of MA are provided as feed 2.

1.18 g of 2,2'-azobis (2-methylpropionamidine) dihydrochloride are dissolved in 117.1 g of water at RT as feed 3.

0.71 g of 2,2'-azobis (2-methylpropionamidine) dihydrochloride are dissolved in 70.3 g of water at RT as feed 4.

184.0 g of water are provided as feed 5.

551.7 g of water and 2.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 4.1 g of a 25% by weight sodium hydroxide solution are added, so that a pH of 6.5 is reached. Subsequently, the receiver is heated to 70° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 70° C., the 3 feeds 1 to 3 are started at the same time.

Feed 1 is fed in in 3 h, feed 2 in 3.5 h and feed 3 in 4 h. After the end of feed 3, the batch is kept at 70° C. for a further hour. Subsequently, feed 4 is added in 5 minutes and the reaction mixture is kept at 70° C. for a further 1.5 hours. Thereafter, the reflux condenser is replaced by a descending condenser and the internal pressure is slowly reduced by means of a water jet pump to about 300 mbar, so that the reactor contents begin to boil. 184.0 g of water are distilled off under these conditions. Subsequently, the vacuum is broken with air, feed 5 is added and the reaction mixture is cooled to RT.

A yellow, viscous solution having a dry content of 19.4% is obtained. The K value of the terpolymer is 90 (0.5% by weight in a 5% by weight aqueous NaCl solution).

Starting Polymer VE5: Terpolymer (VFA/MA/Na Acrylate=70 mol %/25 mol %/5 mol %)

A mixture of 46.1 g of aqueous 32% by weight Na acrylate solution is adjusted to pH 6.5, 157.5 g of VFA (99%) and 200.0 g of water are provided as feed 1.

67.4 g of MA are provided as feed 2.

1.17 g of 2,2'-azobis (2-methylpropionamidine) dihydrochloride are dissolved in 116.1 g of water at RT as feed 3.

0.70 g of 2,2'-azobis (2-methylpropionamidine) dihydrochloride are dissolved in 69.7 g of water at RT as feed 4.

196.6 g of water are provided as feed 5.

534.7 g of water and 2.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 4.2 g of a 25% by weight sodium hydroxide solution are added, so that a pH of 6.5 is reached. Subsequently, the receiver is heated to 70° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 70° C., the 3 feeds 1 to 3 are started at the same time. Feed 1 is fed in in 3 h, feed 2 in 3.5 h and feed 3 in 4 h. After the end of feed 3, the batch is kept at 70° C. for a further hour. Subsequently, feed 4 is added in 5 minutes and the reaction mixture is kept at 70° C. for a further 1.5 hours. Thereafter, the reflux condenser is replaced by a descending condenser and the internal pressure is slowly reduced by means of a water jet pump to about 300 mbar, so that the reactor contents begin to boil. 196.6 g of water are distilled off under these conditions. Subsequently, the vacuum is broken with air, feed 5 is added and the reaction mixture is cooled to RT.

A yellow, viscous solution having a dry content of 19.4% is obtained. The K value of the terpolymer is 93 (0.5% by weight in a 5% by weight aqueous NaCl solution).

Starting Polymer VE6: Terpolymer (VFA/MA/Na Acrylate=70 mol %/25 mol %/5 mol %)

A mixture of 43.0 g of aqueous 32% by weight Na acrylate solution is adjusted to pH 6.5, 147.0 g of VFA (99%) and 200.0 g of water are provided as feed 1.

62.9 g of MA are provided as feed 2.

0.33 g of 2,2'-azobis (2-methylpropionamidine) dihydrochloride are dissolved in 32.5 g of water at RT as feed 3.

1.42 g of 2,2'-azobis (2-methylpropionamidine) dihydrochloride are dissolved in 140.9 g of water at RT as feed 4.

164.8 g of water are provided as feed 5.

565.7 g of water and 2.4 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 3.9 g of a 25% by weight sodium hydroxide solution are added, so that a pH of 6.5 is reached. Subsequently, the receiver is heated to 60° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 60° C., the 3 feeds 1 to 3 are started at the same time. Feed 1 is fed in in 3 h, feed 2 in 3.5 h and feed 3 in 4 h. After the end of feed 3, the batch is kept at 60° C. for a further hour. Subsequently, feed 4 is added in 5 minutes and the reaction mixture is kept at 60° C. for a further 1.5 hours. Thereafter, the reflux condenser is replaced by a descending condenser and the internal pressure is slowly reduced by means of a water jet pump to about 280 mbar, so that the reactor contents begin to boil. 164.8 g of water are distilled off under these conditions. Subsequently, the vacuum is broken with air, feed 5 is added and the reaction mixture is cooled to RT.

A yellow, viscous solution having a dry content of 13.9% is obtained. The K value of the terpolymer is 138 (0.1% by weight in a 5% by weight aqueous NaCl solution).

Starting Polymer VE7: Terpolymer (VFA/MA/Na Acrylate=70 mol %/20 mol %/10 mol %)

A mixture of 91.6 g of aqueous 32% by weight Na acrylate solution is adjusted to pH 6.5, 156.7 g of VFA (99%) and 200.0 g of water are provided as feed 1.

53.9 g of MA are provided as feed 2.

1.15 g of 2,2'-azobis (2-methylpropionamidine) dihydrochloride are dissolved in 114.3 g of water at RT as feed 3.

0.69 g of 2,2'-azobis (2-methylpropionamidine) dihydrochloride are dissolved in 68.6 g of water at RT as feed 4.

184.4 g of water are provided as feed 5.

506.5 g of water and 2.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 4.2 g of a 25% by weight sodium hydroxide solution are added, so that a pH of 6.5 is reached. Subsequently, the receiver is heated to 70° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 70° C., the 3 feeds 1 to 3 are started at the same time. Feed 1 is fed in in 3 h, feed 2 in 3.5 h and feed 3 in 4 h. After the end of feed 3, the batch is kept at 70° C. for a further hour. Subsequently, feed 4 is added in 5 minutes and the reaction mixture is kept at 70° C. for a further 1.5 hours. Thereafter, the reflux condenser is replaced by a descending condenser and the internal pressure is slowly reduced by means of a water jet pump to about 320 mbar, so that the reactor contents begin to boil. 184.4 g of water are distilled off under these conditions. Subsequently, the vacuum is broken with air, feed 5 is added and the reaction mixture is cooled to RT.

A yellow, viscous solution having a dry content of 19.7% is obtained. The K value of the terpolymer is 94 (0.5% by weight in a 5% by weight aqueous NaCl solution).

Starting Polymer VE8: Terpolymer (VFA/MA/Na Acrylate=70 mol %/15 mol %/15 mol %)

A mixture of 136.7 g of aqueous 32% by weight Na acrylate solution is adjusted to pH 6.5, 155.9 g of VFA (99%) and 200.0 g of water are provided as feed 1.

40.0 g of MA are provided as feed 2.

1.14 g of 2,2'-azobis (2-methylpropionamidine) dihydrochloride are dissolved in 112.6 g of water at RT as feed 3.

0.68 g of 2,2'-azobis (2-methylpropionamidine) dihydrochloride are dissolved in 67.5 g of water at RT as feed 4.

227.5 g of water are provided as feed 5.

478.7 g of water and 2.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 4.2 g of a 25% by weight sodium hydroxide solution are added, so that a pH of 6.5 is reached. Subsequently, the receiver is heated to 70° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 70° C., the 3 feeds 1 to 3 are started at the same time. Feed 1 is fed in in 3 h, feed 2 in 3.5 h and feed 3 in 4 h. After the end of feed 3, the batch is kept at 70° C. for a further hour. Subsequently, feed 4 is added in 5 minutes and the reaction mixture is kept at 70° C. for a further 1.5 hours. Thereafter, the reflux condenser is replaced by a descending condenser and the internal pressure is slowly reduced by means of a water jet pump to about 320 mbar, so that the reactor contents begin to boil. 227.5 g of water are distilled off under these conditions. Subsequently, the vacuum is broken with air, feed 5 is added and the reaction mixture is cooled to RT.

A yellow, viscous solution having a dry content of 19.9% is obtained. The K value of the terpolymer is 99 (0.5% by weight in a 5% by weight aqueous NaCl solution).

Starting Polymer VE9: Terpolymer (VFA/MA/Na Acrylate=70 mol %/10 mol %/20 mol %)

A mixture of 181.4 g of aqueous 32% by weight Na acrylate solution is adjusted to pH 6.5, 155.0 g of VFA (99%) and 200.0 g of water are provided as feed 1.

26.6 g of MA are provided as feed 2.

1.12 g of 2,2'-azobis (2-methylpropionamidine) dihydrochloride are dissolved in 110.8 g of water at RT as feed 3.

0.67 g of 2,2'-azobis (2-methylpropionamidine) dihydrochloride are dissolved in 66.5 g of water at RT as feed 4.

200.5 g of water are provided as feed 5.

451.1 g of water and 2.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 4.1 g of a 25% by weight sodium hydroxide solution are added, so that a pH of 6.5 is reached. Subsequently, the receiver is heated to 70° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 70° C., the 3 feeds 1 to 3 are started at the same time. Feed 1 is fed in in 3 h, feed 2 in 3.5 h and feed 3 in 4 h. After the end of feed 3, the batch is kept at 70° C. for a further hour. Subsequently, feed 4 is added in 5 minutes and the reaction mixture is kept at 70° C. for a further 1.5 hours. Thereafter, the reflux condenser is replaced by a descending condenser and the internal pressure is slowly reduced by means of a water jet pump to about 320 mbar, so that the reactor contents begin to boil. 200.5 g of water are distilled off under these conditions. Subsequently, the vacuum is broken with air, feed 5 is added and the reaction mixture is cooled to RT.

A yellow, viscous solution having a dry content of 20.2% is obtained. The K value of the terpolymer is 102 (0.5% by weight in a 5% by weight aqueous NaCl solution).

Starting Polymer VE10: Terpolymer (VFA/MA/Na Methacrylate=70 mol %/25 mol %/5 mol %)

A mixture of 55.9 g of aqueous 30% by weight Na methacrylate solution is adjusted to pH 6.5, 156.1 g of VFA (99%) and 200.0 g of water are provided as feed 1.

66.8 g of MA are provided as feed 2.

1.17 g of 2,2'-azobis (2-methylpropionamidine) dihydrochloride are dissolved in 116.1 g of water at RT as feed 3.

0.70 g of 2,2'-azobis (2-methylpropionamidine) dihydrochloride are dissolved in 69.7 g of water at RT as feed 4.

185.7 g of water are provided as feed 5.

526.7 g of water and 2.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 4.1 g of a 25% by weight sodium hydroxide solution are added, so that a pH of 6.5 is reached. Subsequently, the receiver is heated to 68° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 68° C., the 3 feeds 1 to 3 are started at the same time. Feed 1 is fed in in 3 h, feed 2 in 3.5 h and feed 3 in 4 h. After the end of feed 3, the batch is kept at 68° C. for a further hour. Subsequently, feed 4 is added in 5 minutes and the reaction mixture is kept at 68° C. for a further 1.5 hours. Thereafter, the reflux condenser is replaced by a descending condenser and the internal pressure is slowly reduced by means of a water jet pump to about 320 mbar, so that the reactor contents begin to boil. 185.7 g of water are distilled off under these conditions. Subsequently, the vacuum is broken with air, feed 5 is added and the reaction mixture is cooled to RT.

A yellow, viscous solution having a dry content of 19.2% is obtained. The K value of the terpolymer is 94 (0.5% by weight in a 5% by weight aqueous NaCl solution).

Starting Polymer VE11: Terpolymer (VFA/MA/Na-AMPS=70 mol %/25 mol %/5 mol %)

A mixture of 66 g of aqueous 50% by weight of Na-AMPS solution is adjusted to pH 6.5, 144.6 g of VFA (99%) and 210.0 g of water are provided as feed 1.

61.9 g of MA are provided as feed 2.

1.17 g of 2,2'-azobis (2-methylpropionamidine) dihydrochloride are dissolved in 116.1 g of water at RT as feed 3.

0.71 g of 2,2'-azobis (2-methylpropionamidine) dihydrochloride are dissolved in 69.8 g of water at RT as feed 4.

186.7 g of water are provided as feed 5.

532.8 g of water and 2.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 4.1 g of a 25% by weight sodium hydroxide solution are added, so that a pH of 6.5 is reached. Subsequently, the receiver is heated to 69° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 69° C., the 3 feeds 1 to 3 are started at the same time. Feed 1 is fed in in 3 h, feed 2 in 3.5 h and feed 3 in 4 h. After the end of feed 3, the batch is kept at 69° C. for a further hour. Subsequently, feed 4 is added in 5 minutes and the reaction mixture is kept at 69° C. for a further 1.5 hours. Thereafter, the reflux condenser is replaced by a descending condenser and the internal pressure is slowly reduced by means of a water jet pump to about 300 mbar, so that the reactor contents begin to boil. 186.7 g of water are distilled off under these conditions. Subsequently, the vacuum is broken with air, feed 5 is added and the reaction mixture is cooled to RT.

A yellow, viscous solution having a dry content of 20.0% is obtained. The K value of the terpolymer is 89 (0.5% by weight in a 5% by weight aqueous NaCl solution).

Starting Polymer VE12: Terpolymer (VFA/MA/Na Vinyl Sulfonate=70 mol %/25 mol %/5 mol %)

A mixture of 79.6 g of aqueous 25% by weight of Na vinyl sulfonate solution is adjusted to pH 6.5, 153.9 g of VFA (99%) and 200.0 g of water are provided as feed 1.

65.9 g of MA are provided as feed 2.

1.17 g of 2,2'-azobis (2-methylpropionamidine) dihydrochloride are dissolved in 116.2 g of water at RT as feed 3.

0.70 g of 2,2'-azobis (2-methylpropionamidine) dihydrochloride are dissolved in 69.7 g of water at RT as feed 4.

164.5 g of water are provided as feed 5.

506.1 g of water and 2.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 4.1 g of a 25% by weight sodium hydroxide solution are added, so that a pH of 6.5 is reached. Subsequently, the receiver is heated to 65° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 65° C., the 3 feeds 1 to 3 are started at the same time. Feed 1 is fed in in 3 h, feed 2 in 3.5 h and feed 3 in 4 h. After the end of feed 3, the batch is kept at 65° C. for a further hour. Subsequently, feed 4 is added in 5 minutes and the reaction mixture is kept at 65° C. for a further 1.5 hours. Thereafter, the reflux condenser is replaced by a descending condenser and the internal pressure is slowly reduced by means of a water jet pump to about 300 mbar, so that the reactor contents begin to boil. 164.5 g of water are distilled off under these conditions. Subsequently, the vacuum is broken with air, feed 5 is added and the reaction mixture is cooled to RT.

A yellow, viscous solution having a dry content of 20.7% is obtained. The K value of the terpolymer is 87 (0.5% by weight in a 5% by weight aqueous NaCl solution).

Starting Polymer VE13: Terpolymer (VFA/MA/DADMAC=65 mol %/30 mol %/5 mol %)

A mixture of 138.7 g of VFA (99%) and 200.0 g of water are provided as feed 1.

76.8 g of MA are provided as feed 2.

1.16 g of 2,2'-azobis (2-methylpropionamidine) dihydrochloride are dissolved in 115.2 g of water at RT as feed 3.

0.70 g of 2,2'-azobis (2-methylpropionamidine) dihydrochloride are dissolved in 69.2 g of water at RT as feed 4.

174.4 g of water are provided as feed 5.

554.6 g of water, 37.0 g of an aqueous 65% by weight DADMAC solution and 2.6 g of 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 4.3 g of a 25% by weight sodium hydroxide solution are added, so that a pH of 6.5 is reached. Subsequently, the receiver is heated to 67° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of the oxygen. At a constant internal temperature of 67° C., the 3 feeds 1 to 3 are started at the same time. Feed 1 is fed in in 3 h, feed 2 in 3.5 h and feed 3 in 4 h. After the end of feed 3, the batch is kept at 67° C. for a further hour. Subsequently, feed 4 is added in 5 minutes and the reaction mixture is kept at 67° C. for a further 1.5 hours. Thereafter, the reflux condenser is replaced by a descending condenser and the internal pressure is slowly reduced by means of a water jet pump to about 330 mbar, so that the reactor contents begin to boil. 174.4 g of water are distilled off under these conditions. Subsequently, the vacuum is broken with air, feed 5 is added and the reaction mixture is cooled to RT.

A yellow, viscous solution having a dry content of 19.8% is obtained. The K value of the terpolymer is 82 (0.5% by weight in water).

Starting Polymer VE14: Terpolymer (VFA/MA/APTAC=65 mol %/30 mol %/5 mol %) 134.9 g of VFA (99%) are provided as feed 1.

74.7 g of MA are provided as feed 2.

A mixture of 39.8 g of a 75% strength by weight aqueous solution of APTAC and 200 g of water are provided as feed 3.

1.17 g of 2,2'-azobis (2-methylpropionamidine) dihydrochloride are dissolved in 115.3 g of water at RT as feed 4.

0.70 g of 2,2'-azobis (2-methylpropionamidine) dihydrochloride are dissolved in 69.2 g of water at RT as feed 5.

170.9 g of water are provided as feed 6.

557.5 g of water and 2.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 4.3 g of a 25% by weight sodium hydroxide solution are added, so that a pH of 6.5 is reached. Subsequently, the receiver is heated to 69° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 69° C., the 4 feeds 1 to 4 are started at the same time. Feed 1 is fed in in 3 h, feed 2 in 3.5 h and feed 3 in 4 h. After the end of feed 3, the batch is kept at 69° C. for a further hour. Subsequently, feed 4 is added in 5 minutes and the reaction mixture is kept at 69° C. for a further 1.5 hours. Thereafter, the reflux condenser is replaced by a descending condenser and the internal pressure is slowly reduced by means of a water jet pump to about 330 mbar, so that the reactor contents begin to boil. 170.9 g of water are distilled off under these conditions. Subsequently, the vacuum is broken with air, feed 5 is added and the reaction mixture is cooled to RT.

A yellow, viscous solution having a dry content of 19.6% is obtained. The K value of the terpolymer is 87 (0.5% by weight in water).

Starting Polymer VE15: Terpolymer (VFA/EA/Na Acrylate=70 mol %/15 mol %/15 mol %)

A mixture of 133.1 g of aqueous 32% by weight Na acrylate solution is adjusted to pH 6.5, 151.7 g of VFA (99%) and 200.0 g of water are provided as feed 1.

45.3 g of EA are provided as feed 2.

1.14 g of 2,2'-azobis (2-methylpropionamidine) dihydrochloride are dissolved in 112.7 g of water at RT as feed 3.

0.68 g of 2,2'-azobis (2-methylpropionamidine) dihydrochloride are dissolved in 67.6 g of water at RT as feed 4.

537.8 g of water are provided as feed 5.

481.0 g of water and 2.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 4.1 g of a 25% by weight sodium hydroxide solution are added, so that a pH of 6.5 is reached. Subsequently, the receiver is heated to 72° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 72° C., the 3 feeds 1 to 3 are started at the same time. Feed 1 is fed in in 3 h, feed 2 in 3.5 h and feed 3 in 4 h. After the end of feed 3, the batch is kept at 72° C. for a further hour. Subsequently, feed 4 is added in 5 minutes and the reaction mixture is kept at 72° C. for a further 1.5 hours. Thereafter, the reflux condenser is replaced by a descending condenser and the internal pressure is slowly reduced by means of a water jet pump to about 340 mbar, so that the reactor contents begin to boil. 137.8 g of water are distilled off under these conditions. Subsequently, the vacuum is broken with air, feed 5 is added and the reaction mixture is cooled to RT.

A slightly cloudy, yellow, viscous solution having a dry content of 15.1% is obtained. The K value of the terpolymer (0.5% by weight in a 5% by weight aqueous NaCl solution).

Starting Polymer VE16: Terpolymer (VFA/EA/Na Acrylate=70 mol %/20 mol %/10 mol %)

A mixture of 55.3 g of aqueous 32% by weight Na acrylate solution is adjusted to pH 6.5, 94.5 g of VFA (99%) and 200.0 g of water are provided as feed 1.

37.6 g of EA are provided as feed 2.

0.72 g of 2,2'-azobis (2-methylpropionamidine) dihydrochloride are dissolved in 71.6 g of water at RT as feed 3.

0.43 g of 2,2'-azobis (2-methylpropionamidine) dihydrochloride are dissolved in 43.0 g of water at RT as feed 4.

612.8 g of water and 1.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 2.4 g of a 25% by weight sodium hydroxide solution are added, so that a pH of 6.5 is reached. Subsequently, the receiver is heated to 65° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 65° C., 10% of feed 1 is first added within 3 minutes and mixed in briefly. Then the remainder of feed 1 (90%) and feeds 2 and 3 are started at the same time. The remainder of feed 1 is fed in in 3 h, feed 2 in 3.5 h and feed 3 in 4 h. After the end of feed 3, the batch is kept at 65° C. for a further hour. Subsequently, feed 4 is added in 5 minutes and the reaction temperature is raised to 70° C. The batch is held for 1.5 h at 70° C. Thereafter, the reflux condenser is replaced by a descending condenser and the internal pressure is slowly reduced by means of a water jet pump to about 340 mbar, so that the reactor contents begin to boil. 114.1 g of water are distilled off under these conditions. The vacuum is then broken with air and the reaction mixture is cooled to RT.

A slightly cloudy, yellow, viscous solution having a dry content of 15.2% is obtained. The K value of the terpolymer is 99 (0.5% by weight in a 5% by weight aqueous NaCl solution).

Starting Polymer VE17: Terpolymer (VFA/EA/Na Acrylate=70 mol %/20 mol %/10 mol %)

A mixture of 55.3 g of aqueous 32% by weight Na acrylate solution is adjusted to pH 6.5, 94.5 g of VFA (99%) and 200.0 g of water are provided as feed 1.

37.6 g of EA are provided as feed 2.

0.72 g of 2,2'-azobis (2-methylpropionamidine) dihydrochloride are dissolved in 71.6 g of water at RT as feed 3.

0.43 g of 2,2'-azobis (2-methylpropionamidine) dihydrochloride are dissolved in 43.0 g of water at RT as feed 4.

612.8 g of water and 1.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 2.4 g of a 25% by weight sodium hydroxide solution are added, so that a pH of 6.5 is reached. Subsequently, the receiver is heated to 64° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 64° C., 10% of feed 1 is first added within 3 minutes and mixed in briefly. Then the remainder of feed 1 (90%) and feeds 2 and 3 are started at the same time. The remainder of feed 1 is fed in in 3 h, feed 2 in 3.5 h and feed 3 in 4 h. After the end of feed 3, the batch is kept at 64° C. for a further hour. Subsequently, feed 4 is added in 5 minutes and the reaction temperature is raised to 70° C. The batch is held for 1.5 h at 70° C. Thereafter, the reflux condenser is replaced by a descending condenser and the internal pressure is slowly reduced by means of a water jet pump to about 340 mbar, so that the reactor contents begin to boil. 138.7 g of water are distilled off under these conditions. The vacuum is then broken with air and the reaction mixture is cooled to RT.

A slightly cloudy, yellow, viscous solution having a dry content of 15.6% is obtained. The K value of the terpolymer is 103 (0.5% by weight in a 5% by weight aqueous NaCl solution).

Starting Polymer VE18: Terpolymer (VFA/EA/Na Acrylate=70 mol %/20 mol %/10 mol %)

A mixture of 55.3 g of aqueous 32% by weight Na acrylate solution is adjusted to pH 6.5, 94.5 g of VFA (99%) and 200.0 g of water are provided as feed 1.

37.6 g of EA are provided as feed 2.

0.72 g of 2,2'-azobis (2-methylpropionamidine) dihydrochloride are dissolved in 71.6 g of water at RT as feed 3.

0.43 g of 2,2'-azobis (2-methylpropionamidine) dihydrochloride are dissolved in 43.0 g of water at RT as feed 4.

612.8 g of water and 1.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 2.6 g of a 25% by weight sodium hydroxide solution are added, so that a pH of 6.5 is reached. Subsequently, the receiver is heated to 65° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 65° C., 10% of feed 1 is first added within 3 minutes and mixed in briefly. Then the remainder of feed 1 (90%) and feeds 2 and 3 are started at the same time. The remainder of feed 1 is fed in in 3 h, feed 2 in 3.5 h and feed 3 in 4 h. After the end of feed 3, the batch is kept at 65° C. for a further hour. Subsequently, feed 4 is added in 5 minutes and the reaction temperature is raised to 70° C. The batch is held for 1.5 h at 70° C. Thereafter, the reflux condenser is replaced by a descending condenser and the internal pressure is slowly reduced by means of a water jet pump to about 340 mbar, so that the reactor contents begin to boil. 126.7 g of water are distilled off under these conditions. The vacuum is then broken with air and the reaction mixture is cooled to RT.

A slightly cloudy, yellow, viscous solution having a dry content of 15.4% is obtained. The K value of the terpolymer is 101 (0.5% by weight in a 5% by weight aqueous NaCl solution).

Starting Polymer VE19: Copolymer (VFA/MA=70 mol %/30 mol %)

150.4 g of VFA (99%) are provided as feed 1.

77.3 g of MA are provided as feed 2.

1.13 g of 2,2'-azobis (2-methylpropionamidine) dihydrochloride are dissolved in 112.1 g of water at RT as feed 3.

0.67 g of 2,2'-azobis (2-methylpropionamidine) dihydrochloride are dissolved in 67.2 g of water at RT as feed 4.

168.4 g of water are provided as feed 5.

784.9 g of water and 2.8 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 3.9 g of a 25% by weight sodium hydroxide solution are added, so that a pH of 6.5 is reached. Subsequently, the receiver is heated to 70° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of the oxygen. At a constant internal temperature of 70° C., the 3 feeds 1 to 3 are started at the same time. Feed 1 is fed in in 3 h, feed 2 in 3.5 h and feed 3 in 4 h. After the end of feed 3, the batch is kept at 70° C. for a further hour. Subsequently, feed 4 is added in 5 minutes and the reaction mixture is kept at 70° C. for a further 1.5 hours. Thereafter, the reflux condenser is replaced by a descending condenser and the internal pressure is slowly reduced by means of a water jet pump to about 320 mbar, so that the reactor contents begin to boil. 168.4 g of water are distilled off under these conditions. Subsequently, the vacuum is broken with air, feed 5 is added and the reaction mixture is cooled to RT.

A yellow, viscous solution having a dry content of 18.6% is obtained. The K value of the copolymer is 82 (0.5% by weight in water).

Starting Polymer VE20: Copolymer (VFA/MA=60 mol %/40 mol %)

126.4 g of VFA (99%) are provided as feed 1.
101.0 g of MA are provided as feed 2.
1.13 g of 2,2'-azobis (2-methylpropionamidine) dihydrochloride are dissolved in 112.0 g of water at RT as feed 3.
0.68 g of 2,2'-azobis (2-methylpropionamidine) dihydrochloride are dissolved in 67.2 g of water at RT as feed 4.
188.5 g of water are provided as feed 5.

785.2 g of water and 2.5 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 3.9 g of a 25% by weight sodium hydroxide solution are added, so that a pH of 6.5 is reached. Subsequently, the receiver is heated to 67° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 67° C., the 3 feeds 1 to 3 are started at the same time. Feed 1 is fed in in 3 h, feed 2 in 3.5 h and feed 3 in 4 h. After the end of feed 3, the batch is kept at 67° C. for a further hour. Subsequently, feed 4 is added in 5 minutes and the reaction mixture is kept at 67° C. for a further 1.5 hours. Thereafter, the reflux condenser is replaced by a descending condenser and the internal pressure is slowly reduced by means of a water jet pump to about 300 mbar, so that the reactor contents begin to boil. 188.5 g of water are distilled off under these conditions. Subsequently, the vacuum is broken with air, feed 5 is added and the reaction mixture is cooled to RT.

A yellow, viscous solution having a dry content of 18.7% is obtained. The K value of the copolymer is 84 (0.5% by weight in water).

Starting polymer VE21: Copolymer (VFA/MA=80 mol %/20 mol %)

175.4 g of VFA (99%) are provided as feed 1.
52.6 g of MA are provided as feed 2.
1.13 g of 2,2'-azobis (2-methylpropionamidine) dihydrochloride are dissolved in 112.0 g of water at RT as feed 3.
0.68 g of 2,2'-azobis (2-methylpropionamidine) dihydrochloride are dissolved in 67.2 g of water at RT as feed 4.
163.6 g of water are provided as feed 5.

784.7 g of water and 2.5 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 3.9 g of a 25% by weight sodium hydroxide solution are added, so that a pH of 6.5 is reached. Subsequently, the receiver is heated to 69° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of the oxygen. At a constant internal temperature of 69° C., the 3 feeds 1 to 3 are started at the same time. Feed 1 is fed in in 3 h, feed 2 in 3.5 h and feed 3 in 4 h. After the end of feed 3, the batch is kept at 69° C. for a further hour. Subsequently, feed 4 is added in 5 minutes and the reaction mixture is kept at 69° C. for a further 1.5 hours. Thereafter, the reflux condenser is replaced by a descending condenser and the internal pressure is slowly reduced by means of a water jet pump to about 310 mbar, so that the reactor contents begin to boil. 163.6 g of water are distilled off under these conditions. Subsequently, the vacuum is broken with air, feed 5 is added and the reaction mixture is cooled to RT.

A yellow, viscous solution having a dry content of 19.0% is obtained. The K value of the copolymer is 84 (0.5% by weight in water).

Starting Polymer VE22: Terpolymer (VFA/MA/Na Acrylate=70 mol %/25 mol %/5 mol %)

A mixture of 46.1 g of aqueous 32% by weight Na acrylate solution is adjusted to pH 6.5, 157.5 g of VFA (99%) and 200.0 g of water are provided as feed 1.
67.4 g of MA are provided as feed 2.
1.17 g of 2,2'-azobis (2-methylpropionamidine) dihydrochloride are dissolved in 116.1 g of water at RT as feed 3.
0.70 g of 2,2'-azobis (2-methylpropionamidine) dihydrochloride are dissolved in 69.7 g of water at RT as feed 4.
552.6 g of water are provided as feed 5.

534.7 g of water and 2.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 4.2 g of a 25% by weight sodium hydroxide solution are added, so that a pH of 6.5 is reached. Subsequently, the receiver is heated to 74° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 74° C., the 3 feeds 1 to 3 are started at the same time. Feed 1 is fed in in 3 h, feed 2 in 3.5 h and feed 3 in 4 h. After the end of feed 3, the batch is kept at 74° C. for a further hour. Subsequently, feed 4 is added in 5 minutes and the reaction mixture is kept at 74° C. for a further 1.5 hours. Thereafter, the reflux condenser is replaced by a descending condenser and the internal pressure is slowly reduced by means of a water jet pump to about 300 mbar, so that the reactor contents begin to boil. 152.6 g of water are distilled off under these conditions. Subsequently, the vacuum is broken with air, feed 5 is added and the reaction mixture is cooled to RT.

A yellow, viscous solution having a dry content of 14.5% is obtained. The K value of the terpolymer is 81 (0.5% by weight in a 5% by weight aqueous NaCl solution).

Starting Polymer VE23: Terpolymer (VFA/EA/Na Acrylate=70 mol %/25 mol %/5 mol %)

A mixture of 44.0 g of aqueous 32% by weight Na acrylate solution is adjusted to pH 6.5, 150.6 g of VFA (99%) and 200.0 g of water are provided as feed 1.
186.9 g of EA are provided as feed 2.
1.17 g of 2,2'-azobis (2-methylpropionamidine) dihydrochloride are dissolved in 116.1 g of water at RT as feed 3.
0.70 g of 2,2'-azobis (2-methylpropionamidine) dihydrochloride are dissolved in 69.7 g of water at RT as feed 4.

536.0 g of water and 2.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 4.1 g of a 25% by weight sodium hydroxide solution are added, so that a pH of 6.5 is reached. Subsequently, the receiver is heated to 67° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 67° C., 10% of feed 1 is first added within 3 minutes and mixed in briefly. Then the remainder of feed 1 (90%) and feeds 2 and 3 are started at the same time. The remainder of feed 1 is fed in in 3 h, feed 2 in 3.5 h and feed 3 in 4 h. After the end of feed 3, the batch is kept at 67° C. for a further hour. Subsequently, feed 4 is added in 5 min. The batch is held for 1.5 h at 67° C. Thereafter, the reflux condenser is replaced by a descending condenser and the internal pressure is slowly reduced by means of a water jet pump to about 320 mbar, so that the reactor contents begin to boil. 186.9 g of water are distilled off under these conditions. The vacuum is then broken with air and the reaction mixture is cooled to RT.

A slightly cloudy, yellow, viscous solution having a dry content of 19.9% is obtained. The K value of the terpolymer is 90 (0.5% by weight in a 5% by weight aqueous NaCl solution).

Starting Polymer VE24: Terpolymer (VFA/EA/Na Acrylate=70 mol %/20 mol %/10 mol %)

A mixture of 88.4 g of aqueous 32% by weight Na acrylate solution is adjusted to pH 6.5, 151.1 g of VFA (99%) and 200.0 g of water are provided as feed 1.

60.2 g of EA are provided as feed 2.

1.16 g of 2,2'-azobis (2-methylpropionamidine) dihydrochloride are dissolved in 114.4 g of water at RT as feed 3.

0.69 g of 2,2'-azobis (2-methylpropionamidine) dihydrochloride are dissolved in 68.6 g of water at RT as feed 4.

158.4 g of water are provided as feed 5.

508.6 g of water and 2.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 4.1 g of a 25% by weight sodium hydroxide solution are added, so that a pH of 6.5 is reached. Subsequently, the receiver is heated to 67° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. Feeds 1, 2 and 3 are started at the same time at a constant internal temperature of 67° C. Feed 1 is fed in in 3 h, feed 2 in 3.5 h and feed 3 in 4 h. After the end of feed 3, the batch is kept at 67° C. for a further hour. Subsequently, feed 4 is added in 5 minutes and the reaction temperature is maintained at 67° C. for a further 1.5 hours. Thereafter, the reflux condenser is replaced by a descending condenser and the internal pressure is slowly reduced by means of a water jet pump to about 300 mbar, so that the reactor contents begin to boil. 158.4 g of water are distilled off under these conditions. The vacuum is then broken with air and the reaction mixture is cooled to RT.

A cloudy, yellow, viscous solution having a dry content of 20.1% is obtained. The K value of the terpolymer is 99 (0.5% by weight in a 5% by weight aqueous NaCl solution).

Starting Polymer VE25: Terpolymer (VFA/EA/Na Acrylate=70 mol %/10 mol %/20 mol %)

A mixture of 178.2 g of aqueous 32% by weight Na acrylate solution is adjusted to pH 6.5, 152.3 g of VFA (99%) and 200.0 g of water are provided as feed 1.

30.3 g of EA are provided as feed 2.

1.12 g of 2,2'-azobis (2-methylpropionamidine) dihydrochloride are dissolved in 111.0 g of water at RT as feed 3.

0.67 g of 2,2'-azobis (2-methylpropionamidine) dihydrochloride are dissolved in 66.5 g of water at RT as feed 4.

185.7 g of water are provided as feed 5.

453.2 g of water and 2.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 4.1 g of a 25% by weight sodium hydroxide solution are added, so that a pH of 6.5 is reached. Subsequently, the receiver is heated to 68° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. Feeds 1, 2 and 3 are started at the same time at a constant internal temperature of 68° C. Feed 1 is fed in in 3 h, feed 2 in 3.5 h and feed 3 in 4 h. After the end of feed 3, the batch is kept at 68° C. for a further hour. Subsequently, feed 4 is added in 5 minutes and the reaction temperature is maintained at 68° C. for a further 1.5 hours. Thereafter, the reflux condenser is replaced by a descending condenser and the internal pressure is slowly reduced by means of a water jet pump to about 310 mbar, so that the reactor contents begin to boil. 185.74 g of water are distilled off under these conditions. The vacuum is then broken with air and the reaction mixture is cooled to RT.

A cloudy, yellow, viscous solution having a dry content of 20.3% is obtained. The K value of the terpolymer is 101 (0.5% by weight in a 5% by weight aqueous NaCl solution).

Starting Polymer VE26: Terpolymer (VFA/EA/Na Acrylate=70 mol %/20 mol %/10 mol %)

A mixture of 55.3 g of aqueous 32% by weight Na acrylate solution is adjusted to pH 6.5, 94.5 g of VFA (99%) and 200.0 g of water are provided as feed 1.

37.6 g of EA are provided as feed 2.

0.72 g of 2,2'-azobis (2-methylpropionamidine) dihydrochloride are dissolved in 71.6 g of water at RT as feed 3.

0.43 g of 2,2'-azobis (2-methylpropionamidine) dihydrochloride are dissolved in 43.0 g of water at RT as feed 4.

612.8 g of water and 1.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 2.4 g of a 25% by weight sodium hydroxide solution are added, so that a pH of 6.5 is reached. Subsequently, the receiver is heated to 65° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 65° C., 10% of feed 1 is first added within 3 minutes and mixed in briefly. Then the remainder of feed 1 (90%) and feeds 2 and 3 are started at the same time. The remainder of feed 1 is fed in in 3 h, feed 2 in 3.5 h and feed 3 in 4 h. After the end of feed 3, the batch is kept at 65° C. for a further hour. Subsequently, feed 4 is added in 5 minutes and the reaction temperature is raised to 70° C. The batch is held for 1.5 h at 70° C.

Thereafter, the reflux condenser is replaced by a descending condenser and the internal pressure is slowly reduced by means of a water jet pump to about 300 mbar, so that the reactor contents begin to boil. 120.5 g of water are distilled off under these conditions. The vacuum is then broken with air and the reaction mixture is cooled to RT.

A slightly cloudy, yellow, viscous solution having a dry content of 15.1% is obtained. The K value of the terpolymer is 102 (0.5% by weight in a 5% by weight aqueous NaCl solution).

Starting Polymer VE27: Terpolymer (VFA/MA/AM=70 mol %/25 mol %/5 mol %)

A mixture of 22.6 g of aqueous 50% strength by weight AM solution, 159.9 g of VFA (99%) and 210.0 g of water are provided as feed 1.

68.5 g of MA are provided as feed 2.

1.19 g of 2,2'-azobis (2-methylpropionamidine) dihydrochloride are dissolved in 117.9 g of water at RT as feed 3.

0.71 g of 2,2'-azobis (2-methylpropionamidine) dihydrochloride are dissolved in 70.7 g of water at RT as feed 4.

189.6 g of water are provided as feed 5.

541.8 g of water and 2.6 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 4.1 g of a 25% by weight sodium hydroxide solution are added, so that a pH of 6.5 is reached. Subsequently, the receiver is heated to 69° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. At a constant internal temperature of 69° C., the 3 feeds 1 to 3 are started at the same time. Feed 1 is fed in in 3 h, feed 2 in 3.5 h and feed 3 in 4 h. After the end of feed 3, the batch is kept at 69° C. for a further hour. Subsequently, feed 4 is added in 5 minutes and the reaction mixture is kept at 69° C. for a further 1.5 hours. Thereafter, the reflux condenser is replaced by a descending condenser and the internal pressure is slowly reduced by means of a water jet pump to about 310 mbar, so that the reactor contents begin to boil. 189.6 g of water are distilled off under these conditions. Subsequently, the vacuum is broken with air, feed 5 is added and the reaction mixture is cooled to RT.

A yellow, viscous solution having a dry content of 21.9% is obtained. The K value of the terpolymer is 89 (0.5% by weight in water).

Starting Polymer VV1: Copolymer (VFA/Na Acrylate=70 mol %/30 mol %)

A mixture of 316.7 g of aqueous 50% strength by weight Na-acrylate solution, 180.5 g of VFA (99%) and 141.0 g of water are provided as feed 1.

1.79 g of 2,2'-azobis (2-methylpropionamidine) dihydrochloride are dissolved in 176.9 g of water at RT as feed 2.

573.4 g of water and 3.0 g 75% by weight phosphoric acid are placed in a 2 L glass apparatus with anchor stirrer, reflux condenser, internal thermometer and nitrogen inlet tube. The reactor is located in a water bath with heating-cooling unit, which automatically regulates the internal temperature. At a speed of 100 rpm, about 5.2 g of a 25% by weight sodium hydroxide solution are added, so that a pH of 6.5 is reached. Subsequently, the receiver is heated to 80° C. in 30 minutes and nitrogen (20 L/h) is introduced at the same time to displace the oxygen in the apparatus. Thereafter, the introduction of nitrogen is stopped and, for the further course of the polymerization, passed only via the reflux condenser in order to prevent further diffusion of oxygen. Feeds 1, 2 and 2 are started at the same time at a constant internal temperature of 80° C. Feed 1 is fed in 1.5 h and feed 2 in 2.5 h. The batch is kept at 80° C. for a further 2.5 h after the end of feed 2. Thereafter, the reflux condenser is replaced by a descending condenser and the internal pressure is slowly reduced by means of a water jet pump to about 460 mbar, so that the reactor contents begin to boil. 178.7 g of water are distilled off under these conditions. The vacuum is then broken with air and the reaction mixture is cooled to RT.

A yellow, viscous solution having a dry content of 24.1% is obtained. The K value of the copolymer is 88 (0.5% by weight in a 5% aqueous NaCl solution).

A-3) Preparation of the Final Polymers by Hydrolysis of the Starting Polymers

Final Polymer AE1: Acid Hydrolyzed Starting Polymer VE1 (VFA/MA=70 mol %/30 mol %)

150.1 g of the polymer solution obtained in the starting polymer VE1 are mixed in a 500 ml four-necked flask with paddle stirrer, internal thermometer, dropping funnel and reflux condenser at a stirrer speed of 80 rpm with 1.3 g of a 40% strength by weight aqueous sodium bisulfite solution and then heated to 80° C. Then, 30.0 g of a 37% strength by weight hydrochloric acid (120 mol % on VFA) are added. The mixture is kept at 80° C. for 5 h. The product obtained is cooled to RT and adjusted to pH 6.0 by the addition of 64.8 g of a 25% by weight sodium hydroxide solution.

A slightly cloudy, yellowish and viscous polymer solution having a polymer content of 8.3% is obtained. The degree of hydrolysis HA is 98 mol % and the degree of reaction HE 100 mol %.

Final Polymer AE2: Acid Hydrolyzed Starting Polymer VE2 (VFA/MA=70 mol %/30 mol %)

170.5 g of the polymer solution obtained in the starting polymer VE2 are mixed in a 500 ml four-necked flask with paddle stirrer, internal thermometer, dropping funnel and reflux condenser at a stirrer speed of 80 rpm with 1.5 g of a 40% strength by weight aqueous sodium bisulfite solution and then heated to 80° C. Then 56.3 g of a 25% by weight aqueous sodium hydroxide solution (120 mol % of VFA) was added. The mixture is kept at 80° C. for 5 h. The resulting product is cooled to RT and adjusted to pH 6.0 by the addition of 20.1 g of 37% strength by weight hydrochloric acid and 1.3 g of water.

A slightly cloudy, yellowish and viscous polymer solution having a polymer content of 7.9% is obtained. The degree of hydrolysis HA is 96 mol % and the degree of reaction HE 100 mol %.

Final Polymer AE3: Alkaline Hydrolyzed Starting Polymer VE3 (VFA/MA/Na Acrylate=70 mol %/29 mol %/1 mol %)

173.4 g of the polymer solution obtained in the starting polymer VE3 are mixed in a 500 ml four-necked flask with paddle stirrer, internal thermometer, dropping funnel and reflux condenser at a stirrer speed of 80 rpm with 1.6 g of a 40% strength by weight aqueous sodium bisulfite solution and 55.0 g water and then heated to 80° C. Then 59.3 g of a 25% by weight aqueous sodium hydroxide solution (120 mol % of VFA) was added. The mixture is kept at 80° C. for 5 h. The resulting product is cooled to RT and adjusted to pH 6.0 by the addition of 21.7 g of 37% strength by weight hydrochloric acid and 9.4 g of water.

A slightly cloudy, yellowish and viscous polymer solution having a polymer content of 7.7% is obtained. The degree of hydrolysis HA is 99 mol % and the degree of reaction HE 100 mol %.

Final Polymer AE4: Alkaline Hydrolyzed Terpolymer VE4 (VFA/MA/Na Acrylate=70 mol %/28 mol %/2 mol %)

174.1 g of the polymer solution obtained in the starting polymer VE4 are mixed in a 500 ml four-necked flask with paddle stirrer, internal thermometer, dropping funnel and reflux condenser at a stirrer speed of 80 rpm with 1.6 g of a 40% strength by weight aqueous sodium bisulfite solution and 54.0 g water and then heated to 80° C. Then 58.8 g of a 25% by weight aqueous sodium hydroxide solution (120 mol % of VFA) was added. The mixture is kept at 80° C. for 5 h. The resulting product is cooled to RT and adjusted to pH 6.0 by the addition of 22.5 g of 37% strength by weight hydrochloric acid and 7.0 g of water.

A slightly cloudy, yellowish and viscous polymer solution having a polymer content of 7.7% is obtained. The degree of hydrolysis HA is 98 mol % and the degree of reaction HE 100 mol %.

Final Polymer AE5: Alkaline Hydrolyzed Terpolymer VE5 (VFA/MA/Na Acrylate=70 mol %/25 mol %/5 mol %)

173.6 g of the polymer solution obtained in the starting polymer VE5 are mixed in a 500 ml four-necked flask with paddle stirrer, internal thermometer, dropping funnel and reflux condenser at a stirrer speed of 80 rpm with 1.6 g of a 40% strength by weight aqueous sodium bisulfite solution and 62.0 g water and then heated to 80° C. Then 58.5 g of a 25% by weight aqueous sodium hydroxide solution (120 mol % of VFA) was added. The mixture is kept at 80° C. for 5 h. The product obtained is cooled to RT and adjusted to pH 6.0 by the addition of 23.8 g of a 37% by weight hydrochloric acid.

A slightly cloudy, yellowish and viscous polymer solution having a polymer content of 7.6% is obtained. The degree of hydrolysis HA is 99 mol % and the degree of reaction HE 100 mol %.

Final Polymer AE6: Alkaline Hydrolyzed Terpolymer VE6 (VFA/MA/Na Acrylate=70 mol %/25 mol %/5 mol %)

149.9 g of the polymer solution obtained in the starting polymer VE6 are mixed in a 500 ml four-necked flask with paddle stirrer, internal thermometer, dropping funnel and reflux condenser at a stirrer speed of 80 rpm with 1.0 g of a 40% strength by weight aqueous sodium bisulfite solution and 136.0 g water and then heated to 80° C. Then 36.2 g of a 25% by weight aqueous sodium hydroxide solution (120 mol % of VFA) was added. The mixture is kept at 80° C. for 5 h. The resulting product is cooled to RT and adjusted to pH 6.0 by the addition of 13.7 g of 37% strength by weight hydrochloric acid and 7.5 g of water.

A slightly cloudy, yellowish and viscous polymer solution having a polymer content of 4.5% is obtained. The degree of hydrolysis HA is 93 mol % and the degree of reaction HE 100 mol %.

Final Polymer AE7: Alkaline Hydrolyzed Terpolymer VE7 (VFA/MA/Na Acrylate=70 mol %/20 mol %/10 mol %)

170.4 g of the polymer solution obtained in the starting polymer VE7 are mixed in a 500 ml four-necked flask with paddle stirrer, internal thermometer, dropping funnel and reflux condenser at a stirrer speed of 80 rpm with 1.6 g of a 40% strength by weight aqueous sodium bisulfite solution and 57.0 g water and then heated to 80° C. Then 58.90 g of a 25% by weight aqueous sodium hydroxide solution (120 mol % of VFA) was added. The mixture is kept at 80° C. for 5 h. The resulting product is cooled to RT and adjusted to pH 6.0 by the addition of 25.1 g of 37% strength by weight hydrochloric acid and 4.5 g of water.

A slightly cloudy, yellowish and viscous polymer solution having a polymer content of 7.5% is obtained. The degree of hydrolysis HA is 99 mol % and the degree of reaction HE 100 mol %.

Final Polymer AE8: Alkaline Hydrolyzed Terpolymer VE8 (VFA/MA/Na Acrylate=70 mol %/15 mol %/15 mol %)

171.0 g of the polymer solution obtained in the starting polymer VE8 are mixed in a 500 ml four-necked flask with paddle stirrer, internal thermometer, dropping funnel and reflux condenser at a stirrer speed of 80 rpm with 1.6 g of a 40% strength by weight aqueous sodium bisulfite solution and 63.0 g water and then heated to 80° C. Then 57.8 g of a 25% by weight aqueous sodium hydroxide solution (120 mol % of VFA) was added. The mixture is kept at 80° C. for 5 h. The product obtained is cooled to RT and adjusted to pH 6.0 by the addition of 27.5 g of a 37% by weight hydrochloric acid.

A slightly cloudy, yellowish and viscous polymer solution having a polymer content of 7.5% is obtained. The degree of hydrolysis HA is 94 mol % and the degree of reaction HE 100 mol %.

Final Polymer AE9: Alkaline Hydrolyzed Terpolymer VE9 (VFA/MA/Na Acrylate=70 mol %/10 mol %/20 mol %)

177.9 g of the polymer solution obtained in the starting polymer VE9 are mixed in a 500 ml four-necked flask with paddle stirrer, internal thermometer, dropping funnel and reflux condenser at a stirrer speed of 80 rpm with 1.7 g of a 40% strength by weight aqueous sodium bisulfite solution and 65.0 g water and then heated to 80° C. Then 61.5 g of a 25% by weight aqueous sodium hydroxide solution (120 mol % of VFA) was added. The mixture is kept at 80° C. for 5 h. The resulting product is cooled to RT and adjusted to pH 6.0 by the addition of 31.3 g of 37% strength by weight hydrochloric acid and 1.8 g of water.

A slightly cloudy, yellowish and viscous polymer solution having a polymer content of 7.2% is obtained. The degree of hydrolysis HA is 99 mol % and the degree of reaction HE 100 mol %.

Final Polymer AE10: Alkaline Hydrolyzed Terpolymer VE10 (VFA/MA/Na Methacrylate=70 mol %/25 mol %/5 mol %)

170.2 g of the polymer solution VE10 obtained above are mixed in a 500 ml four-necked flask with paddle stirrer, internal thermometer, dropping funnel and reflux condenser at a stirrer speed of 80 rpm with 1.5 g of a 40% strength by weight aqueous sodium bisulfite solution and 50.0 g of water and then heated to 80° C. Then 56.3 g of a 25% by weight aqueous sodium hydroxide solution (120 mol % of VFA) was added. The mixture is kept at 80° C. for 5 h. The resulting product is cooled to RT and adjusted to pH 6.0 by the addition of 22.2 g of 37% strength by weight hydrochloric acid and 8.4 g of water.

A slightly cloudy, yellowish and viscous polymer solution having a polymer content of 7.2% is obtained. The degree of hydrolysis HA is 97 mol % and the degree of reaction HE 100 mol %.

Final Polymer AE11: Alkaline Hydrolyzed Terpolymer VE11 (VFA/MA/Na-AMPS=70 mol %/25 mol %/5 mol %)

172.1 g of the polymer solution obtained in the starting polymer VE11 are mixed in a 500 ml four-necked flask with paddle stirrer, internal thermometer, dropping funnel and reflux condenser at a stirrer speed of 80 rpm with 1.5 g of a 40% strength by weight aqueous sodium bisulfite solution and 65.5 g water and then heated to 80° C. Then 55.9 g of a 25% by weight aqueous sodium hydroxide solution (120 mol % of VFA) was added. The mixture is kept at 80° C. for 5 h. The resulting product is cooled to RT and adjusted to pH 6.0 by the addition of 22.7 g of 37% strength by weight hydrochloric acid and 7.8 g of water.

A slightly cloudy, yellowish and viscous polymer solution having a polymer content of 7.5% is obtained. The degree of hydrolysis HA is 94 mol % and the degree of reaction HE 100 mol %.

Final Polymer AE12: Alkaline Hydrolyzed Terpolymer VE12 (VFA/MA/Na Vinyl Sulfonate=70 mol %/25 mol %/5 mol %)

178.5 g of the polymer solution obtained in the starting polymer VE12 are mixed in a 500 ml four-necked flask with paddle stirrer, internal thermometer, dropping funnel and reflux condenser at a stirrer speed of 80 rpm with 1.7 g of a 40% strength by weight aqueous sodium bisulfite solution and 75.0 g water and then heated to 80° C. Then 62.8 g of a 25% by weight aqueous sodium hydroxide solution (120 mol % of VFA) was added. The mixture is kept at 80° C. for 5 h. The resulting product is cooled to RT and adjusted to pH 6.0 by the addition of 25.4 g of 37% strength by weight hydrochloric acid and 5.6 g of water.

A slightly cloudy, yellowish and viscous polymer solution having a polymer content of 7.7% is obtained. The degree of hydrolysis HA is 98 mol % and the degree of reaction HE 100 mol %.

Final Polymer AE13: Alkaline Hydrolyzed Terpolymer VE13 (VFA/MA/Na-DADMAC=65 mol %/30 mol %/5 mol %)

177.6 g of the polymer solution obtained in the starting polymer VE13 are mixed in a 500 ml four-necked flask with paddle stirrer, internal thermometer, dropping funnel and reflux condenser at a stirrer speed of 80 rpm with 1.5 g of a 40% strength by weight aqueous sodium bisulfite solution and 70.0 g water and then heated to 80° C. Then 53.8 g of a 25% by weight aqueous sodium hydroxide solution (120 mol % of VFA) was added. The mixture is kept at 80° C. for 1 h. The product obtained turns out to be no longer stirrable. The experiment is canceled.

Final Polymer AE14: Alkaline Hydrolyzed Terpolymer VE14 (VFA/MA/Na-APTAC=65 mol %/30 mol %/5 mol %)

178.0 g of the polymer solution obtained in the starting polymer VE14 are mixed in a 500 ml four-necked flask with paddle stirrer, internal thermometer, dropping funnel and reflux condenser at a stirrer speed of 80 rpm with 1.4 g of a 40% strength by weight aqueous sodium bisulfite solution and 60.0 g water and then heated to 80° C. Then 51.8 g of a 25% by weight aqueous sodium hydroxide solution (120 mol % of VFA) was added. The mixture is kept at 80° C. for 5 h. The resulting product is cooled to RT and adjusted to pH 6.0 by the addition of 18.1 g of 37% strength by weight hydrochloric acid and 19.1 g of water.

A slightly cloudy, yellowish and viscous polymer solution having a polymer content of 7.5% is obtained. The degree of hydrolysis HA is 95 mol % and the degree of reaction HE 100 mol %.

Final Polymer AE15: Alkaline Hydrolyzed Terpolymer VE15 (VFA/EA/Na Acrylate=70 mol %/15 mol %/15 mol %)

222.5 g of the polymer solution obtained in the starting polymer VE15 are mixed in a 500 ml four-necked flask with paddle stirrer, internal thermometer, dropping funnel and reflux condenser at a stirrer speed of 80 rpm with 1.5 g of a 40% strength by weight aqueous sodium bisulfite solution and 10.0 g water and then heated to 80° C. Then 56.3 g of a 25% by weight aqueous sodium hydroxide solution (120 mol % of VFA) was added. The mixture is kept at 80° C. for 5 h. The resulting product is cooled to RT and adjusted to pH 6.0 by the addition of 25.6 g of 37% strength by weight hydrochloric acid and 1.1 g of water.

A slightly cloudy, yellowish and viscous polymer solution is obtained.

Polymer content: 7.5%
Formate content FA: 91.4 mmol/100 g
Degree of hydrolysis HA: 98 mol %
Degree of reaction HE: 100 mol %
Charge density LD: 64.0 mmol/100 g
Viscosity (20 rpm, RV, spindle 3): 185 mPas
FAD ($^{13}$C NMR, 152.3 ppm): 1.11
FFA ($^{13}$C NMR, 164-167 ppm): 0.82
VFA$^0$: 93.7 mmol/100 g
EA$^0$: 20.0 mmol/100 g
Na-AS$^0$: 20.0 mmol/100 g.

Final Polymer AE16: Alkaline Hydrolyzed Terpolymer VE16 (VFA/EA/Na Acrylate=70 mol %/20 mol %/10 mol %)

652.7 g of the polymer solution obtained in the starting polymer VE16 are mixed in a 500 ml four-necked flask with paddle stirrer, internal thermometer, dropping funnel and reflux condenser at a stirrer speed of 80 rpm with 4.5 g of a 40% strength by weight aqueous sodium bisulfite solution and 185.3 g water and then heated to 80° C. Then 165.3 g of a 25% by weight aqueous sodium hydroxide solution (120 mol % of VFA) was added. The mixture is kept at 80° C. for 6 h. The resulting product is cooled to RT and adjusted to pH 6.0 by the addition of 70.2 g of 37% strength by weight hydrochloric acid and 12.7 g of water.

A slightly cloudy, yellowish and viscous polymer solution is obtained.

Polymer content: 6.6%
Formate content FA: 74.0 mmol/100 g
Degree of hydrolysis HA: 94 mol %
Degree of conversion HE: 100 mol %
Charge density LD: 51.3 mmol/100 g
Viscosity (20 rpm, RV, spindle 3) 268 mPas
FAD ($^{13}$C NMR, 152.3 ppm): 1.86
FFA ($^{13}$C NMR, 164-167 ppm): 2.78
VFA$^0$: 79.5 mmol/100 g
EA$^0$: 22.7 mmol/100 g
Na-AS$^0$: 11.4 mmol/100 g.

Final Polymer AE17: Alkaline Hydrolyzed Terpolymer VE17 (VFA/EA/Na Acrylate=70 mol %/20 mol %/10 mol %)

249.5 g of the polymer solution obtained in the starting polymer VE17 are mixed in a 500 ml four-necked flask with paddle stirrer, internal thermometer, dropping funnel and reflux condenser at a stirrer speed of 80 rpm with 1.8 g of a 40% strength by weight aqueous sodium bisulfite solution and 20.0 g water and then heated to 80° C. Then 53.9 g of a 25% by weight aqueous sodium hydroxide solution (100 mol % of VFA) was added. The mixture is kept at 80° C. for 6 h. The product obtained is cooled to RT and adjusted to pH 6.0 by the addition of 20.7 g of a 37% by weight hydrochloric acid.

A slightly cloudy, yellowish and viscous polymer solution is obtained.

Polymer content: 8.4%
Formate content FA: 83.4 mmol/100 g
Degree of hydrolysis HA: 85 mol %
Degree of reaction HE: 100 mol %
Charge density LD: 56.7 mmol/100 g
Viscosity (50 1/min, RV, spindle 3) 1172 mPas
FAD ($^{13}$C NMR, 152.3 ppm): 0.90

FFA ($^{13}$C NMR, 164-167 ppm) 3.82
VFA$^O$: 98.3 mmol/100 g
EA$^O$: 28.1 mmol/100 g
Na-AS$^O$: 14.0 mmol/100 g.

Final Polymer AE18: Alkaline Hydrolyzed Terpolymer VE18 (VFA/EA/Na Acrylate=70 mol %/20 mol %/10 mol %)

248.8 g of the polymer solution obtained in the starting polymer VE18 are mixed in a 500 ml four-necked flask with paddle stirrer, internal thermometer, dropping funnel and reflux condenser at a stirrer speed of 80 rpm with 1.7 g of a 40% strength by weight aqueous sodium bisulfite solution and 20.0 g water and then heated to 50° C. Then 63.7 g of a 25% by weight aqueous sodium hydroxide solution (120 mol % of VFA) was added. The mixture is kept at 50° C. for 24 h. The product obtained is cooled to RT and adjusted to pH 6.0 by the addition of 27.9 g of a 37% by weight hydrochloric acid.

A slightly cloudy, yellowish and viscous polymer solution is obtained.
Polymer content: 8.2%
Formate content FA: 88.2 mmol/100 g
Degree of hydrolysis HA: 91 mol %
Degree of reaction HE: 100 mol %
Charge density LD: 67.7 mmol/100 g
Viscosity (50 1/min, RV, spindle 3) 866 mPas
FAD ($^{13}$C NMR, 152.3 ppm): 0.77
FFA ($^{13}$C NMR, 164-167 ppm): 3.14
VFA$^O$: 97.7 mmol/100 g
EA$^O$: 27.9 mmol/100 g
Na-AS$^O$: 14.0 mmol/100 g.

Final Polymer AE19: Alkaline Hydrolyzed Starting Polymer VE19 (VFA/MA=70 mol %/30 mol %)

121.3 g of the polymer solution obtained in the starting polymer VE19 are mixed in a 500 ml four-necked flask with paddle stirrer, internal thermometer, dropping funnel and reflux condenser at a stirrer speed of 80 rpm with 1.1 g of a 40% strength by weight aqueous sodium bisulfite solution and then heated to 80° C. Then 39.5 g of a 25% by weight aqueous sodium hydroxide solution (120 mol % of VFA) was added. The mixture is kept at 80° C. for 5 h. The product obtained is cooled to RT and adjusted to pH 6.0 by the addition of 14.5 g of a 37% by weight hydrochloric acid.

A slightly cloudy, yellowish and viscous polymer solution is obtained.
Polymer content: 7.9%
Formate content FA: 97.5 mmol/100 g
Degree of hydrolysis HA: 99 mol %
Degree of reaction HE: 100 mol %
Charge density LD: 64.3 mmol/100 g
Viscosity (20 1/min, RV, spindle 3) 794 mPas
FAD ($^{13}$C NMR, 152.3 ppm): 10.0
FFA ($^{13}$C NMR, 164-167 ppm): <0.01
VFA$^O$: 98.8 mmol/100 g
MA$^O$: 42.3 mmol/100 g.

Final Polymer AE20: Alkaline Hydrolyzed Starting Polymer VE20 (VFA/MA=60 mol %/40 mol %)

180.0 g of the polymer solution obtained in the starting polymer VE20 are mixed in a 500 ml four-necked flask with paddle stirrer, internal thermometer, dropping funnel and reflux condenser at a stirrer speed of 80 rpm with 1.3 g of a 40% strength by weight aqueous sodium bisulfite solution and then heated to 80° C. Then 51.4 g of a 25% by weight aqueous sodium hydroxide solution (125 mol % of VFA) was added. The mixture is kept at 80° C. for 5 h. The resulting product is cooled to RT and adjusted to pH 6.0 by the addition of 14.2 g of 37% strength by weight hydrochloric acid and 10.4 g of water.

A slightly cloudy, yellowish and viscous polymer solution is obtained.
Polymer content: 8.3%
Formate content FA: 76.5 mmol/100 g
Degree of hydrolysis HA: 94 mol %
Degree of reaction HE: 100 mol %
Charge density LD: 34.0 mmol/100 g
Viscosity (20 1/min, RV, spindle 3) 2320 mPas
FAD ($^{13}$C NMR, 152.3 ppm): 5.1
FFA ($^{13}$C NMR, 164-167 ppm): 0.9
VFA$^O$: 98.8 mmol/100 g
MA$^O$: 42.3 mmol/100 g.

Final Polymer AE21: Alkaline Hydrolyzed Starting Polymer VE21 (VFA/MA=80 mol %/20 mol %)

197.6 g of the polymer solution obtained in the starting polymer VE21 are mixed in a 500 ml four-necked flask with paddle stirrer, internal thermometer, dropping funnel and reflux condenser at a stirrer speed of 80 rpm with 2.1 g of a 40% strength by weight aqueous sodium bisulfite solution and then heated to 80° C. Then 73.8 g of a 25% by weight aqueous sodium hydroxide solution (116 mol % of VFA) was added. The mixture is kept at 80° C. for 5 h. The resulting product is cooled to RT and adjusted to pH 6.0 by the addition of 32.5 g of 37% strength by weight hydrochloric acid and 130.2 g of water.

A slightly cloudy, yellowish and viscous polymer solution is obtained.
Polymer content: 7.0%
Formate content FA: 105.8 mmol/100 g
Degree of hydrolysis HA: 98 mol %
Degree of reaction HE: 100 mol %
Charge density LD: 79.5 mmol/100 g
Viscosity (20 1/min, RV, spindle 3) 755 mPas
FAD ($^{13}$C NMR, 152.3 ppm): 10.0
FFA ($^{13}$C NMR, 164-167 ppm): 2.9
VFA$^O$: 108 mmol/100 g
MA$^O$: 42.3 mmol/100 g.

Final Polymer AE22: Alkaline Hydrolyzed Terpolymer VE22 (VFA/MA/Na Acrylate=70 mol %/25 mol %/5 mol %)

265.8 g of the polymer solution obtained in the starting polymer VE22 are mixed in a 500 ml four-necked flask with paddle stirrer, internal thermometer, dropping funnel and reflux condenser at a stirrer speed of 80 rpm with 1.8 g of a 40% strength by weight aqueous sodium bisulfite solution and then heated to 80° C. Then 67.1 g of a 25% by weight aqueous sodium hydroxide solution (120 mol % of VFA) was added. The mixture is kept at 80° C. for 5 h. The resulting product is cooled to RT and adjusted to pH 6.0 by the addition of 26.0 g of 37% strength by weight hydrochloric acid and 3.3 g of water.

A slightly cloudy, yellowish and viscous polymer solution is obtained.
Polymer content: 7.7%
Formate content FA: 94.8 mmol/100 g
Degree of hydrolysis HA: 98 mol %
Degree of reaction HE: 100 mol %
Charge density LD: 66.0 mmol/100 g
Viscosity (20 1/min, RV, spindle 3) 325 mPas
FAD ($^{13}$C NMR, 152.3 ppm): 1.90
FFA ($^{13}$C NMR, 164-167 ppm): 2.80
VFA$^O$: 96.7 mmol/100 g
MA$^O$: 34.6 mmol/100 g
Na-AS$^O$: 6.9 mmol/100 g.

Final Polymer AE23: Alkaline Hydrolyzed Terpolymer VE23 (VFA/EA/Na Acrylate=70 mol %/25 mol %/5 mol %)

174.4 g of the polymer solution obtained in the starting polymer VE23 are mixed in a 500 ml four-necked flask with paddle stirrer, internal thermometer, dropping funnel and reflux condenser at a stirrer speed of 80 rpm with 1.6 g of a 40% strength by weight aqueous sodium bisulfite solution and 64.0 g water and then heated to 50° C. Then 57.5 g of a 25% by weight aqueous sodium hydroxide solution (120 mol % of VFA) was added. The mixture is kept at 50° C. for 24 h. The resulting product is cooled to RT and adjusted to pH 6.0 by the addition of 22.7 g of 37% strength by weight hydrochloric acid and 6.5 g of water.

A slightly cloudy, yellowish and viscous polymer solution is obtained.

Polymer content: 7.8%
Formate content FA: 89.0 mmol/100 g
Degree of hydrolysis HA: 97 mol %
Degree of reaction HE: 100 mol %
Charge density LD: 66.9 mmol/100 g
Viscosity (50 1/min, RV, spindle 3) 715 mPas
FAD ($^{13}$C NMR, 152.3 ppm): 2.0
FFA ($^{13}$C NMR, 164-167 ppm): 2.8
VFA$^0$: 92.5 mmol/100 g
EA$^0$: 33.0 mmol/100 g
Na-AS$^0$: 6.6 mmol/100 g.

Final Polymer AE24: Alkaline Hydrolyzed Terpolymer VE24 (VFA/EA/Na Acrylate=70 mol %/20 mol %/10 mol %)

173.1 g of the polymer solution obtained in the starting polymer VE24 are mixed in a 500 ml four-necked flask with paddle stirrer, internal thermometer, dropping funnel and reflux condenser at a stirrer speed of 80 rpm with 2.6 g of a 40% strength by weight aqueous sodium bisulfite solution and 65.0 g water and then heated to 80° C. Then 58.1 g of a 25% by weight aqueous sodium hydroxide solution (120 mol % of VFA) was added. The mixture is kept at 80° C. for 6 h. The resulting product is cooled to RT and adjusted to pH 6.0 by the addition of 24.6 g of 37% strength by weight hydrochloric acid and 6.0 g of water.

A slightly cloudy, yellowish and viscous polymer solution is obtained.

Polymer content: 7.7%
Formate content FA: 87.9 mmol/100 g
Degree of hydrolysis HA: 96 mol %
Degree of reaction HE: 100 mol %
Charge density LD: 55.0 mmol/100 g
Viscosity (20 1/min, RV, spindle 3) 735 mPas
FAD ($^{13}$C NMR, 152.3 ppm): 1.93
FFA ($^{13}$C NMR, 164-167 ppm): 2.65
VFA$^0$: 92.85 mmol/100 g
Na-AS$^0$: 13.3 mmol/100 g
EA$^0$: 26.5 mmol/100 g.

Final Polymer AE25: Alkaline Hydrolyzed Terpolymer VE25 (VFA/EA/Na Acrylate=70 mol %/10 mol %/20 mol %)

185.3 g of the polymer solution obtained in the starting polymer VE25 are mixed in a 500 ml four-necked flask with paddle stirrer, internal thermometer, dropping funnel and reflux condenser at a stirrer speed of 80 rpm with 1.7 g of a 40% strength by weight aqueous sodium bisulfite solution and 65.0 g water and then heated to 80° C. Then 63.2 g of a 25% by weight aqueous sodium hydroxide solution (120 mol % of VFA) was added. The mixture is kept at 80° C. for 6 h. The resulting product is cooled to RT and adjusted to pH 6.0 by the addition of 31.2 g of 37% strength by weight hydrochloric acid and 1.3 g of water.

A slightly cloudy, yellowish and viscous polymer solution is obtained.

Polymer content: 7.3%
Formate content FA: 92.0 mmol/100 g
Degree of hydrolysis HA: 99 mol %
Degree of reaction HE: 100 mol %
Charge density LD: 70.1 mmol/100 g
Viscosity (20 1/min, RV, spindle 3) 535 mPas
FAD ($^{13}$C NMR, 152.3 ppm): 2.18
FFA ($^{13}$C NMR, 164-167 ppm): 2.20
VFA$^0$: 92.85 mmol/100 g
EA$^0$: 26.5 mmol/100 g
Na-AS$^0$: 13.3 mmol/100 g.

Final Polymer AE26: Alkaline Hydrolyzed Terpolymer VE26 (VFA/EA/Na Acrylate=70 mol %/20 mol %/10 mol %)

169.1 g of the polymer solution obtained in the starting polymer VE26 are mixed in a 500 ml four-necked flask with paddle stirrer, internal thermometer, dropping funnel and reflux condenser at a stirrer speed of 80 rpm with 1.2 g of a 40% strength by weight aqueous sodium bisulfite solution and 20.0 g water and then heated to 50° C. Then 29.0 g of a 25% by weight aqueous sodium hydroxide solution (82 mol % of VFA) was added. The mixture is kept at 50° C. for 24 h. The resulting product is cooled to RT and adjusted to pH 6.0 by the addition of 10.7 g of 37% strength by weight hydrochloric acid and 5.3 g of water.

A slightly cloudy, yellowish and viscous polymer solution is obtained.

Polymer content: 7.9%
Formate content FA: 63.2 mmol/100 g
Degree of hydrolysis HA: 72 mol %
Degree of reaction HE: 100 mol %
Charge density LD: 39.8 mmol/100 g
Viscosity (50 1/min, RV, spindle 3) 594 mPas
FAD ($^{13}$C NMR, 152.3 ppm): 4.1
FFA ($^{13}$C NMR, 164-167 ppm): 4.0
VFA$^0$: 88.4 mmol/100 g
EA$^0$: 25.3 mmol/100 g
Na-AS$^0$: 12.6 mmol/100 g.

Final Polymer AE27: Alkaline Hydrolyzed Terpolymer VE18 (VFA/EA/Na Acrylate=70 mol %/20 mol %/10 mol %)

1006.2 g of the polymer solution obtained in the starting polymer VE18 are mixed in a pressure-resistant 2 L steel reactor with stirrer, internal thermometer, a heating/cooling jacket, pressure gauge, pressure relief valve, reflux condenser and a pressure-resistant feed vessel with stirring with 126.4 g of water and heated to 107° C. This forms a pressure of 2.8 bar. 256.8 g of a 25% by weight aqueous sodium hydroxide solution (120 mol % of VFA) are provided in the feed vessel. The sodium hydroxide is pressed into the reactor at 5 bar pressure and mixed in. In this case, a temperature of 100° C. is obtained and held for 60 min. Then the reactor is cooled to RT as fast as possible. 306.9 g of the obtained product are adjusted to pH 6.0 by the addition of 26.4 g of 37% by weight hydrochloric acid and 3.7 g of water.

A slightly cloudy, yellowish and viscous polymer solution is obtained.

Polymer content: 7.3%
Formate content FA: 90.1 mmol/100 g
Degree of hydrolysis HA: 94 mol %
Degree of reaction HE: 100 mol %
Charge density LD: 66.5 mmol/100 g
Viscosity (20 1/min, RV, spindle 3) 1030 mPas
FAD ($^{13}$C NMR, 152.3 ppm): 1.79
FFA ($^{13}$C NMR, 164-167 ppm): 1.46

VFA⁰: 97.2 mmol/100 g
EA⁰: 27.8 mmol/100 g
Na-AS⁰: 13.9 mmol/100 g.

Final Polymer AE28: Alkaline Hydrolyzed Terpolymer VE18 (VFA/EA/Na Acrylate=70 mol %/20 mol %/10 mol %)

990.2 g of the polymer solution obtained in the starting polymer VE18 are mixed in a pressure-resistant 2 L steel reactor with stirrer, internal thermometer, a heating/cooling jacket, pressure gauge, pressure relief valve, reflux condenser and a pressure-resistant feed vessel with stirring with 126.4 g of water and heated to 125° C. This forms a pressure of 4 bar. 126.4 g of a 50% by weight aqueous sodium hydroxide solution (120 mol % of VFA) are provided in the feed vessel. The sodium hydroxide is pressed into the reactor at 6 bar pressure and mixed in. In this case, a temperature of 120° C. is obtained and held for 30 min. Then the reactor is cooled to RT as fast as possible. 295.8 g of the obtained product are adjusted to pH 6.0 by the addition of 26.1 g of 37% by weight hydrochloric acid and 2.9 g of water.

A slightly cloudy, yellowish and viscous polymer solution is obtained.
Polymer content: 7.2%
Formate content FA: 94.7 mmol/100 g
Degree of hydrolysis HA: 97.4 mol %
Degree of reaction HE: 00 mol %
Charge density LD: 68.8 mmol/100 g
Viscosity (20 1/min, RV, spindle 3) 940 mPas
FAD ($^{13}$C NMR, 152.3 ppm): 1.31
FFA ($^{13}$C NMR, 164-167 ppm): 1.01
VFA⁰: 97.2 mmol/100 g
EA⁰: 27.8 mmol/100 g
Na-AS⁰: 13.9 mmol/100 g.

Final Polymer AE29: Alkaline Hydrolyzed Terpolymer VE27 (VFA/MA/MA=70 mol %/25 mol %/5 mol %)

156.0 g of the polymer solution obtained in the starting polymer VE27 are mixed in a 500 ml four-necked flask with paddle stirrer, internal thermometer, dropping funnel and reflux condenser at a stirrer speed of 80 rpm with 1.6 g of a 40% strength by weight aqueous sodium bisulfite solution and 72.9 g water and then heated to 80° C. Then 60.3 g of a 25% by weight aqueous sodium hydroxide solution (120 mol % of VFA) was added. The mixture is kept at 80° C. for 5 h. The resulting product is cooled to RT and adjusted to pH 6.0 by the addition of 24.1 g of 37% strength by weight hydrochloric acid and 7.5 g of water.

A slightly cloudy, yellowish and viscous polymer solution having a polymer content of 7.9% is obtained. The degree of hydrolysis HA is 93 mol % and the degree of reaction HE 100 mol %.

Final Polymer AV1: Alkaline-Hydrolyzed Copolymer W1 (VFA/Na Acrylate=70 mol %/30 mol %)

206.1 g of the polymer solution obtained in the starting polymer VV1 are mixed in a 500 ml four-necked flask with paddle stirrer, internal thermometer, dropping funnel and reflux condenser at a stirrer speed of 80 rpm with 2.3 g of a 40% strength by weight aqueous sodium bisulfite solution and then heated to 80° C. Then 77.0 g of a 25% by weight aqueous sodium hydroxide solution (110 mol % of VFA) was added. The mixture is kept at 80° C. for 5 h. The resulting product is cooled to RT and adjusted to pH 8.5 by the addition of 32.3 g of 37% strength by weight hydrochloric acid and 9.6 g of water.

A slightly cloudy, yellowish and viscous polymer solution having a polymer content of 9.9% is obtained. The degree of hydrolysis HA is 100 mol %.

A-4) Overview of Individual Polymers Produced

Tables A-4-1 and A-4-2 summarize overviews of the individual polymers produced.

TABLE A-4-1

Viscosity observations in the hydrolysis to final polymers starting from the corresponding starting polymer

| Final polymer | Monomers for starting polymer [mol %] | K value of starting polymer | Hydrolysis | Degree of hydrolysis HA [mol %] | Degree of reaction HE [mol %] | Polymer content [%] | Viscosity peak |
|---|---|---|---|---|---|---|---|
| AE1 [a] | VFA/MA = 70/30 | 84 | HCl, 120 mol % | 98 | 100 | 8.3 | none |
| AE2 [a] | VFA/MA = 70/30 | 84 | NaOH, 120 mol % | 96 | 100 | 7.9 | extreme |
| AE20 [a] | VFA/MA = 60/40 | 84 | NaOH, 125 mol % | 94 | 100 | 8.3 | extreme |
| AE21 [a] | VFA/MA = 80/20 | 84 | NaOH, 116 mol % | 99 | 100 | 7 | extreme |
| AE3 [b] | VFA/MA/Na acrylate = 70/29/1 | 90 | NaOH, 120 mol % | 99 | 100 | 7.7 | moderate |
| AE4 [b] | VFA/MA/Na acrylate = 70/28/2 | 90 | NaOH, 120 mol % | 98 | 100 | 7.7 | minimal |
| AE5 [b] | VFA/MA/Na acrylate = 70/25/5 | 93 | NaOH, 120 mol % | 99 | 100 | 7.6 | none |
| AE6 [b] | VFA/MA/Na acrylate = 70/25/5 | 138 | NaOH, 120 mol % | 93 | 100 | 4.5 | low |
| AE7 [b] | VFA/MA/Na acrylate = 70/20/10 | 94 | NaOH, 120 mol % | 99 | 100 | 7.5 | none |
| AE8 [b] | VFA/MA/Na acrylate = 70/15/15 | 99 | NaOH, 120 mol % | 94 | 100 | 7.4 | none |
| AE9 [b] | VFA/MA/Na acrylate = 70/10/20 | 102 | NaOH, 120 mol % | 99 | 100 | 7.2 | none |
| AE22 [b] | VFA/EA/Na acrylate = 70/25/5 | 81 | NaOH, 120 mol % | 98 | 100 | 7.7 | minimal |
| AE23 [b] | VFA/EA/Na acrylate = 70/25/5 | 90 | NaOH, 120 mol % | 97 | 100 | 7.8 | none |
| AE24 [b] | VFA/EA/Na acrylate = 70/20/10 | 99 | NaOH, 120 mol % | 96 | 100 | 7.7 | minimal |
| AE17 [b] | VFA/EA/Na acrylate = 70/20/10 | 103 | NaOH, 120 mol % | 85 | 100 | 8.4 | none |
| AE15 [b] | VFA/EA/Na acrylate = 70/20/10 | 91 | NaOH, 120 mol % | 98 | 100 | 7.5 | none |
| AE10 [b] | VFA/MA/Na methacrylate = 70/25/5 | 94 | NaOH, 120 mol % | 97 | 100 | 7.2 | none |
| AE11 [b] | VFA/MA/Na-AMPS = 70/25/5 | 89 | NaOH, 120 mol % | 94 | 100 | 7.5 | none |
| AE12 [b] | VFA/MA/Na vinyl sulfonate = 70/25/5 | 87 | NaOH, 120 mol % | 98 | 100 | 7.7 | low |
| AE13 [a] | VFA/MA/DADMAC = 65/30/5 | 82 | NaOH, 120 mol % | not known | not known | not known | very extreme |
| AE14 [a] | VFA/MA/APTAC = 75/30/5 | 87 | NaOH, 120 mol % | 94 | 100 | 7.5 | strong |
| AE29 [a] | VFA/MA/AM = 70/25/5 | 89 | NaOH, 120 mol % | 93 | 100 | 7.9 | very strong |

Footnotes:
[a] comparative
[b] according to the invention

Remarks:

The starting polymer VE1 for the final polymer AE1 is produced almost identically to the starting polymer VE2 for the final polymer AE2. No viscosity peak occurs in the acid hydrolysis of the starting polymer VE1 to the final polymer AE1, while an extreme viscosity peak occurs in the alkaline hydrolysis of the starting polymer VE2 to the final polymer AE2. The presence of a polymerized anionic monomer in the starting polymer V damps or prevents the occurrence of a viscosity peak in alkaline hydrolysis to the final polymers AE3, AE4, AE5, AE6, AE7, AE8, AE9, AE10, AE11, AE12, AE15, AE 17, AE22, AE23 and AE24. The presence of a polymerized diallyldimethylammonium chloride (DADMAC), (3-acrylamidopropyl) trimethylammonium chloride (APTAC) or acrylamide (AM) in the starting polymer V to the final polymers AE13, AE14 and AE29 does not have this effect.

tion of 0.8%. In the case of "thin stock treatment", 114.3 g of pulp are placed in a large glass beaker. Then the pulp is diluted with drinking water to a solids concentration of 0.8%. The additives are added with stirring as a 2% aqueous solution of final polymer. The percentage refers to the polymer content of the final polymer. The diluted pulp is treated with each 0.3 g of 2% aqueous solution of final polymer or with 0.6 g of 2% aqueous solution of final polymer. This corresponds in each case to a treatment with 0.15% or 0.3% final polymer based on dry paper pulp.

B-3) Production of Paper Sheets

The aim is to produce paper sheets having a basis weight of 120 g/m² starting from a final polymer-treated paper pulp having a dry content of 0.8%. The paper sheets are produced on a dynamic sheet former from TechPap (France). In this case, a paper pulp suspension, that is, if appropriate, the paper pulp treated with a final polymer, is sprayed onto a

TABLE A-4-2

Calculated composition for final polymers having the structural formula III

| Final polymer | Monomers for starting polymer [mol %] | K value of starting polymer | Degree of hydrolysis HA [mol %] | Amidinium (a) [mol %] | VFA (b) [mol %] | Vinyl ammonium (c) [mol %] | Acrylate anion (d) [mol %] | Lactam(s) [mol %] |
|---|---|---|---|---|---|---|---|---|
| AE15 [b] | VFA/EA/Na acrylate = 70/15/15 | 91 | 99 | 1.0 | 0.7 | 60.1 | 12.0 | 26.2 |
| AE16 [b] | VFA/EA/Na acrylate = 70/20/10 | 99 | 94 | 2.5 | 3.7 | 55.3 | 12.9 | 25.6 |
| AE17 [b] | VFA/EA/Na acrylate = 70/20/10 | 103 | 86 | 2.4 | 10.4 | 49.2 | 13.9 | 24.1 |
| AE18 [b] | VFA/EA/Na acrylate = 70/20/10 | 101 | 91 | 1.6 | 6.5 | 56.2 | 18.2 | 17.5 |
| AE19 [a] | VFA/MA = 70/30 | 82 | 99 | 1.3 | 0 | 59.1 | 8.5 | 31.1 |
| AE20 [a] | VFA/MA = 60/40 | 84 | 94 | 4.9 | 0.9 | 33.1 | 13.4 | 47.7 |
| AE21 [a] | VFA/MA = 80/20 | 84 | 99 | 1.6 | 0.5 | 72.7 | 0.7 | 24.5 |
| AE22 [b] | VFA/MA/Na-Acrylate = 70/25/5 | 81 | 99 | 0.7 | 1 | 60.1 | 11.7 | 26.5 |
| AE23 [b] | VFA/EA/Na acrylate = 70/25/5 | 90 | 97 | 1.4 | 1.8 | 60.3 | 16.1 | 20.4 |
| AE24 [b] | VFA/EA/Na acrylate = 70/20/10 | 99 | 96 | 2.2 | 2.8 | 54.4 | 6.9 | 33.7 |
| AE25 [b] | VFA/EA/Na acrylate = 70/10/20 | 101 | 99 | 0.6 | 0.7 | 62.6 | 16.4 | 19.7 |
| AE26 [b] | VFA/EA/Na acrylate = 70/20/10 | 102 | 72 | 14.2 | 13.8 | 30 | 16.1 | 25.9 |
| AE27 [b] | VFA/EA/Na acrylate = 70/20/10 | 101 | 94 | 3.5 | 2.9 | 56.2 | 16.2 | 21.2 |
| AE28 [b] | VFA/EA/Na acrylate = 70/20/10 | 101 | 98 | 1.3 | 1 | 60.3 | 14.2 | 23.2 |

Footnotes:
[a] comparative
[b] according to the invention

B) Papers

B-1) Preparation of the Paper Pulp

A pulp is used as a paper pulp for paper production, which pulp is produced by impacting paper webs in a pulper. The paper webs are packaging raw papers of the specification "Testliner 2" with a basis weight of 120 g/m², which come from the company Thurpapier from Weinfelden (Switzerland). The pulp is achieved by dissolution in drinking water and by the mechanical processing of the paper webs in the pulper at about 3.5% dry content. The pulp then typically has a degree of fineness of 50° Schopper-Riegler.

B-2) Treatment of the Paper Pulp with Final Polymers

The treatment with final polymers is carried out either in "thick matter" at a dry content of 3.5% of the paper pulp or in the "thin stock" at a dry content of 0.8% of the paper pulp.

In the case of "thick matter treatment", 500 g of pulp are placed in a large glass beaker. Then, with stirring, a 2% aqueous solution of final polymer is added. The percentage refers to the polymer content of the final polymer. The pulp is treated respectively with 1.315 g of 2% aqueous solution of final polymer or with 2.63 g of 2% aqueous solution of final polymer, that is, 1.315 g or 2.63 g to 500 g of pulp. This corresponds in each case to a treatment with 0.15% or 0.3% final polymer based on dry paper pulp. Subsequently, 100 g of the treated pulp are transferred to a further glass vessel and then diluted with drinking water to a solids concentrasieve. The sieve is clamped in a vertical, fast rotating drum. The dewatering and sheet formation in this system, in addition to the sheet structure, is mainly determined by the centrifugal forces within the rotating drum. The centrifugal force acting on the resulting sheet structure can be varied by varying the rotational speed of the drum. The result is a variation of the sheet dewatering which results in a variation of the dry content in the resulting wet paper structure. What is meant here is the dry content of the wet paper structure immediately after the removal from the sieve, which is clamped in the drum of the dynamic sheet former. The number of revolutions of the drum can be varied in 5 stages between 600 and 1100 rpm, whereby dry contents in the range between 15% by weight and 21% by weight can be set. A small part of the still wet sheet structure is used for the immediate determination of the dry content after the removal of the wet paper structure from the sieve of the dynamic sheet former.

After removal from the drum of the dynamic sheet former, the wet paper structures are covered with blotting paper from both sides and dewatered in a static press at 6 bar for 30 seconds, whereby a wet paper sheet is produced from the paper structure. The dry content of the wet paper sheet is then typically between 41% and 43% by weight. If the value significantly falls short, the thickness of the blotter paper or the number of applied sheets can be increased to reach the above-mentioned range.

The wet paper sheet is then covered again from both sides with fresh blotting paper and then clamped in a drying roller for 10 minutes. The surface temperature of the drying roller is approx. 100° C. The result is a dry paper sheet. After drying, the dried paper sheets are placed in a conditioning chamber for conditioning.

B-4) Dry Content of a Paper Sample and Internal Strength of the Dried Paper Sheets To determine the dry matter content (TG) of a paper sample, the mass of the damp sample (MF) is determined from a damp paper sample on a calibrated, top-level fast scale, which with it can be weighed to 0.01 g. Preferably, the damp paper sample has an area of at least 10 cm×10 cm. Subsequently, the damp paper sample is placed in a calibrated drying oven, which can maintain a set temperature to ±2° C. deviation, and dried to constant mass at a set temperature of 105° C. This is typically the case after 90 minutes. The still warm dried paper sample is then transferred to a desiccator containing a suitable desiccant such as silica gel. After cooling to room temperature, the mass of the dried paper sample (MT) is determined on the aforementioned balance. The dry content of the paper sample is calculated according to TG=100·MT/MF and is given in % by weight. The percentage is often specified with a decimal place. When this percentage does not change with the first rounded decimal place, this is the indication for achieving constant mass at dry contents of 1 to 100% by weight. At dry levels from 0 to less than 1% by weight, the rounded second decimal place of the percent is the corresponding indication. The drying takes place at ambient pressure, optionally 101.32 KPa, without any correction being made for a deviation resulting from weather and sea level. The normally prevailing atmospheric pressure of the environment is maintained during drying, thus, if necessary, 101.32 kPa. A correction for a slightly different air pressure due to weather and sea level is not made. In the case of a damp sample which does not yet have a sheet consistency, for example, a pulp suspension or a pulp, the damp sample is dried in a corresponding shell having a large surface area.

A dried paper sheet is stored in a climate chamber at a constant 23° C. and 50% humidity for 12 h to determine its internal strength. Internal strength is measured according to a procedure that complies with Tappi provision T833 pm-94. In this case, 10 paper strips having a width of 2.5 cm and a length of 12.7 cm are cut from two paper sheets, which are produced in the sheet former as indicated above and then dried. Each individual paper sample is fastened to a separate base plate and a metal bracket using double-sided adhesive tape. The metal angle is knocked out with a pendulum, wherein the paper sample to be examined is split in a plane parallel to the paper surface. The energy needed for this process is measured. The device used for the measurement is an internal bond test station from TMI (Testing Machines Inc. Islandia, New York, USA). The double-sided adhesive tape is a product of the company 3M (width 25.4 mm type Scotch No. 140). The measuring device provides the necessary energy for splitting based on a standardized area in J/m². The internal strength is the average value formed from 10 individual measurements.

B-5) Prepared Dried Paper Sheets and Results

Three wet paper structures having dry contents of respectively 15.7% by weight, 17.4% by weight and 20.4% by weight are prepared from untreated paper pulp as reference examples (RB) for dried paper sheets. The wet paper structures are then pressed and dried. Wet paper structures are produced from paper pulp treated with final polymer, each structure having two different dry contents, between 16.5 and 21% by weight per final polymer, wherein a dry content lies below 18.5% by weight and a dry content lies above 18.5% by weight. Table B-5-1 indicates the final polymers used and the results obtained.

TABLE B-5-1

Final polymers used and results obtained

| Example | Final polymer | Dose [c)] | Dry content [d)] [Weight %] | Internal strength [e)] [J/m²] Thick matter addition | Internal strength [e)] [J/m²] Thin stock addition |
|---|---|---|---|---|---|
| RB1 [a)] | — | — | 15.7 | 118 | |
| RB2 [a)] | — | — | 17.4 | 125 | |
| RB3 [a)] | — | — | 20.4 | 129 | |
| VB1 [a)] | AV1 | 0.15 | 16.9 | 140 | — |
| VB2 [a)] | AV1 | 0.30 | 17.1 | 147 | — |
| VB3 [a)] | AV1 | 0.15 | 17.3 | — | 141 |
| VB4 [a)] | AV1 | 0.30 | 17.5 | — | 155 |
| EB1 [a)] | AE 19 | 0.15 | 17.7 | 166 | — |
| EB2 [a)] | AE 19 | 0.30 | 17.4 | 178 | — |
| EB3 [a)] | AE 19 | 0.15 | 17.2 | — | 169 |
| EB4 [a)] | AE 19 | 0.30 | 18.0 | — | 179 |
| EB5 [a)] | AE 20 | 0.15 | 17.4 | 164 | — |
| EB6 [a)] | AE 20 | 0.30 | 18.1 | 177 | — |
| EB7 [a)] | AE 20 | 0.15 | 17.8 | — | 167 |
| EB8 [a)] | AE 20 | 0.30 | 18.2 | — | 184 |
| EB9 [a)] | AE 21 | 0.15 | 17.1 | 166 | — |
| EB10 [a)] | AE 21 | 0.30 | 17.4 | 189 | — |
| EB11 [a)] | AE 21 | 0.15 | 17.6 | — | 171 |
| EB12 [a)] | AE 21 | 0.30 | 17.7 | — | 183 |
| EB13 [a)] | AE 22 | 0.15 | 17.0 | 167 | — |
| EB14 [b)] | AE 22 | 0.30 | 17.5 | 179 | — |
| EB15 [b)] | AE 22 | 0.15 | 17.4 | — | 169 |
| EB16 [b)] | AE 22 | 0.30 | 17.3 | — | 182 |
| EB17 [b)] | AE 23 | 0.15 | 17.9 | 172 | — |
| EB18 [b)] | AE 23 | 0.30 | 18.0 | 191 | — |
| EB19 [b)] | AE 23 | 0.15 | 17.3 | — | 169 |
| EB20 [b)] | AE 23 | 0.30 | 17.6 | — | 185 |
| EB21 [b)] | AE 24 | 0.15 | 16.8 | 172 | — |
| EB22 [b)] | AE 24 | 0.30 | 17.4 | 188 | — |
| EB23 [b)] | AE 24 | 0.15 | 17.2 | — | 173 |
| EB24 [b)] | AE 24 | 0.30 | 17.7 | — | 189 |
| EB25 [b)] | AE 15 | 0.15 | 17.2 | 167 | — |
| EB26 [b)] | AE 15 | 0.30 | 17.5 | 183 | — |
| EB27 [b)] | AE 15 | 0.15 | 17.6 | — | 173 |
| EB28 [b)] | AE 15 | 0.30 | 17.8 | — | 188 |
| VB5 [a)] | AV1 | 0.15 | 19.7 | 143 | — |
| VB6 [a)] | AV1 | 0.30 | 18.9 | 154 | — |
| VB7 [a)] | AV1 | 0.15 | 19.5 | — | 149 |
| VB8 [a)] | AV1 | 0.30 | 19.1 | — | 161 |
| EB 33 [b)] | AE 19 | 0.15 | 19.7 | 221 | — |
| EB 34 [b)] | AE 19 | 0.30 | 19.6 | 272 | — |
| EB 35 [b)] | AE 19 | 0.15 | 19.9 | — | 229 |
| EB 36 [b)] | AE 19 | 0.30 | 19.3 | — | 266 |
| EB 37 [b)] | AE 20 | 0.15 | 19.8 | 195 | — |
| EB 38 [b)] | AE 20 | 0.30 | 19.6 | 236 | — |
| EB 39 [b)] | AE 20 | 0.15 | 19.8 | — | 203 |
| EB 40 [b)] | AE 20 | 0.30 | 19.3 | — | 249 |
| EB 41 [b)] | AE 21 | 0.15 | 19.2 | 194 | — |
| EB 42 [b)] | AE 21 | 0.30 | 19.4 | 239 | — |
| EB 43 [b)] | AE 21 | 0.15 | 20.1 | — | 197 |
| EB 44 [b)] | AE 21 | 0.30 | 19.6 | — | 243 |
| EB45 [b)] | AE 22 | 0.15 | 19.6 | 229 | — |
| EB46 [b)] | AE 22 | 0.30 | 20.1 | 271 | — |
| EB47 [b)] | AE 22 | 0.15 | 20.5 | — | 223 |
| EB48 [b)] | AE 22 | 0.30 | 19.5 | — | 269 |
| EB49 [b)] | AE 23 | 0.15 | 19.3 | 219 | — |
| EB50 [b)] | AE 23 | 0.30 | 19.7 | 267 | — |
| EB51 [b)] | AE 23 | 0.15 | 19.6 | — | 231 |
| EB52 [b)] | AE 23 | 0.30 | 20.3 | — | 272 |
| EB53 [b)] | AE 24 | 0.15 | 19.4 | 207 | — |
| EB54 [b)] | AE 24 | 0.30 | 19.5 | 249 | — |
| EB55 [b)] | AE 24 | 0.15 | 20.2 | — | 209 |
| EB56 [b)] | AE 24 | 0.30 | 19.3 | — | 256 |
| EB57 [b)] | AE 15 | 0.15 | 19.6 | 193 | — |

TABLE B-5-1-continued

Final polymers used and results obtained

| Example | Final polymer | Dose [e] | Dry content [d] [Weight %] | Internal strength [e] [J/m$^2$] Thick matter addition | Internal strength [e] [J/m$^2$] Thin stock addition |
|---|---|---|---|---|---|
| EB58 [b] | AE 15 | 0.30 | 19.2 | 228 | — |
| EB59 [b] | AE 15 | 0.15 | 19.5 | — | 204 |
| EB60 [b] | AE 15 | 0.30 | 19.8 | — | 235 |

Footnotes:
[a] comparative
[b] according to the invention
[c] g final polymer based on polymer content added to 100 g of paper pulp
[d] dry content of wet paper structure
[e] internal strength of the dried paper sheet B-6) Summary of Data Obtained The reference values of the internal strength (RB1-RB3, with no added final polymer) are around 125 J/m$^2$. The deviations of the internal strength between dried paper sheets the wet paper structure of which has a dry content of between 15.3% by weight and 20.2% by weight show little deviation.

At a dosage of 0.15 g/100 g of the comparative examples VB1, VB3, VB5 and VB7, the increase in internal strength over reference examples RB1, RB2 and RB3 is about 20 J/m$^2$ regardless of the dosage in the thick matter or thin stock and regardless of the dry content. At a dosage of 0.3 g/100 g of comparative examples VB2, VB4, VB6 and VB8, the increase in internal strength is about 30 J/m$^2$ regardless of the dosage in the thick matter or thin stock and regardless of the dry content.

At a dosage of 0.15 g/100 g of the other examples and a dry content <18.5% by weight (odd numbers from EB1 to EB28), the increase in internal strength with respect to the reference examples RB1, RB2 and RB3 is about 40 J/m$^2$ regardless of the dosage in the thick matter or in the thin stock. At a dosage of 0.30 g/100 g of the other examples and a dry content <18.5% by weight (even numbers from EB1-EB28), the increase in internal strength is around 55 J/m$^2$ regardless of the dosage in thick matter or thin stock.

At a dosage of 0.15 g/100 g of the other examples and a dry content of >18.5% by weight (odd numbers from EB33 to EB60), the increase in internal strength with respect to the reference examples RB1, RB2 and RB3 at dosage in the thick matter at least 70 J/m$^2$ and in the thin stock at least 50 J/m$^2$. At a dosage of 0.30 g/100 g of the other examples and a dry content of >18.5% by weight (even numbers from EB33 to EB60), the increase in internal strength with respect to the reference examples RB1, RB2 and RB3 at dosage in the thick matter at least 90 J/m$^2$ and in the thin stock at least 70 J/m$^2$.

Comparing the other examples having a dry content of the wet paper structure of <18.5% by weight (EB1 to EB28) with the other examples having a dry content of the wet paper structure of >18.5% by weight (EB33 to EB60), the internal strengths of comparable final polymer, dosage amount and dosage are higher by at least 20 J/m$^2$ at the higher dry content of the wet paper structure.

The final polymer AV1 of comparative examples VB1 to VB8 is formally composed of 70 mol % of amino group-carrying ethylene units and 30 mol % of carboxylic acid group-carrying ethylene units. The final polymers AE15, AE19, AE22, AE23 and AE24 of the other examples are formally approximately also composed of 70 mol % of amino group-carrying ethylene units and 30 mol % of carboxylic acid group-carrying ethylene units. Approximately, the degree of hydrolysis HA refers to of 98 mol % for AE15, 99 mol % for AE19, 98 mol % for AE22, 97 mol % for AE23 and 96 mol % for AE24. It makes a difference in the paper strengths achieved for the final polymers used, whether only sodium acrylate is previously polymerized in the starting polymer for the carboxylic acid group-carrying ethylene units in the final polymer or at least or exclusively a methyl or ethyl ester of acrylic acid is previously polymerized in the starting polymer. One assumption is that there is a different incorporation behavior of the monomers and thus a changed alternation of polymerized monomer units. Changes in the number of possible five-membered lactam structural units are to be expected with increased alternation. N-vinylformamide is an electron-rich monomer, whereas an ester of acrylic acid is an electron-deficient monomer. Buffered acrylic acid at a pH value of 6 to 7, however, is a more electron-rich monomer. Another difference between an ester of acrylic acid and an acrylate salt is solubility.

The invention claimed is:

1. A method for producing final polymer A comprising the following steps:

(A) providing a starting polymer V, wherein the starting polymer V is obtained by radical polymerization of the monomers (i) 58 to 90 mol % of a monomer of the formula I

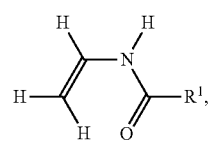

in which $R^1$ denotes H or $C_1$-$C_6$ alkyl, (ii) 3 to 39 mol % of a $C_1$-$C_4$ alkyl ester of acrylic acid or of a $C_1$-$C_4$ alkyl ester of methacrylic acid, (iii) 1 to 25 mol % of a monoethylenically unsaturated carboxylic acid, a monoethylenically unsaturated sulfonic acid or a monoethylenically unsaturated phosphonic acid, or salt forms thereof, (iv) 0 to 35 mol % of one or more ethylenically unsaturated monomers which are different from a monomer (i), (ii) and (iii), wherein the total amount of all monomers (i), (ii), (iii) and (iv) is 100 mol %, and (B) hydrolyzing the provided starting polymer V under alkaline conditions to obtain the final polymer A, wherein the N—C(=O)$R^1$ groups of the formula (I) of the monomers (i) polymerized into the starting polymer V at least partially hydrolyze to form primary amino groups, and wherein a viscosity peak during hydrolyzing of the provided starting polymer V is low to none.

2. The method according to claim 1, wherein in step (B), the ester groups of the monomers (ii) polymerized into the starting polymer V at least partially react and at least part of the reaction is the formation of five-membered lactam structural units with the obtained primary amino groups or the formation of carboxylic acid groups or salt forms thereof.

3. The method according to claim 1, wherein for the radical polymerization
   (i) 58 to 89 mol % of a monomer of the formula I,
   (ii) 5 to 39 mol % of a $C_1$-$C_4$ alkyl ester of acrylic acid or of a $C_1$-$C_4$ alkyl ester of methacrylic acid,
   (iii) 1 to 25 mol % of a monoethylenically unsaturated carboxylic acid, a monoethylenically unsaturated sulfonic acid or a monoethylenically unsaturated phosphonic acid, or salt forms thereof,
   (iv) 0 to 25 mol % of one or more ethylenically unsaturated monomers which are different from a monomer (i), (ii) and (iii),
   are used.

4. The method according to claim 1, wherein for the radical polymerizing
   (i) 58 to 83 mol % of a monomer of the formula I,
   (ii) 8 to 39 mol % of a $C_1$-$C_4$ alkyl ester of acrylic acid or of a $C_1$-$C_4$ alkyl ester of methacrylic acid,
   (iii) 2 to 25 mol % of a monoethylenically unsaturated carboxylic acid, a monoethylenically unsaturated sulfonic acid or a monoethylenically unsaturated phosphonic acid, or salt forms thereof,
   (iv) 0 to 25 mol % of one or more ethylenically unsaturated monomers which are different from a monomer (i), (ii) and (iii),
   are used.

5. The method according to claim 1, wherein the monomer (iii) is used in an amount of 3 to 25 mol %.

6. The method according to claim 1, wherein in step (B), at least 50 to 100% of the monomers (i) polymerized into the starting polymer V are hydrolyzed, based on the number of all monomers (i) polymerized into the starting polymer V.

7. The method according to claim 2, wherein in step (B), at least 50 to 100% of the monomers (ii) polymerized into the starting polymer V are reacted, based on the number of all monomers (ii) polymerized into the starting polymer V.

8. The method according to claim 1, wherein in step (B), at least 70 and at most 99.5% of the polymerized monomers (i) are hydrolyzed, based on the number of all monomers (i) polymerized into the starting polymer V.

9. The method according to claim 1, wherein the monomer (i) is N-vinylformamide with $R^1$=H in formula I.

10. The method according to claim 1, wherein the monomer (ii) is a $C_1$-$C_3$ alkyl ester of acrylic acid or $C_1$ alkyl ester of methacrylic acid.

11. The method according to claim 10, wherein the monomer (ii) is a $C_1$-$C_2$ alkyl ester of acrylic acid.

12. The method according to claim 1, wherein the monomer (ii) is ethyl acrylate.

13. The method according to claim 1, wherein the monomer (iii) is a monoethylenically unsaturated carboxylic acid or a monoethylenically unsaturated sulfonic acid, or salt forms thereof.

14. The method according to claim 1, wherein the monomer (iii) is acrylic acid, methacrylic acid, vinylsulfonic acid or 2-acrylamido-2-methylpropanesulfonic acid, or salt forms thereof.

15. The method according to claim 1, wherein for the radical polymerization, the monomers
   (i) 60 to 83 mol % of N-vinylformamide,
   (ii) 8 to 21 mol % ethyl acrylate,
   (iii) 2 to 21 mol % of acrylic acid or methacrylic acid or salt forms thereof,
   (iv) 0 to 24 mol % of one or more ethylenically unsaturated monomers which are different from a monomer (i), (ii) and (iii),
   are used.

16. The method according to claim 1, wherein the monomers (iv) comprise an amount of 0 to 6 mol % of acrylamide, the molar percent being based on the total number of all monomers (i), (ii), (iii) and (iv) and the total number of all monomers being 100 mol %.

17. The method according to claim 1, wherein in step (B), the ester groups of the monomers (ii) polymerized into the starting polymer V are at least partially reacted and at least part of the reaction is the formation of five-membered lactam structural units with the obtained primary amino groups.

18. The method according to claim 1, wherein in step (B), a base is used in a numerical amount corresponding to between 30 and 150 mol % of the number of monomers (i) polymerized into starting polymer V.

19. A method of producing paper or cardboard comprising the following steps:
   (AC) adding a final polymer A to a first aqueous pulp suspension whereby a second aqueous pulp suspension comprising final polymer A is created,
   wherein the final polymer A is obtained by
   radical polymerization of the monomers
   (i) 58 to 90 mol % of a monomer of the formula I

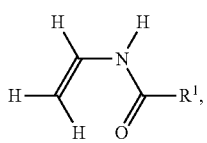

in which $R^1$ denotes H or $C_1$-$C_6$ alkyl,
   (ii) 3 to 39 mol % of a $C_1$-$C_4$ alkyl ester of acrylic acid or of a $C_1$-$C_4$ alkyl ester of methacrylic acid,
   (iii) 1 to 25 mol % of a monoethylenically unsaturated carboxylic acid, a monoethylenically unsaturated sulfonic acid or a monoethylenically unsaturated phosphonic acid, or salt forms thereof,
   (iv) 0 to 35 mol % of one or more ethylenically unsaturated monomers which are different from a monomer (i), (ii), (iii) and (iv),
   wherein acrylonitrile or methacrylonitrile are used in an amount of 0 to 9 mol %, wherein the total amount of all monomers (i), (ii), (iii) and (iv) is 100 mol % to obtain a starting polymer V, and
   hydrolyzing the provided starting polymer V under alkaline conditions to obtain the final polymer A,
   wherein the N—C(=O)$R^1$ groups of the formula (I) of the monomers (i) polymerized into the starting polymer V at least partially hydrolyze to form primary amino groups,
   wherein the ester groups of the monomers (ii) polymerized into the starting polymer V are at least partially reacted and at least part of the reaction is the formation of five-membered lactam structural units with the obtained primary amino groups or the formation of carboxylic acid groups or salt forms thereof, and wherein a viscosity peak during hydrolyzing of the provided starting polymer V is low to none,
   (BC) dewatering the second aqueous pulp suspension containing final polymer A on a water-permeable substrate to a wet paper structure,
   (CC) dewatering the wet paper structure, resulting in the paper or cardboard.

* * * * *